United States Patent
Sampath et al.

(10) Patent No.: US 7,280,548 B2
(45) Date of Patent: Oct. 9, 2007

(54) METHOD AND APPARATUS FOR NON-SPECULATIVE PRE-FETCH OPERATION IN DATA PACKET PROCESSING

(75) Inventors: Nandakumar Sampath, Santa Clara, CA (US); Enrique Musoll, San Jose, CA (US); Stephen Melvin, San Francisco, CA (US); Mario Nemirovsky, Saratoga, CA (US)

(73) Assignee: MIPS Technologies, Inc., Mountain View, CA (US)

( * ) Notice: Subject to any disclaimer, the term of this patent is extended or adjusted under 35 U.S.C. 154(b) by 0 days.

(21) Appl. No.: 11/278,890

(22) Filed: Apr. 6, 2006

(65) Prior Publication Data

US 2006/0215670 A1    Sep. 28, 2006

Related U.S. Application Data

(63) Continuation of application No. 09/900,393, filed on Jul. 5, 2001, now Pat. No. 7,042,887, which is a continuation-in-part of application No. 09/737,375, filed on Dec. 14, 2000, now Pat. No. 7,058,064.

(60) Provisional application No. 60/181,364, filed on Feb. 8, 2000.

(51) Int. Cl.
*H04L 12/56* (2006.01)
(52) U.S. Cl. .................. 370/401; 709/238; 712/207
(58) Field of Classification Search ............ 370/401; 709/238; 712/207
See application file for complete search history.

(56) References Cited

U.S. PATENT DOCUMENTS 4,200,927 A    4/1980    Hughes et al.

(Continued)

FOREIGN PATENT DOCUMENTS

WO    WO 03/005645 A2    6/2002

OTHER PUBLICATIONS

MC68020 32-Bit Microprocessor User's Manual. 3rd Ed.. 1989. pp. 3-125, 3-126, and 3-127. Prentice Hall, NJ, US.

(Continued)

*Primary Examiner*—Melvin Marcelo
(74) *Attorney, Agent, or Firm*—Donald R. Boys; James W. Huffman

(57) ABSTRACT

A system is provided for enabling a non-speculative pre-fetch operation for processing instructions to be performed in the background ahead of immediate packet processing by a packet processor. The system comprises a packet-management unit for accepting data packets and enqueuing them for processing, a processor unit for processing the data packets, a processor core memory for holding context registers and functional units for processing, a memory for holding a plurality of instruction threads and a software-configurable hardware table for relating queues to pointers to beginnings of instruction threads. The packet-management unit selects an available context in the processor core for processing of a data packet, consults the table, and communicates the pointer to the processor, enabling the processor to perform the non-speculative pre-fetch for instructions.

28 Claims, 55 Drawing Sheets

U.S. PATENT DOCUMENTS

| | | | |
|---|---|---|---|
| 4,707,784 | A | 11/1987 | Ryan et al. |
| 4,942,518 | A | 7/1990 | Weatherford et al. |
| 5,023,776 | A | 6/1991 | Gregor |
| 5,121,383 | A | 6/1992 | Golestani |
| 5,291,481 | A | 3/1994 | Doshi et al. |
| 5,408,464 | A | 4/1995 | Jurkevich |
| 5,465,331 | A | 11/1995 | Yang et al. |
| 5,471,598 | A | 11/1995 | Quattromani et al. |
| 5,521,916 | A | 5/1996 | Choudhury et al. |
| 5,559,970 | A | 9/1996 | Sharma |
| 5,619,497 | A | 4/1997 | Gallagher et al. |
| 5,634,015 | A | 5/1997 | Chang et al. |
| 5,659,797 | A | 8/1997 | Zandveld et al. |
| 5,675,790 | A | 10/1997 | Walls |
| 5,708,814 | A | 1/1998 | Short et al. |
| 5,724,565 | A | 3/1998 | Dubey et al. |
| 5,737,525 | A | 4/1998 | Picazo et al. |
| 5,784,649 | A | 7/1998 | Begur et al. |
| 5,784,699 | A | 7/1998 | McMahon et al. |
| 5,796,966 | A | 8/1998 | Simcoe et al. |
| 5,809,321 | A | 9/1998 | Hansen et al. |
| 5,812,810 | A | 9/1998 | Sager |
| 5,892,966 | A | 4/1999 | Petrick et al. |
| 5,918,050 | A | 6/1999 | Rosenthal et al. |
| 5,951,679 | A | 9/1999 | Anderson et al. |
| 5,978,570 | A | 11/1999 | Hillis |
| 5,978,893 | A | 11/1999 | Bakshi et al. |
| 5,987,578 | A | 11/1999 | Butcher |
| 6,009,516 | A | 12/1999 | Steiss et al. |
| 6,016,308 | A | 1/2000 | Crayford et al. |
| 6,023,738 | A | 2/2000 | Priem et al. |
| 6,047,122 | A | 4/2000 | Spiller |
| 6,058,267 | A | 5/2000 | Kanai et al. |
| 6,070,202 | A | 5/2000 | Minkoff et al. |
| 6,073,251 | A | 6/2000 | Jewett et al. |
| 6,088,745 | A | 7/2000 | Bertagna et al. |
| 6,131,163 | A | 10/2000 | Wiegel |
| 6,151,644 | A | 11/2000 | Wu |
| 6,157,955 | A | 12/2000 | Narad et al. |
| 6,169,745 | B1 | 1/2001 | Liu et al. |
| 6,195,680 | B1 | 2/2001 | Goldszmidt et al. |
| 6,219,339 | B1 | 4/2001 | Doshi et al. |
| 6,219,783 | B1 | 4/2001 | Zahir et al. |
| 6,223,274 | B1 | 4/2001 | Catthoor et al. |
| 6,226,680 | B1 | 5/2001 | Boucher et al. |
| 6,247,040 | B1 | 6/2001 | Born et al. |
| 6,247,105 | B1 | 6/2001 | Goldstein et al. |
| 6,249,801 | B1 | 6/2001 | Zisapel et al. |
| 6,253,313 | B1 | 6/2001 | Morrison et al. |
| 6,263,452 | B1 | 7/2001 | Jewett et al. |
| 6,381,242 | B1 | 4/2002 | Maher, III et al. |
| 6,389,468 | B1 | 5/2002 | Muller et al. |
| 6,438,135 | B1 | 8/2002 | Tzeng |
| 6,453,360 | B1 | 9/2002 | Muller et al. |
| 6,460,105 | B1 | 10/2002 | Jones et al. |
| 6,483,804 | B1 | 11/2002 | Muller et al. |
| 6,502,213 | B1 | 12/2002 | Bowman-Amuah |
| 6,523,109 | B1 | 2/2003 | Meier |
| 6,529,515 | B1 | 3/2003 | Raz et al. |
| 6,535,905 | B1 | 3/2003 | Kalafatis et al. |
| 6,614,796 | B1 | 9/2003 | Black et al. |
| 6,625,808 | B1 | 9/2003 | Tarditi |
| 6,640,248 | B1 | 10/2003 | Jorgensen |
| 6,650,640 | B1 | 11/2003 | Muller et al. |
| 6,738,371 | B1 | 5/2004 | Ayres |
| 6,738,378 | B2 | 5/2004 | Tuck, III et al. |
| 6,813,268 | B1 | 11/2004 | Kalkunte et al. |
| 6,820,087 | B1 | 11/2004 | Langendorf et al. |
| 6,965,982 | B2 * | 11/2005 | Nemawarkar ............... 712/207 |
| 7,032,226 | B1 | 4/2006 | Nemirovsky et al. |
| 7,065,096 | B2 | 6/2006 | Musoll et al. |
| 2001/0004755 | A1 | 6/2001 | Levy et al. |
| 2001/0005253 | A1 | 6/2001 | Komatsu |
| 2001/0024456 | A1 | 9/2001 | Zaun et al. |
| 2001/0043610 | A1 | 11/2001 | Nemirovsky et al. |
| 2001/0052053 | A1 | 12/2001 | Nemirovsky et al. |
| 2002/0016883 | A1 | 2/2002 | Musoll et al. |
| 2002/0049964 | A1 | 4/2002 | Takayama et al. |
| 2002/0054603 | A1 | 5/2002 | Musoll et al. |
| 2002/0071393 | A1 | 6/2002 | Musoll |
| 2002/0083173 | A1 | 6/2002 | Musoll et al. |
| 2002/0124262 | A1 | 9/2002 | Basso et al. |
| 2004/0015598 | A1 | 1/2004 | Lin |
| 2004/0148382 | A1 | 7/2004 | Narad et al. |
| 2004/0172471 | A1 | 9/2004 | Porter |
| 2004/0172504 | A1 | 9/2004 | Balazich et al. |
| 2004/0213251 | A1 | 10/2004 | Tran et al. |
| 2005/0061401 | A1 | 3/2005 | Tokoro et al. |
| 2005/0066028 | A1 * | 3/2005 | Illikkal et al. ............... 709/224 |
| 2006/0036705 | A1 | 2/2006 | Musoll et al. |
| 2006/0090039 | A1 * | 4/2006 | Jain et al. .................... 711/137 |
| 2007/0008989 | A1 * | 1/2007 | Joglekar ..................... 370/469 |

OTHER PUBLICATIONS

Potel, M. J. "Real-Time Playback in Animation Systems." Proceedings of the 4th Annual Conference on Computer Graphics and Interactive Techniques. 1977. pp. 72-77. San Jose, CA, US.

ARM Architecture Reference Manual. 1996. pp. 3-41, 3-42, 3-43, 3-67, and 3-68. Prentice Hall, NJ, US.

ESA/390 Principles of Operation. IBM Online Publications Center Reference No. SA22-7201-08. Table of Contents and paras. 7.5.31 and 7.5.70. IBM Corporation. Boulder, CO, US.

MC88110 Second Generation RISC Microprocessor User's Manual. 1991. pp. 10-66, 10-67, and 10-71. Motorola, Inc.

Diefendorff et al. "Organization of the Motorola 88110 Superscalar RISC Microprocessor." IEEE Journal of Microelectronics. Apr. 1992. pp. 40-63. vol. 12, No. 2. IEEE. New York, NY, US.

Kane, Gerry. PA-RISC 2.0 Architecture. 1996, pp. 7-106 and 7-107. Prentice Hall. NJ, US.

Diefendorff et al. "AltiVec Extension to PowerPC Accelerates Media Processing." IEEE Journal of Microelectronics. vol. 20, No. 2 (2000): pp. 85-95.

Grunewald et al. "Towards Extremely Fast Context Switching in a Block Multithreaded Processor." Proceedings of EUROMICRO 22, 1996. pp. 592-599.

Bradford et al. "Efficient Synchronization for Multithreaded Processors." Workshop on Multithreaded Execution, Architecture, and Compilation. Jan.-Feb. 1998. pp. 1-4.

Pai et al. "An Evaluation of Memory Consistency Models for Shared-Memory Systems with ILP Processors." Proceedings of ASPLOS-VII, Oct. 1996: pp. 12-23, ACM, Inc.

Yoaz et al. "Speculation Techniques for Improving Load Related Instruction Scheduling." 1999. pp. 42-53, IEEE.

Kessler, R. E. "The Alpha 21264 Microprocessor: Out-of-Order Execution at 600 MHz." Aug. 1998.

Donalson et al. "DISC: Dynamic Instruction Stream Computer, An Evaluation of Performance." 26th Hawaii Conference on Systems Sciences. vol. 1. 1993. pp. 448-456.

Nemirovsky et al. "DISC: Dynamic Instruction Stream Computer." ACM. 1991. pp. 163-171.

Musoll et al. Mechanism to Prevent the Download of a Packet with Pending Writes Affecting Its Data. Apr. 11, 2001. Disclosure Document #492430, USTPO.

Ungerer et al. A Survey of Processors with Explicit Multithreading. ACM Computing Surveys, vol. 35, No. 1. Mar. 2003. pp. 29-63.

U.S. Appl. No. 09/591,510, filed Jun. 12, 2000, Gelinas et al.

U.S. Appl. No. 09/602,279, Nemirovsky et al.

Diefendorff, Keith. K7 Challenges Intel. Microprocessor Report. Oct. 26, 1998. vol. 12, No. 14. US.

Knuth, Donanld E. The Art of Computer Programming, 3rd Edition, vol. 1, Fundamental Algorithms, Sec. 2.5 Dynamic Storage Allocation, 1997, p. 435-456, Addison Wesley, US.

Melvin et al., "Extended Instruction Set for a Packet Processing Applications." Jul. 5, 2001, Disclosure Document #496559, USPTO.

Musoll et al., "Hardware Algorithm for Allocating and De-Allocating Consecutive Blocks of Memory," Apr. 3, 2001, Disclosure Document #491557, USPTO.

Musoll et al., "Mechanism to Overflow Packets to a Software Controlled Memory When They Do Not Fit into a Hardware Controlled Memeory,", Jul. 3, 2001, Disclosure Document #496391, USPTO.

Musoll et al., "Mechanism for Allowing a Limited Packet Head and/or Tail Growth Without Moving the Packet to a Different Memeory Location," Apr. 16, 2001, Disclosure Document #492429, USPTO.

Musoll et al., Mechanism to Activate a Context When No Stream is Running in a Multi-Streaming Processing Core,: Apr. 16, 2001, Disclosure Document #492431, USPTO.

Musoll, Enrique, "Functional Validation of a Packet Management Unit," May 18, 2001, Disclosure Document #429011, USPTO.

Sampath et al., "Mechanism to Un-speculatively Pre-fetch Instructions from the Thread Associated to a Packet," Apr. 2, 2001, Disclosure Document #491527, USPTO.

Yamamoto, Wayne. An Analysis of Multistreamed, Superscalar Processor Architectures. University of California Santa Barbara Dissertation. Dec. 1995. Santa Barbara, US.

Yamamoto et al. "Increasing Superscalar Performance Through Multistreaming." Parallel Architectures and Compilation Techniques (PACT '95). 1995.

The PowerPC Architecture: A Specification for a New Family of RISC Processors. $2^{nd}$ Ed. May 1994. pp. 70-72. Morgan Kaufmann. San Francisco, US.

* cited by examiner

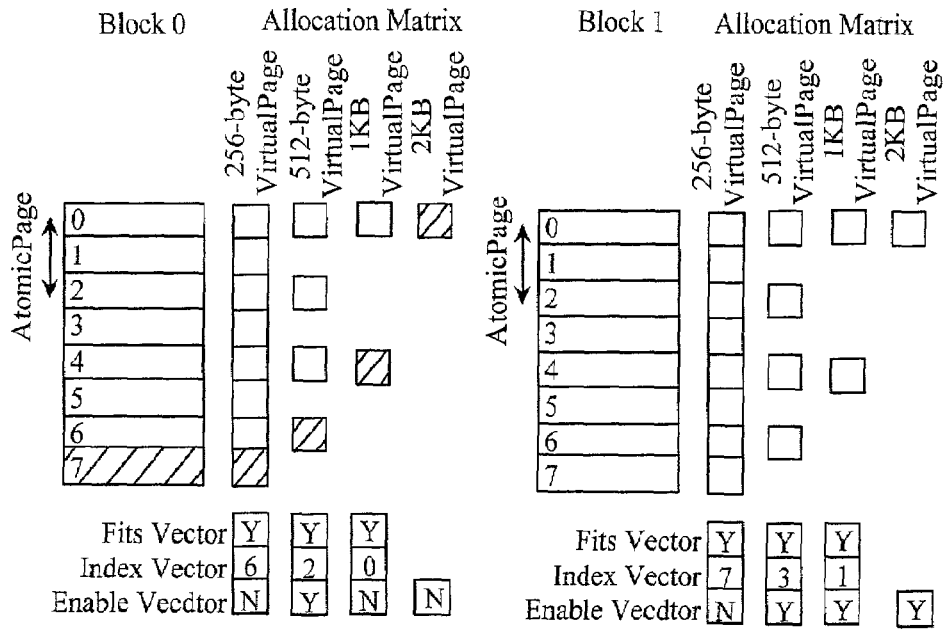
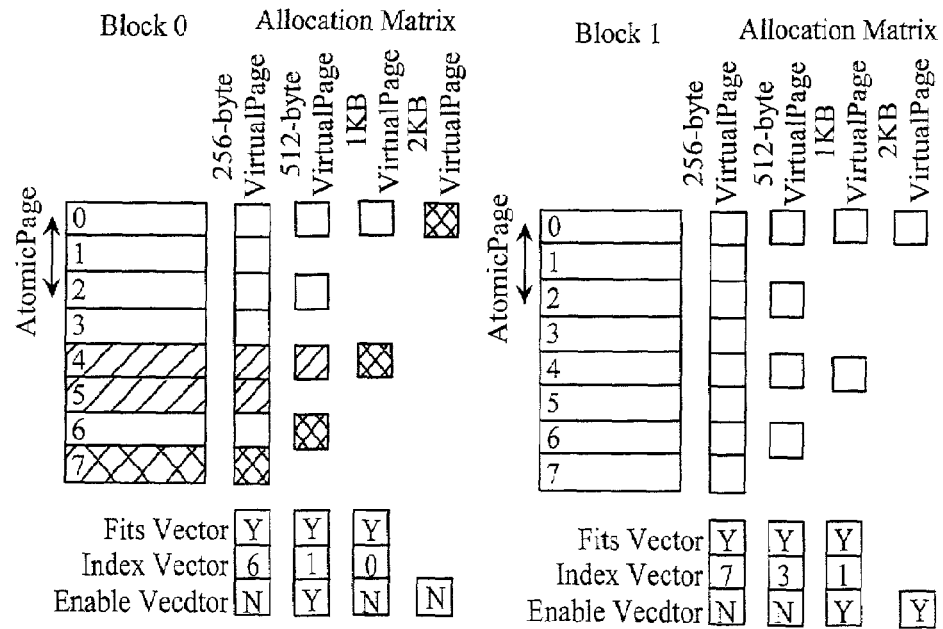
*Fig. 5a*

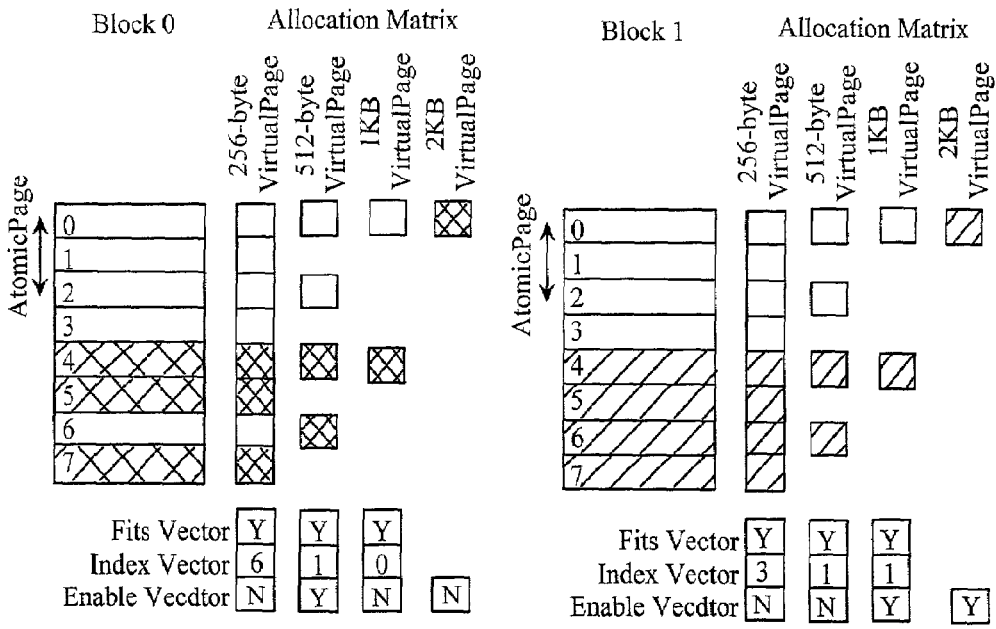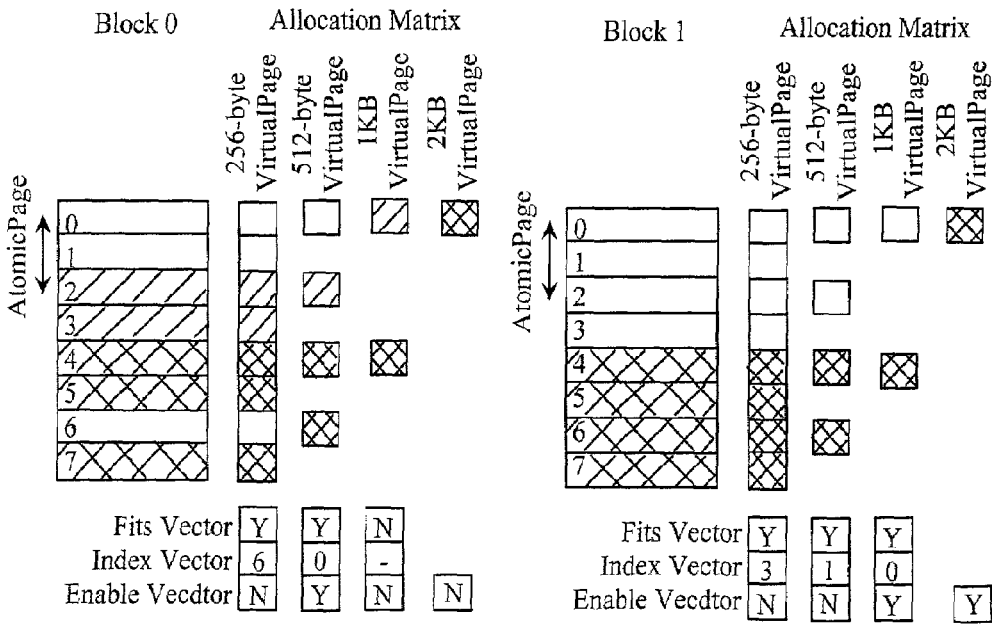
*Fig. 5b*

| Priority Clusters | # clusters | # queues / cluster | Queues in each cluster |
|---|---|---|---|
| 0 | 1 | 32 | {0,...,31} |
| 1 | 2 | 16 | {0,...,15},...,{16,...,31} |
| 2 | 4 | 8 | {0,...,7},...,{24,...,31} |
| 3 | 8 | 4 | {0,...,3},...,{28,...,31} |
| 4 | 16 | 2 | {0,1},{2,3},...,{30,31} |
| 5 | 32 | 1 | {0},{1},...,{31} |

*Fig. 10 Clustering of queues*

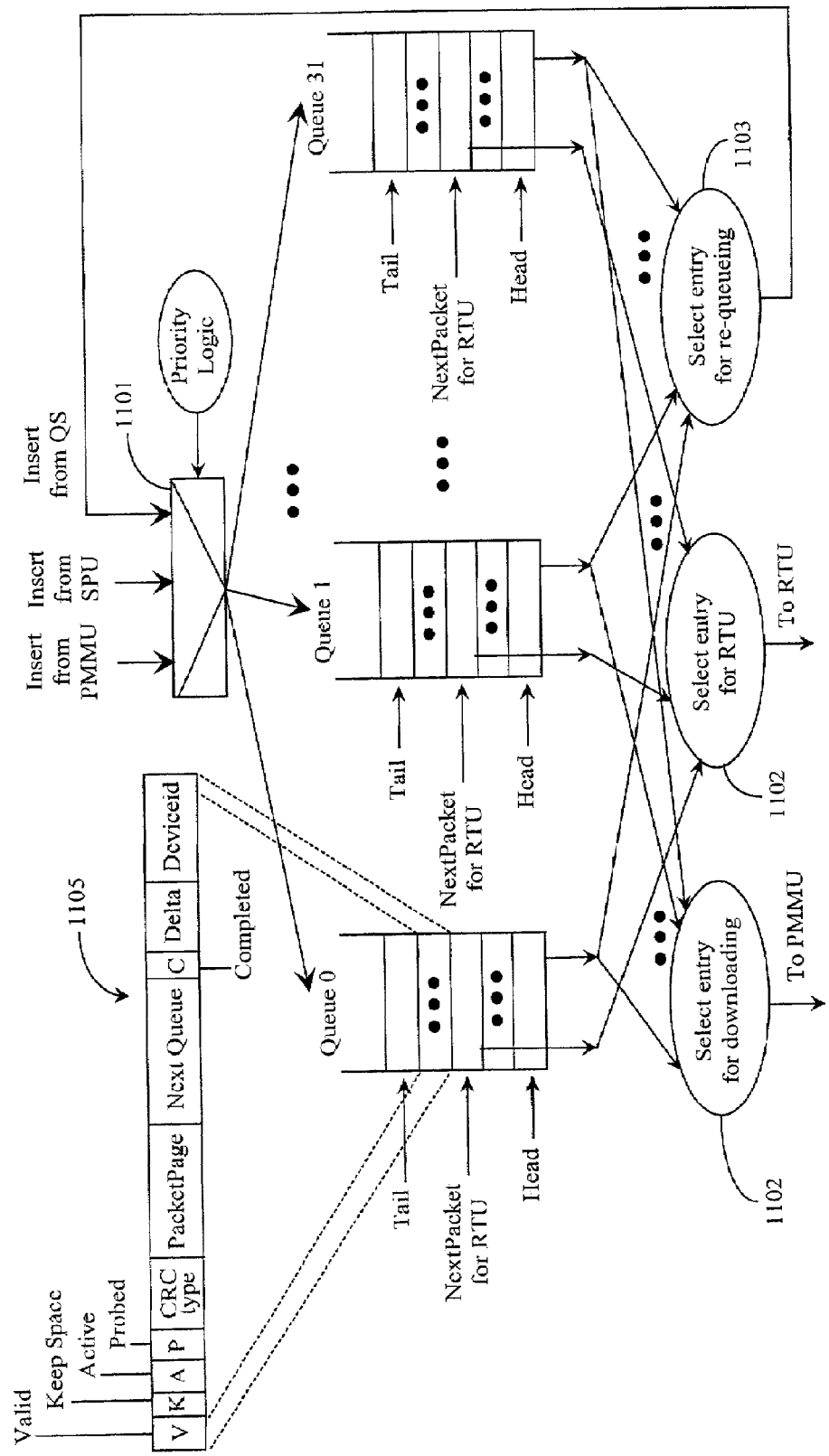
Fig. 11 Generic Queueing Architecture

| InboundDeviceid Field | Outbound Device Identifier | Inbound Device Identifier |
|---|---|---|
| 0 | | Not Used |
| 1 | | Not Used |
| 2 | | 0 |
| 3 | | 1 |

*Fig. 12*

| PriorityClusters | # clusters | RTU Priority |
|---|---|---|
| 0 | 1 | Queue#>>5 or Cluster# (i.e. always 0) |
| 1 | 2 | Queue#>>4 or Cluster# |
| 2 | 4 | Queue#>>3 or Cluster# |
| 3 | 8 | Queue#>>2 or Cluster# |
| 4 | 16 | Queue#>>2 or Cluster#>>1 |
| 5 | 32 | Queue#>>2 or Cluster#>>2 |

*Fig. 13*

| A | C | P | State of the Packet |
|---|---|---|---|
| 0 | 0 | - | *Never* |
| 0 | 1 | - | Packet is completed (could have been previously probed or not) |
| 1 | 0 | - | Packet is being processed by the SPU (can be probed or not) |
| 1 | 1 | - | *Never* |
| 0 | 0 | 0 | Packet is being processed by the SPU. This state may happen after a MoveAndReactivate operation on a not-probed packet, or after the packet is inserted by the PMMU (i.e. a new packet) |
| 0 | 0 | 1 | Packet is not being processed by the SPU. This state may happen after a MoveAndReactivate operation on a probed packet. |
| 0 | 1 | - | *Never* |
| 1 | - | - | *Never* |

*Fig. 14*

| Word # | Configuration Register Name | Block Affected |
|---|---|---|
| 0-7 | PreloadMaskNumber | |
| 5-63 | *Reserved* | |
| 64-111 | PatternMatchingTable (Select and Register Vectors) | |
| 112 | *Reserved* | |
| 448 | PatternMatchingTable (EndOfMask bits) | |
| 449 | *Reserved* | |
| 450 | PacketAvailableButNoContextPriorityPintEnable | |
| 451 | DefaultPacketPriority | |
| 452-453 | ContextSpecificPatternMatchingMask0 | |
| 454-467 | *Reserved* | |
| 468-469 | ContextSpecificPatternMatchingMask1 | |
| 470-483 | *Reserved* | |
| 484-485 | ContextSpecificPatternMatchingMask2 | |
| 486-499 | *Reserved* | |
| 500-501 | ContextSpecificPatternMatchingMask3 | |
| 502-515 | *Reserved* | |
| 516-517 | ContextSpecificPatternMatchingMask4 | |
| 518-531 | *Reserved* | |
| 532-533 | ContextSpecificPatternMatchingMask5 | RTU |
| 534-547 | *Reserved* | |
| 548-549 | ContextSpecificPatternMatchingMask6 | |
| 550-563 | *Reserved* | |
| 564-565 | ContextSpecificPatternMatchingMask7 | |
| 566-579 | *Reserved* | |
| 580 | PacketAvailableButNoContextIntMapping | |
| 581 | StartLoadingRegister | |
| 582 | CodeEntryPointSpecial | |
| 583 | *Reserved* | |
| 584 | CodeEntryPoint0 | |
| 585 | CodeEntryPoint1 | |
| 586 | CodeEntryPoint2 | |
| 587 | CodeEntryPoint3 | |
| 588 | CodeEntryPoint4 | |
| 589 | CodeEntryPoint5 | |
| 590 | CodeEntryPoint6 | |
| 591 | CodeEntryPoint7 | |
| 592 | CodeEntryPoint8 | |
| 593 | CodeEntryPoint9 | |
| 594 | CodeEntryPoint10 | |
| 595 | CodeEntryPoint11 | |
| 596 | CodeEntryPoint12 | |

*Fig.19a*

| | | |
|---|---|---|
| 597 | CodeEntryPoint13 | |
| 598 | CodeEntryPoint14 | |
| 599 | CodeEntryPoint15 | |
| 600 | CodeEntryPoint16 | |
| 601 | CodeEntryPoint17 | |
| 602 | CodeEntryPoint18 | |
| 603 | CodeEntryPoint19 | |
| 604 | CodeEntryPoint20 | |
| 605 | CodeEntryPoint21 | |
| 606 | CodeEntryPoint22 | |
| 607 | CodeEntryPoint23 | |
| 608 | CodeEntryPoint24 | |
| 609 | CodeEntryPoint25 | |
| 610 | CodeEntryPoint26 | |
| 611 | CodeEntryPoint27 | |
| 612 | CodeEntryPoint28 | |
| 613 | CodeEntryPoint29 | |
| 614 | CodeEntryPoint30 | |
| 615 | CodeEntryPoint31 | |
| 616-767 | *Reserved* | |
| 768 | Log2InputQueues | |
| 769 | HeaderGrowthOffset | |
| 770 | TailGrowthOffset | |
| 771 | PacketErrorIntEnable | |
| 772 | AutomaticPacketDropIntEnable | |
| 773 | *reserved* | |
| 774 | TimeStampEnable | |
| 775-776 | VirtualPageEnable | |
| 777-778 | *Reserved* | |
| 779 | OverflowAddress | PMMU |
| 780 | IntIfNoMoreXsizePages | |
| 781 | FirstInputQueue | |
| 782 | OverflowEnable | |
| 783 | SizeOfOverflowedPacket | |
| 784 | SoftwareOwned | |
| 785-786 | TimeCounter | |
| 787 | ClearError0 | |
| 788 | ClearError1 | |
| 789-799 | *Reserved* | |
| 800-815 | MaxActivePackets | |
| 816-927 | *Reserved* | QS |
| 928 | IntIfLessThanXpacketIdEntries | |
| 929 | PriorityClustering | |

*Fig. 19b*

| 930-959 | Reserved | |
|---|---|---|
| 960 | Freeze | |
| 961 | Reset | |
| 962 | StatusRegister | |
| 963 | BypassHooks | CU |
| 964 | InternalStateWrite | |
| 965 | InternalStateRead | |
| 963-1023 | Reserved | |

*Fig. 19c*

PreloadMaskNumber Configuration Register

| Block | Command | Operand Fields | Position in Data |
|---|---|---|---|
| PMMU | 0: GetSpace | Size | 15..0 |
| | 1: FreeSpace | PacketPage | 15..0 |
| QS | 0: InsertPacket | PacketPage | 23..8 |
| | | QueueNumber | 4..0 |
| | 1: ProbePacket | PacketNumber | 7..0 |
| | | Set | 8 |
| | 2: ExtractPacket | PacketNumber | 7..0 |
| | 3: CompletePacket | PacketNumber | 7..0 |
| | | Delta | 17..8 |
| | | DeviceId | 19..18 |
| | | CRCtype | 21..20 |
| | | KeepSpace | 22 |
| | 4: UpdatePacket | PacketNumber | 7..0 |
| | | PacketPage | 23..8 |
| | 5: MovePacket | PacketNumber | 7..0 |
| | | NewQueueNumber | 12..8 |
| | | Reactivate | 13 |
| | 6: ProbeQueue | QueueNumber | 4..0 |
| | 7: ConditionalActivate | PacketNumber | 7..0 |
| RTU | 0: GetContext | N/A | N/A |
| | 1: ReleaseContext | N/A | N/A |
| | 2: MaskedLoad | MaskNumber | 4..0 |
| | | StartRegisterNumber | 9..5 |
| | | PhysicalAddress | 45..10 |
| | 3: MaskedStore | MaskNumber | 4..0 |
| | | StartRegisterNumber | 9..5 |
| | | PhysicalAddress | 45..10 |

*Fig. 28*

| Block | Response To Command | Response Fields | Position in Data |
|---|---|---|---|
| PMMU | GetSpace | PacketPage | 15..0 |
| | | Success | 16 |
| QSY | InsertPacket | Success | 0 |
| | | PacketNumber | 8..1 |
| | ProbePacket, ProbeAndSet | Exists | 0 |
| | | Completed | 1 |
| | | NextQueue | 6..2 |
| | | PacketPage | 22..7 |
| | | DeviceId | 23 |
| | | CRCtype | 25..24 |
| | | Active | 26 |
| | | Probed | 27 |
| | | KeepSpace | 28 |
| | ProbeQueue | QueueSize | 8..0 |
| | ConditionalActivate | Success | 0 |

*Fig. 29*

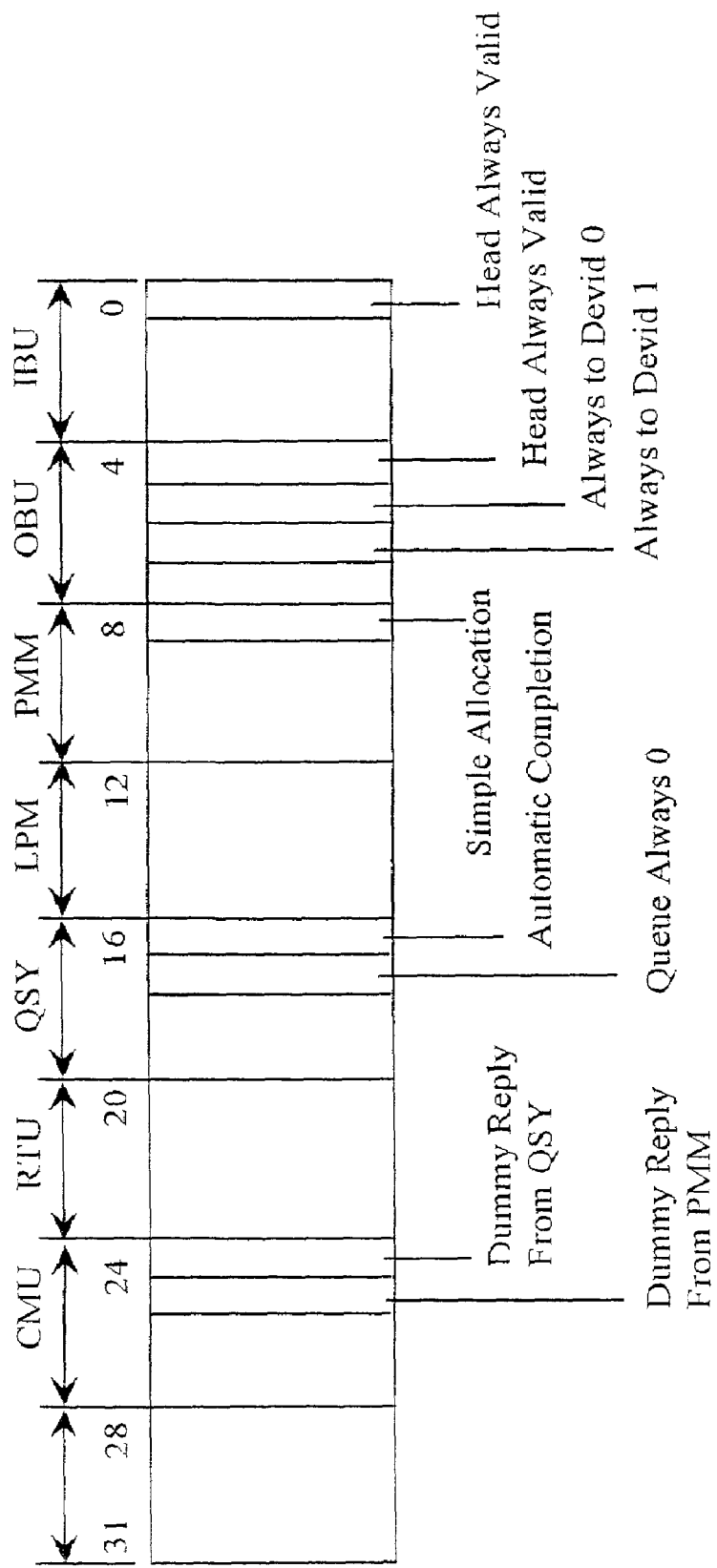
Fig. 32 ByPassHooks Configuration Register

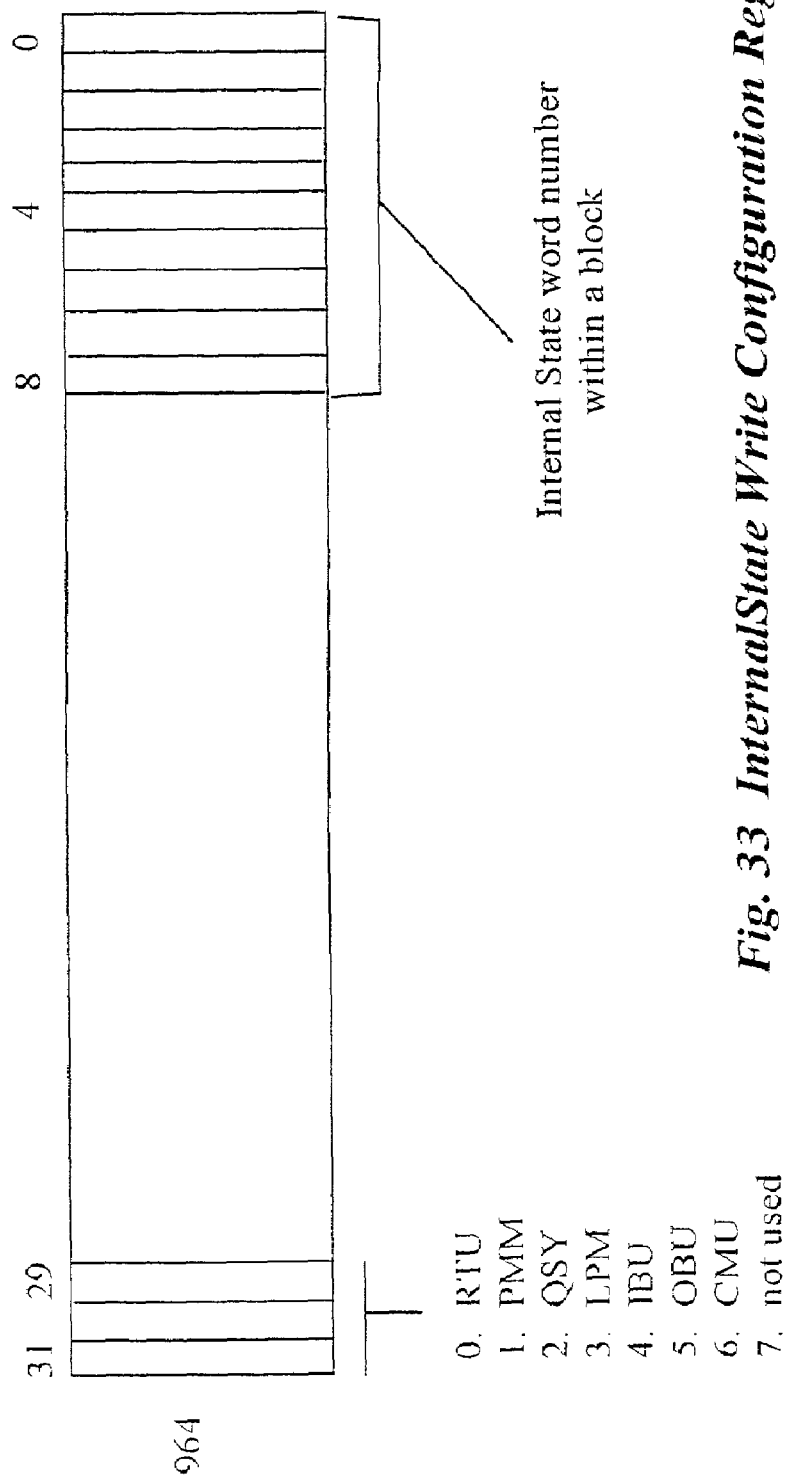
Fig. 33 InternalState Write Configuration Register

| Block | Event# | Event Name | Event Data | Event Description |
|---|---|---|---|---|
| IB | 0 | *Insert* | *FreeBufferEntries (3)* | A 16-byte chunk of packet data is inserted at the tail of the IB. The event data is the number of free entries in this buffer before the insertion. |
| OB | 1 | *Insert0* | *FreeBufferEntries0 (3)* | A 16-byte chunk of packet data is inserted at the tail of the OB (device identifier 0). The event data is the number of free entries in this buffer before the insertion. |
| | 2 | *Insert1* | *FreeBufferEntries1 (3)* | A 16-byte chunk of packet data is inserted at the tail of the OB (device identifier 0). The event data is the number of free entries in this buffer before the insertion. |
| PMMU | 3 | *PacketAllocSuccess0* | *PacketSize (16)* | The PMMU successfully allocates a consecutive space in block 0 of the LPM for a packet of *PacketSize* bytes coming from the network input interface. |
| | 4 | *PacketAllocSuccess1* | *PacketSize (16)* | The PMMU successfully allocates a consecutive space in block 1 of the LPM for a packet of *PacketSize* bytes coming from the network input interface. |
| | 5 | *PacketAllocSuccess2* | *PacketSize (16)* | The PMMU successfully allocates a consecutive space in block 2 of the LPM for a packet of *PacketSize* bytes coming from the network input interface. |
| | 6 | *PacketAllocSuccess3* | *PacketSize (16)* | The PMMU successfully allocates a consecutive space in block 3 of the LPM for a packet of *PacketSize* bytes coming from the network input interface. |

*Fig. 34*

| | | | | |
|---|---|---|---|---|
| P M M U | 7 | *PacketAllocFail* | *LPMfreeWords (16)* | The PMMU failed in allocating space in the LPM for a packet coming from the network input interface. The event data is the total number of words (4 bytes) free in the LPM. |
| | 8 | *PacketAllocFail* | *PacketSize (16)* | The PMMU failed in allocating space in the LPM for a packet of *PacketSize* bytes coming from the network input interface. |
| | 9 | *PacketAllocFailDrop* | *PacketSize (16)* | The PMMU failed in allocating space in the LPM for a packet of *PacketSize* bytes coming from the network input interface; the packet is dropped. |
| | 10 | *PacketAllocFailOverflow* | *PacketSize (16)* | The PMMU failed in allocating space in the LPM for a packet of *PacketSize* bytes coming from the network input interface; the packet is overflowed. |
| | 11 | *Alloc256Fail0* | *Block0FreeBytes (16)* | The allocation of a packet of 2-255 bytes failed in block 0 of LPM. |
| | 12 | *Alloc256Fail1* | *Block1FreeBytes (16)* | The allocation of a packet of 2-255 bytes failed in block 1 of LPM. |
| | 13 | *Alloc256Fail2* | *Block2FreeBytes (16)* | The allocation of a packet of 2-255 bytes failed in block 2 of LPM. |
| | 14 | *Alloc256Fail3* | *Block3FreeBytes (16)* | The allocation of a packet of 2-255 bytes failed in block 3 of LPM. |
| | 15 | *Alloc512Fail0* | *Block0FreeBytes (16)* | The allocation of a packet of 256-511 bytes failed in block 0 of LPM. |
| | 16 | *Alloc512Fail1* | *Block1FreeBytes (16)* | The allocation of a packet of 256-511 bytes failed in block 1 of LPM. |
| | 17 | *Alloc512Fail2* | *Block2FreeBytes (16)* | The allocation of a packet of 256-511 bytes failed in block 2 of LPM. |

*Fig. 35*

|     | 18 | Alloc512Fail3 | Block3FreeBytes (16) | The allocation of a packet of 256-511 bytes failed in block 3 of LPM. |
|---|---|---|---|---|
|     | 19 | Alloc1KFail0 | Block0FreeBytes (16) | The allocation of a packet of 512-1023 bytes failed in block 0 of LPM. |
|     | 20 | Alloc1KFail1 | Block1FreeBytes (16) | The allocation of a packet of 512-1023 bytes failed in block 1 of LPM. |
|     | 21 | Alloc1KFail2 | Block2FreeBytes (16) | The allocation of a packet of 512-1023 bytes failed in block 2 of LPM. |
|     | 22 | Alloc1KFail3 | Block3FreeBytes (16) | The allocation of a packet of 512-1023 bytes failed in block 3 of LPM. |
|     | 23 | Alloc2KFail0 | Block0FreeBytes (16) | The allocation of a packet of 1024-2047 bytes failed in block 0 of LPM. |
|     | 24 | Alloc2KFail1 | Block1FreeBytes (16) | The allocation of a packet of 1024-2047 bytes failed in block 0 of LPM. |
| P M M U | 25 | Alloc2KFail2 | Block2FreeBytes (16) | The allocation of a packet of 1024-2047 bytes failed in block 0 of LPM. |
|     | 26 | Alloc2KFail3 | Block3FreeBytes (16) | The allocation of a packet of 1024-2047 bytes failed in block 0 of LPM. |
|     | 27 | Alloc4KFail0 | Block0FreeBytes (16) | The allocation of a packet of 2048-4095 bytes failed in block 0 of LPM. |
|     | 28 | Alloc4KFail1 | Block1FreeBytes (16) | The allocation of a packet of 2048-4095 bytes failed in block 1 of LPM. |
|     | 29 | Alloc4KFail2 | Block2FreeBytes (16) | The allocation of a packet of 2048-4095 bytes failed in block 2 of LPM. |
|     | 30 | Alloc4KFail3 | Block3FreeBytes (16) | The allocation of a packet of 2048-4095 bytes failed in block 3 of LPM. |
|     | 31 | Alloc16KFail0 | Block0FreeBytes (16) | The allocation of a packet of 4096-16383 bytes failed in block 0 of LPM. |
|     | 32 | Alloc16KFail1 | Block1FreeBytes (16) | The allocation of a packet of 4096-16383 bytes failed in block 1 of LPM. |

*Fig. 36*

| | | | | |
|---|---|---|---|---|
| P M M U | 33 | Alloc16KFail2 | Block2FreeBytes (16) | The allocation of a packet of 4096-16383 bytes failed in block 2 of LPM. |
| | 34 | Alloc16KFail3 | Block3FreeBytes (16) | The allocation of a packet of 4096-16383 bytes failed in block 3 of LPM. |
| | 35 | Alloc64KFail0 | Block0FreeBytes (16) | The allocation of a packet of 16384-65535 bytes failed in block 0 of LPM. |
| | 36 | Alloc64KFail1 | Block1FreeBytes (16) | The allocation of a packet of 16384-65535 bytes failed in block 1 of LPM. |
| | 37 | Alloc64KFail2 | Block2FreeBytes (16) | The allocation of a packet of 16384-65535 bytes failed in block 2 of LPM. |
| | 38 | Alloc64KFail3 | Block3FreeBytes (16) | The allocation of a packet of 16384-65535 bytes failed in block 3 of LPM. |
| | 39 | GetSpaceSuccess0 | RequestedSize (16) | The PMMU successfully satisfied in block 0 of LPM a GetSpace() of *RequestedSize* bytes. |
| | 40 | GetSpaceSuccess1 | RequestedSize (16) | The PMMU successfully satisfied in block 1 of LPM a GetSpace() of *RequestedSize* bytes. |
| | 41 | GetSpaceSuccess2 | RequestedSize (16) | The PMMU successfully satisfied in block 2 of LPM a GetSpace() of *RequestedSize* bytes. |
| | 42 | GetSpaceSuccess3 | RequestedSize (16) | The PMMU successfully satisfied in block 3 of LPM a GetSpace() of *RequestedSize* bytes. |
| | 43 | GetSpaceFail | RequestedSize (16) | The PMMU could not satisfy a GetSpace() of *RequestedSize* bytes. |
| | 44 | GetSpaceFail | TotalFreeWords (16) | The PMMU could not satisfy a GetSpace(). The data event is the total number of words (4 bytes) free in the LPM. |
| | 45 | PacketDeallocation0 | Block0FreeBytes (16) | The PMMU de-allocates space in block 0 of the LPM due to a downloading of a packet. The event data is the number of bytes free in the block before the de-allocation occurs. |

*Fig. 37*

| | | | | |
|---|---|---|---|---|
| P M M U | 46 | PacketDeallocation1 | Block1FreeBytes (16) | The PMMU de-allocates space in block 1 of the LPM due to a downloading of a packet. The event data is the number of bytes free in the block before the de-allocation occurs. |
| | 47 | PacketDeallocation2 | Block2FreeBytes (16) | The PMMU de-allocates space in block 2 of the LPM due to a downloading of a packet. The event data is the number of bytes free in the block before the de-allocation occurs. |
| | 48 | PacketDeallocation3 | Block3FreeBytes (16) | The PMMU de-allocates space in block 3 of the LPM due to a downloading of a packet. The event data is the number of bytes free in the block before the de-allocation occurs. |
| Q S | 49 | InsertFromPMMU | FreeEntriesInQS (8) | A packet identifier is inserted from the PMMU into one of the queues. The event data is the number of free entries in the pool of entries before the insertion. |
| | 50 | InsertFromCU | FreeEntriesInQS (8) | A packet identifier is inserted from the CU into one of the queues. The event data is the number of free entries in the pool of entries before the insertion. |
| | 51 | InsertFromQS | FreeEntriesInQS (8) | A packet identifier is inserted from the QS into one of the queues. The event data is the number of free entries in the pool of entries before the insertion. |
| C U | 52 | InsertPMMU | FreePMMUcmdEntries (4) | A command is inserted in the PMMU command queue. The event data is the number of free entries in this queue before the insertion. |
| | 53 | InsertQS | FreeQScmdEntries (4) | A command is inserted in the QS command queue. The event data is the number of free entries in this queue before the insertion. |

*Fig. 38*

| | 54 | *insertRTU* | *FreeRTUcomdEntries (4)* | A command is inserted in the RTU command queue. The event data is the number of free entries in this queue before the insertion. |
|---|---|---|---|---|
| CU | 55 | *ResponseInsert* | *NumOfResponses (1)* | One or two responses are inserted in the response queue. The event data *NumOfResponses* codes how many (0:one, 1:two). |
| RTU | 56 | *Activate* | *NumPMUownedCtx (3)* | A context becomes SPU-owned. The event data is the current number of PMU-owned contexts before the activation. |
| | 57 | *PreloadStarts* | *SIUlatency (8)* | A pre-load of a context starts. The event data is the number of cycles (up to 255) that the RTU waited for the first header data to preload is provided by the SIU. |
| | 58 | *PreloadAccepted* | *NumOfPreloadsWaiting (3)* | A packet identifier is accepted from the QS. The event data is the number of valid entries in the new packet table before the acceptance. |
| | 59 | *CommandWaits* | *CommandWaitCycles (8)* | A command from the CU is ready. The event data is the number of cycles (up to 255) that it waits until it is served. |
| LPM | 60 | *ReadSIU* | *SIUwaitCycles (3)* | The SIU performs a read into the LPM. The event data is the number of cycles (up to 7) that it waits until it can be served. |
| | 61 | *WriteSIU* | *SIUwaitCycles (3)* | The SIU performs a write into the LPM. The event data is the number of cycles (up to 7) that it waits until it can be served. |

Table 1: Events probed for performance counters

*Fig. 39*

| Block | # | Name | Description |
|---|---|---|---|
| IBU | 0 | *HeadAlwaysValid* | The IBU always provides a valid packet. The packet provided is a 16-byte packet, from devide Id 0, with the 3$^{rd}$ byte 0, and byte $i$ ($i=4..15$) to value $i$. |
| OBU | 4 | *HeadAlwaysValid* | The OBU always provides a valid packet. The packet provided is a 16-byte packet, from devide Id 0, with the 3$^{rd}$ byte 0, and byte $i$ ($i=4..15$) to value $i$. |
| | 5 | *AlwaysToDevId0* | The OBU hardwires the outbound device identifier to 0. |
| | 6 | *AlwaysToDevId1* | The OBU hardwires the outbound device identifier to 1. |
| PMM | 8 | *SimpleAllocation* | The PMM performs the following allocation mechanism when receives a new packet:<br>○ 64K bytes (1 full block) are always allocated (i.e. the size of the packet is not taken into account).<br>○ One bit per block indicates whether the block is busy (i.e. it was selected to store a packet). The download of that packet resets the bit.<br>○ If more that non-busy block exists, the block with the smallest index is chosen.<br>○ If no available blocks exist, the packet will be dropped. |
| QSY | 16 | *AutomaticCompletion* | Whenever a packet is inserted into a queue (from the PMM or from the SPU), the Complete bit is automatically asserted. |
| | 17 | *QueueAlways0* | When a packet is inserted (from any source), the queue will always be queue number 0. |
| CMU | 24 | *DummyReplyFromQSY* | Whenever the CMU receives from the SPU a command to the QSY that needs a response back, the CMU generates a dummy response and does not send the command to the QSY.<br>The data associated to the dummy response is 0, and the context number is the same as the one obtained from the SPU. |
| | 25 | *DummyReplyFromPMM* | Whenever the CMU receives from the SPU a command to the QSY that needs a response back, the CMU generates a dummy response and does not send the command to the QSY.<br>The data associated to the dummy response is 0, and the context number is the same as the one obtained from the SPU |

*Fig. 40*

| Architecture block name | Hardware block name |
|---|---|
| IB | IBU0 |
| OB | OBU0 |
| PMMU | PMM0 |
| LPM | LPM0 |
| QS | QSY0 |
| RTU | RTU0 |
| CU | CU0 |

*Fig. 41*

*signals are registered by source block unless otherwise specified.*

| Name | Size | SRC Block | DST Block | Description |
|---|---|---|---|---|
| *Interrupts* | | | | |
| overflowStarted | 1 | pmm0 | exc0 | The PMM block decides to store the incoming packet into the EPM. |
| noMorePagesOfXsize | 1 | pmm0 | exc0 | No more virtual pages of the size indicated in the configuration register IntIfNoMoreXsizePages are available. |
| automaticPacketDrop | 1 | pmm0 | exc0 | The PMM block cannot store the incoming packet into the LPM and the overflow mechanism is disabled. |
| packetError | 1 | pmm0 | exc0 | Asserted in two cases: The actual packet size received from the external device does not match the value specified in the first two bytes of the packet data. Bus error detected while receiving packet data through the network interface or while downloading packet data from EPM. |
| lessThanXpacketIdEntries | 1 | qsy0 | exc0 | Asserted when the actual number of available entries in the QSY block is less than the value in the configuration register IntIfLessThanXpacketIdEntries. |
| packetAvailableButNoContext$P$ | 8 ($P=0..7$) | rtu0 | exc0 | Asserted when a packet identifier is received by the RTU from the QSY but there is no available context. The level of the interrupt ($P$) depends on how the PMU is configured. |
| *Response Generation* | | | | |
| validResponse | 1 | cmu0 | com0 | The CMU has a valid response. |
| responseData | 29 | cmu0 | com0 | The response data. |
| responseContext | 3 | cmu0 | com0 | The context number to which the response will go. |
| *Context Access* | | | | |
| resetContext | 1 | rtu0 | rgf0,rgf1 | All GPR registers in context number contextNumber are set to 0 |
| enableRead0..7 | 8x1 | rtu0 | rgf0,rgf1 | Read port 0..7 of context number contextNumber is enabled. |
| enableWrite0..3 | 4x1 | rtu0 | rgf0,rgf1 | Write port 0..7 of context number contextNumber is enabled. |
| contextNumber | 8 | rtu0 | rgf0,rgf1 | The context number, in 1-hot encoding (LSB bit corresponds to context #0; MSB to context #7) being either read (masked load or pre-load) |

*Fig. 42*

| | | | | The context number, in 1-hot encoding (LSB bit corresponds to context #0; MSB to context #7) being either read (masked load or pre-load) or written (masked store). The contextNumber bus needs to have the correct value at least one cycle before the first enableRead or enableWrite signals, and it needs to be de-asserted at least one cycle before the last enableRead or enableWrite signals. |
|---|---|---|---|---|
| registerToRead0..7 | 8x5 | rtu0 | rgf0,rgf1 | Index of the register(s) to read through read ports 0..7 in context number contextNumber. Validated with the enableRead0..7 signals. |
| registerToWrite0..3 | 4x5 | rtu0 | rgf0,rgf1 | Index of the register(s) to write through write ports 0..3 in context number contextNumber. Validated with the enableWrite0..3 signals. |
| cluster0readData0..7 | 8x32 | rgf0,rgf1 | rtu0 | The contents of the register(s) read through read ports 0..7 in cluster 0. |
| cluster1readData0..7 | 8x32 | rgf0,rgf1 | rtu0 | The contents of the register(s) read through read ports 0..7 in cluster 1. |
| writeData0..3 | 4x32 | rtu0 | rgf0,rgf1 | The contents of the register(s) to write through write port(s) 0..3 into context number contextNumber. |
| *Command Request* | | | | |
| statePMMqueue | 1 | cmu0 | dis0,dis1 | If asserted, it indicates that a command will be accepted into the PMM queue. |
| stateQSYqueue | 1 | cmu0 | dis0,dis1 | If asserted, it indicates that a command will be accepted into the QSY queue. |
| stateRTUqueue | 1 | cmu0 | dis0,dis1 | If asserted, it indicates that a command will be accepted into the RTU queue. |
| validCommandCluster0 | 1 | dis0 | cmu0 | The command being presented by cluster #0 is valid. |
| validCommandCluster1 | 1 | dis1 | cmu0 | The command being presented by cluster #1 is valid. |
| commandContextCluster0 | 2 | dis0 | cmu0 | The context number within cluster #0 associated to the command being presented by this cluster. |
| commandContextCluster1 | 2 | dis1 | cmu0 | The context number within cluster #1 associated to the command being presented by this cluster. |
| commandTypeCluster0 | 2 | dis0 | cmu0 | The type of command being presented by cluster #0 (0:RTU, 1:PMMU, 2:QS). |
| commandTypeCluster1 | 2 | dis1 | cmu0 | The type of command being presented by cluster #1 (0:RTU, 1:PMMU, 2:QS). |
| commandOpcodeCluster0 | 3 | dis0 | cmu0 | The opcode of the command being presented by cluster #0 |
| commandOpcodeCluster1 | 3 | dis1 | cmu0 | The opcode of the command being presented by cluster #1. |
| commandDataCluster0 | 46 | dis0 | cmu0 | The command data presented by cluster #0 |

*Fig. 43*

| | | | | |
|---|---|---|---|---|
| commandDataCluster1 | 46 | dis1 | cmu0 | The command data presented by cluster #1. |
| *Context Unstall* | | | | |
| unstallContext | 1 | rtu0 | cp00 | The masked load/store or get context operation performed on context number unstalledContextNum has finished. In case of a get context operation, the misc bus contains the number of the selected context in the 3 LSB bits, and the success outcome in the MSB bit. |
| preload | 1 | rtu0 | cp00 | A pre-load is either going to start (bornContext de-asserted) or has finished (bornContext asserted) on context number unstalledContextNum. The misc bus contains the queue number associated to the packet. If the preload starts and finishes in the same cycle, unstallContext, preload and bornContext are asserted. |
| bornContext | 1 | rtu0 | cp00 | If asserted, the operation performed on context number unstallContextNum is a get context or the end of a pre-load; otherwise it is a masked load/store or the beginning of a pre-load. |
| unstallContextNum | 3 | rtu0 | cp00 | For pre-loads (start or end) it contains the context number of the context selected by the RTU. For get context and masked load/stores, it contains the context number of the context associated to the stream that dispatched the command to the PMU (the RTU receives this context number through the CMU command interface). |
| misc | 30 | rtu0 | cp00 | In case of a pre-load (start or end), it contains the 30-bit code entry point associated to the queue in which the packet resides. In case of a get context operation, the 3 LSB bits contain the selected context number by the RTU, and the MSB bit contains the success bit (whether an available context was found). |

| unstallContext | preload | bornContext | Action |
|---|---|---|---|
| 0 | 0 | 0 | No operation |
| 0 | 0 | 1 | Never |

*Fig. 44*

| 0 | 1 | 0 | Preload starts |
| 0 | 1 | 1 | Preload ends |
| 1 | 0 | 0 | Masked Load/Store ends |
| 1 | 0 | 1 | GetCtx ends |
| 1 | 1 | 0 | Never |
| 1 | 1 | 1 | Preload starts and ends in same cycle |

*Fig. 45*

*Signals are registered by source block unless otherwise specified.*

| Name | Size | SRC Block | DST Block | Description |
|---|---|---|---|---|
| *Network Interface In to the In-Buffer* | | | | |
| dataValue | 128 | nip0 | ibu0 | 16B of data |
| validBytes | 4 | nip0 | ibu0 | Pointer to the MSB valid byte within dataValue |
| validData | 1 | nip0 | ibu0 | If asserted, at least one byte in dataValue is valid, and validBytes points to the MSB valid byte |
| rxDevID | 1 | nip0 | ibu0 | Device ID of the transmitting device |
| error | 1 | nip0 | ibu0 | Error detected in the current transaction |
| endOfPacket | 1 | nip0 | ibu0 | The current transfer is the last one of the packet |
| full | 1 | ibu0 | nip0 | The buffer in the IBU block is full and it will not accept any more transfers |
| *Network Interface Out from the Out-Buffer* *(TBD: should the interface be duplicated for each outbound device Id ?)* | | | | |
| dataValue | 128 | obu0 | nop0 | 16B of data |
| validBytes | 4 | obu0 | nop0 | Pointer to the MSB (if pattern == 0) or to the LSB (if pattern == 1) valid byte in dataValue |
| pattern | 1 | obu0 | nop0 | If pattern == 1 && valid == 0, then no valid bytes. If pattern == 0 && valid == 15, then all 16 bytes are valid |
| txDevID | 1 | obu0 | nop0 | Device ID of the receiving device |
| err | 1 | obu0 | nop0 | Error detected in the current transaction |
| ready | 4 | nop0 | obu0 | Receiving device is ready to accept more data |
| *Overflow Interface to Memory* | | | | |
| dataValue | 128 | ibu0 | ovl0 | 16B of data |
| overflowStoreRequest | 1 | pmm0 | ovl0 | Initiate an overflow store operation |
| overflowPageOffset | 16 | pmm0 | ovl0 | Offset of the 256B atomic page in the external packet memory |
| overflowLineOffset | 4 | pmm0 | ovl0 | Offset of the first line in the atomic page |
| extract | 1 | ovl0 | ibu0 | Extract the next data from the buffer in the IBU |
| doneStore | 1 | ovl0 | pmm0 | The overflow operation is complete |
| validBytes | 4 | ibu0 | ovl0 | Pointer to the MSB valid byte within dataValue |
| validData | 1 | ibu0 | ovl0 | If asserted, at least one byte in dataValue is valid, and validBytes |

*Fig. 46*

|  |  |  |  | points to the MSB valid byte |
|---|---|---|---|---|
| rxDevID | 1 | ibu0 | ovl0 | Device ID of the transmitting device |
| error | 1 | ibu0 | ovl0 | Error detected in the current transaction |
| endOfTransaction | 1 | ibu0 | ovl0 | The current transfer is the last one of the transaction |
| packetSizeMismatch | 1 | ovl0 | pmm0 | The SIU detects a packet size mismatch while overflowing a packet. |
| *Overflow Interface from Memory* | | | | |
| dataValue | 128 | ovl0 | obu0 | 16B of data |
| validBytes | 4 | ovl0 | obu0 | Pointer to the MSB (if pattern == 0) or to the LSB (if pattern == 1) valid byte in dataValue |
| pattern | 1 | ovl0 | obu0 | If pattern == 1 && valid == 0, then no valid bytes. If pattern == 0 && valid == 15, then all 16 bytes are valid |
| overflowRetrieveRequest | 1 | pmm0 | ovl0 | Initiate an overflow retrieve operation |
| overflowPageOffset | 16 | pmm0 | ovl0 | Offset of the 256B atomic page in the external packet memory |
| overflowLineOffset | 4 | pmm0 | ovl0 | Offset of the first line in the atomic page to be used |
| sizePointer | 4 | pmm0 | ovl0 | Offset of the byte in the line that contains the LSB byte of the size of the packet |
| doneRetrieve | 1 | ovl0 | pmm0 | The overflow operation is complete |
| full0 | 1 | obu0 | ovl0 | The buffer in the OBU block associated to outbound device identifier 0 is full |
| full1 | 1 | obu0 | ovl0 | The buffer in the OBU block associated to outbound device identifier 1 is full |
| error | 1 | ovl0 | obu0,pmm0 | Error detected on the bus as packet was being transferred to outbound device identifier txDevID |
| txDevID | 1 | pmm0 | ovl0 | The outbound device identifier |
| *Local Packet Memory Interface (SPU)* | | | | |
| dataValue | 128 | lmc0 | lpm0 | 16B of data |
| dataValue | 128 | lpm0 | lmc0 | 16B of data |
| read | 1 | lmc0 | lpm0 | Read request. If read is asserted, write should be de-asserted |
| write | 1 | lmc0 | lpm0 | Write request. If write is asserted, read should be de-asserted. When write is asserted, the data to be written should be available in dataValue |
| dataControlSelect | 1 | lmc0 | lpm0 | If asserted, it validates the read or |

*Fig. 47*

| | | | | write access |
|---|---|---|---|---|
| lineAddress | 14 | lmc0 | lpm0 | Line number within the LPM to read or write |
| valid | 1 | lpm0 | lmc0 | Access to the memory port (for read or write) is granted |
| *Local Packet Memory/Memory Bus Interface (RTU)* | | | | |
| dataValue | 128 | lmc0 | rtu0 | 16B of data |
| dataValue | 128 | rtu0 | lmc0 | 16B of data |
| read | 1 | rtu0 | lmc0 | Read request. Asserted once (numLines has the total number of 16-byte lines to read) |
| write | 1 | rtu0 | lmc0 | Write request. Asserted on a per-line basis. When asserted, dataValue from RTU should have data to be written |
| lineAddress | 14/32 | rtu0 | lmc0 | Line to initiate access from or to |
| numLines | 4 | rtu0 | lmc0 | Number of lines to read. If numLines == X, then X+1 lines are requested |
| valid | 1 | lmc0 | rtu0 | Access to the operation is granted |
| backgndStream | 1 | rtu0 | lmc0 | Background operation implying only the 14 LSB bits of the line address are used, or streaming operation implying all 32 bits are used |
| byteEnables | 16 | rtu0 | lmc0 | Byte enables. Used only for writing. For reading, byteEnables are 0xFFFF (i.e. all bytes within the all the requested lines are read) |
| *SPU Command Interface through the CMU* | | | | |
| read | 1 | lmc0 | cmu0 | Read request. If read is asserted, write should be de-asserted |
| write | 1 | lmc0 | cmu0 | Write request. If write is asserted, read should be de-asserted |
| dataValue | 32 | lmc0 | cmu0 | 4B of data |
| dataValue | 32 | cmu0 | lmc0 | 4B of data |
| dataControlSelect | 1 | lmc0 | cmu0 | If de-asserted, it validates the read or write access |
| lineAddress | 7 | lmc0 | cmu0 | Address of the configuration register |
| valid | 1 | cmu0 | lmc0 | CMU notifies that dataValue is ready |
| *Performance Counters Interface through the CMU* | | | | |
| eventA | 6 | ???? | cmu0 | One of the two events (A) requested to be monitored |
| eventB | 6 | ???? | cmu0 | One of the two events (B) requested to be monitored |
| eventDataA | 16 | cmu0 | ???? | The data associated to event A, if any. This value is meaningful when the corresponding bit in the eventVector is asserted. |

*Fig. 48*

| eventDataB | 16 | cmu0 | ???? | The data associated to event B, if any. This value is meaningful when the corresponding bit in the eventVector is asserted. |
|---|---|---|---|---|
| eventVector | 64 | cmu0 | ???? | The event vector (1 bit per event). LSB bit corresponds to event# 0, MSB bit corresponds to event# 63. |
| *On –Chip Instrumentation (OCI) Interface through the CMU* | | | | |
| (TBD) | | | | |

*Fig. 49*

METHOD AND APPARATUS FOR NON-SPECULATIVE PRE-FETCH OPERATION IN DATA PACKET PROCESSING

CROSS-REFERENCE TO RELATED DOCUMENTS

This application is a continuation of U.S. application Ser. No. 09/900,393, filed Jul. 5, 2001, now U.S. Pat. No. 7,042,887, which is a continuation in part (CIP) of U.S. application Ser. No. 09/737,375, filed Dec. 14, 2000, now U.S. Pat. No. 7,058,064, which is included herein in it's entirety by reference. In addition, application Ser. No. 09/737,375 claims priority benefit under 35 U.S.C. 119(e) of Provisional Patent Application Ser. No. 60/181,364 filed on Feb. 8, 2000, and incorporates all disclosure of the prior applications by reference.

FIELD OF THE INVENTION

The present invention is in the field of digital processing and pertains to apparatus and methods for processing packets in routers for packet networks, and more particularly to apparatus and methods for enabling a non-speculative pre-fetch operation associated with fetching processing instruction during packet processing.

BACKGROUND OF THE INVENTION

The well-known Internet network is a notoriously well-known publicly-accessible communication network at the time of filing the present patent application, and arguably the most robust information and communication source ever made available. The Internet is used as a prime example in the present application of a data-packet-network which will benefit from the apparatus and methods taught in the present patent application, but is just one such network, following a particular standardized protocol. As is also very well known, the Internet (and related networks) are always a work in progress. That is, many researchers and developers are competing at all times to provide new and better apparatus and methods, including software, for enhancing the operation of such networks.

In general the most sought-after improvements in data packet networks are those that provide higher speed in routing (more packets per unit time) and better reliability and fidelity in messaging. What is generally needed are router apparatus and methods increasing the rates at which packets may be processed in a router.

As is well-known in the art, packet routers are computerized machines wherein data packets are received at any one or more of typically multiple ports, processed in some fashion, and sent out at the same or other ports of the router to continue on to downstream destinations. As an example of such computerized operations, keeping in mind that the Internet is a vast interconnected network of individual routers, individual routers have to keep track of which external routers to which they are connected by communication ports, and of which of alternate routes through the network are the best routes for incoming packets. Individual routers must also accomplish flow accounting, with a flow generally meaning a stream of packets with a common source and end destination. A general desire is that individual flows follow a common path. The skilled artisan will be aware of many such requirements for computerized processing.

Typically a router in the Internet network will have one or more Central Processing Units (CPUs) as dedicated microprocessors for accomplishing the many computing tasks required. In the current art at the time of the present application, these are single-streaming processors; that is, each processor is capable of processing a single stream of instructions. In some cases developers are applying multiprocessor technology to such routing operations. The present inventors have been involved for some time in development of dynamic multistreaming (DMS) processors, which processors are capable of simultaneously processing multiple instruction streams. One preferred application for such processors is in the processing of packets in packet networks like the Internet.

In a data-packet processor, a configurable queuing system for packet accounting during processing is known to the inventor. The queuing and accounting system has a plurality of queues arranged in one or more clusters, an identification mechanism for creating a packet identifier for arriving packets, insertion logic for inserting packet identifiers into queues and for determining into which queue to insert a packet identifier, and selection logic for selecting packet identifiers from queues to initiate processing of identified packets, downloading of completed packets, or for re-queuing of the selected packet identifiers.

One aspect of the above-described queuing system involves selecting and preloading contexts with packet information for processing and notifying a processing component of the activation of the context so that the processor may fetch an instruction thread or threads to begin and complete the processing. Such an operation is typically called an instruction fetch, or simply a FETCH operation in programming language.

In some prior-art processors, there is a pre-fetch operation known wherein the processor pre-fetches an instruction thread or threads that will "most likely" be required for the processing. Determination for which thread or threads to select is speculative in this prior-art case, and in some cases, the selected instruction is not the correct instruction for the processing of the packet for which it was fetched. The desire to enable such pre-fetch operations stems from an overall goal of improving the speed of processing for processors in general. If, in the case of a packet processor, which is preferred application for the present invention, the instructions can be fetched while packet preparation operations are simultaneously being performed, then the number of cycles required to initiate and complete processing of a packet can be reduced. Over multitudes of data packets being processed, this reduction can be significant.

The problem in the prior-art is that the identification and selection of instructions during a pre-fetch is speculative, meaning that not enough information is available at the desired point in time where a pre-fetch operation would be beneficial. Therefore, the pre-fetch operation is speculative in nature and not reliable in many instances. Logically then, the number of cycles required to process a data packet can be increased over what would normally be the case if a speculative pre-fetch returns incorrect instructions and must then be repeated.

What is clearly needed is a method and apparatus that enables a non-speculative pre-fetch operation wherein correctness of the fetched instruction or instructions is assured. Such a system would further provide reduction of cycles required for packet processing and increase processor performance by freeing up other resources for other operations.

SUMMARY OF THE INVENTION

In a preferred embodiment of the present invention, in a data-packet processor, a system for non-speculative pre-fetching is provided, comprising a processing unit having a first portion for processing the data packets, using instruction threads specific to packet type, and a second portion comprising a pool of context registers and functional units for processing, a packet-management unit (PMU) for managing data packets of different types received for processing, including selecting and loading the context registers, a memory storing at least an initial instruction of instruction threads, and a table equating packet types with pointers to memory locations for the at least first instructions of instruction threads specific to the packet types. The system is characterized in that the PMU selects a context from the pool of contexts for processing of a data packet, the table is consulted for the pointer, and the pointer is provided to the processing unit first portion, enabling the processing unit first portion to prefetch at least an initial instruction for the packet to be processed at least partially in parallel with loading of the context.

In some embodiments the second portion of the processing unit comprises separate clusters, each cluster comprising contexts and functional units. Also in some embodiments the table is in the PMU. The processor may be a dynamic multi-streaming processor. Also in preferred embodiments the memory holding at least a first instruction of the instruction threads is an on-chip instruction cache memory, while in others the memory holding at least a first instruction of the instruction threads is an off-chip memory.

In some cases data packets to be processed are stored in queues according to instruction threads required to process the packets, and the queue from which a packet arrives for processing indicates the packet type.

In another aspect of the invention, in a data-packet processor having a first portion for processing data packets, using instruction threads specific to packet type, and a second portion comprising a pool of context registers and functional units for processing, a method for accomplishing pre-fetch of at least a first instruction for processing is provided, comprising steps of (a) selecting, by a packet-management unit (PMU), an available context for loading information for processing a packet ready for processing; (b) consulting a table relating packet type for the packet ready to be processed to a pointer to a memory location for at least a first instruction of an instruction thread to process the packet; (c) providing the pointer to the first portion; and (d) pre-fetching the at least first instruction of the thread to process the data packet, at least partially in parallel with loading the context.

In some preferred embodiments of the method the second portion of the processing unit comprises separate clusters, each cluster comprising contexts and functional units. Also in some preferred embodiments the table is in the PMU. The processor may be a dynamic multi-streaming processor. Also in preferred embodiments the memory holding at least a first instruction of the instruction threads is an on-chip instruction cache memory, while in some other the memory holding at least a first instruction of the instruction threads is an off-chip memory. In preferred embodiments as well, data packets to be processed are stored in queues according to instruction threads required to process the packets, and wherein the queue from which a packet arrives for processing indicates the packet type.

In embodiments of the invention described in enabling detail below, for the first time a system and method is provided, useful with dynamic multi-streaming processors and others, that provides for a non-speculative pre-fetch of instruction threads.

BRIEF DESCRIPTION OF THE DRAWINGS

FIGS. 5a and 5b illustrate an example of how atomic pages are allocated in an embodiment of the present invention.

FIG. 10 is a table illustrating six different modes in an embodiment of the invention into which the QS can be configured.

FIG. 11 is a diagram illustrating generic architecture of the QS of FIGS. 2 and 7 in an embodiment of the present invention.

FIG. 12 is a table indicating coding of the outbound DeviceId field in an embodiment of the invention.

FIG. 13 is a table illustrating priority mapping for RTU transfers in an embodiment of the invention.

FIG. 14 is a table showing allowed combinations of Active, Completed, and Probed bits for a valid packet in an embodiment of the invention.

FIGS. 19a, 19b and 19c are a table of Configuration register Mapping.

FIG. 28 is a table showing the format of command inserted in command queues in an embodiment of the present invention.

FIG. 29 is a table showing the format for responses that different blocks generate back to the CU in an embodiment of the invention.

FIG. 32 is a diagram of a BypassHooks configuration register in an embodiment of the invention.

FIG. 33 is a diagram of an InternalStateWrite configuration register in an embodiment of the invention.

FIGS. 34-39 comprise a table listing events related to performance counters in an embodiment of the invention.

FIG. 40 is a table illustrating the different bypass hooks implemented in the PMU in an embodiment of the invention.

FIG. 41 is a table relating architecture and hardware blocks in an embodiment of the present invention.

FIGS. 42-45 comprise a table showing SPU-PMU Interface in an embodiment of the invention.

FIGS. 46-49 comprise a table showing SIU-PMU Interface in an embodiment of the invention.

DESCRIPTION OF THE PREFERRED EMBODIMENTS

In the provisional patent application Ser. No. 60/181,364 referenced above there is disclosure as to the architecture of a DMS processor, termed by the inventors the XCaliber processor, which is dedicated to packet processing in packet networks. Two extensive diagrams are provided in the referenced disclosure, one, labeled NIO Block Diagram, shows the overall architecture of the XCaliber processor, with input and output ports to and from a packet-handling ASIC, and the other illustrates numerous aspects of the Generic Queue shown in the NIO diagram. The NIO system in the priority document equates to the Packet Management Unit (PMU) in the present specification. It is to the several aspects of the generic queue that the present application is directed.

Figure 1:
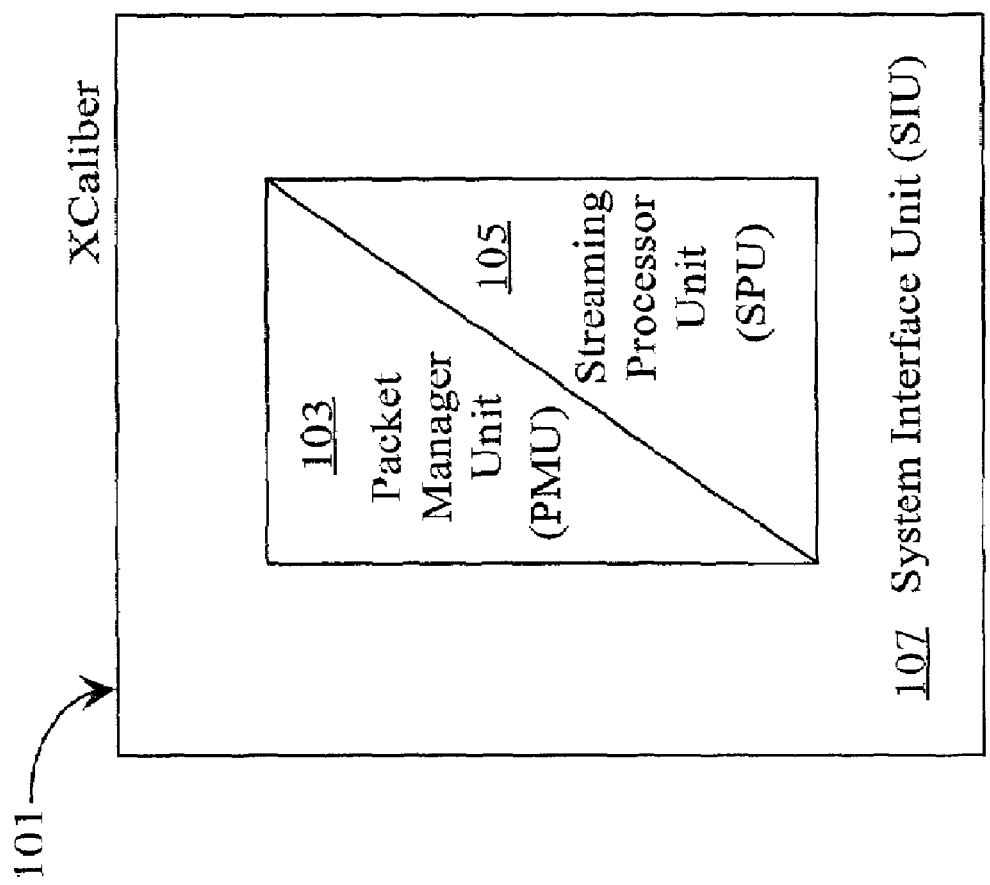
FIG. 1 is a simplified block diagram showing relationship of functional areas of a DMS processor in a preferred embodiment of the present invention.

FIG. 1 is a simplified block diagram of an XCaliber DMS processor 101 with a higher-level subdivision of functional units than that shown in the NIO diagram of the priority document. In FIG. 1 XCaliber DMS processor 101 is shown as organized into three functional areas. An outside System Interface Unit (SIU) area 107 provides communication with outside devices, that is, external to the XCaliber processor, typically for receiving and sending packets. Inside, processor 101 is divided into two broad functional units, a Packet Management Unit (PMU) 103, equating to the NIO system in the priority document mentioned above, and a Stream Processor Unit (SPU) 107. The functions of the PMU include accounting for and managing all packets received and processed. The SPU is responsible for all computational tasks.

The PMU is a part of the XCaliber processor that offloads the SPU from performing costly packet header accesses and packet sorting and management tasks, which would otherwise seriously degrade performance of the overall processor.

Packet management is achieved by (a) Managing on-chip memory allocated for packet storage, (b) Uploading, in the background, packet header information from incoming packets into different contexts (context registers, described further below) of the XCaliber processor, (c) Maintaining, in a flexible queuing system, packet identifiers of the packets currently in process in the XCaliber.

The described packet management and accounting tasks performed by the PMU are performed in parallel with processing of packets by the SPU core. To implement this functionality, the PMU has a set of hardware structures to buffer packets incoming from the network, provide them to the SPU core and, if needed, send them out to the network when the processing is completed. The PMU features a high degree of programmability of several of its functions, such as configuration of its internal packet memory storage and a queuing system, which is a focus of the present patent application.

Figure 2:
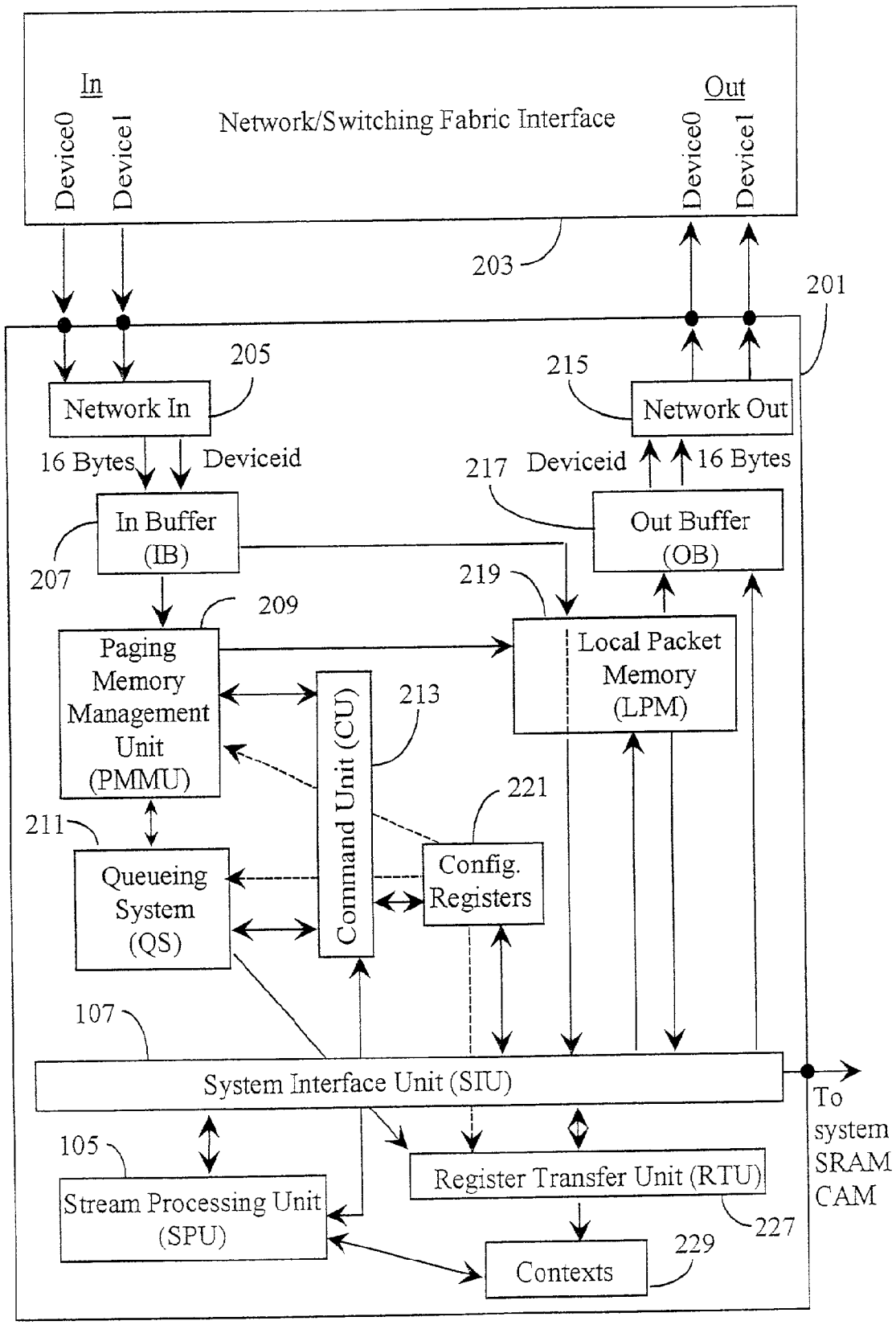
FIG. 2 is a block diagram of the DMS processor of FIG. 1 showing additional detail.

FIG. 2 is a block diagram of the XCaliber processor of FIG. 1 showing additional detail. SIU 107 and SPU 105 are shown in FIG. 2 as single blocks with the same element numbers used in FIG. 1. The PMU is shown in considerably expanded detail, however, with communication lines shown between elements.

In FIG. 2 there is shown a Network/Switching Fabric Interface 203 which is in some cases an Application Specific Integrated Circuit (ASIC) dedicated for interfacing directly to a network, such as the Internet for example, or to switching fabric in a packet router, for example, receiving and transmitting packets, and transacting the packets with the XCaliber processor. In this particular instance there are two in ports and two out ports communicating with processor 201. Network in and out interface circuitry 205 and 215 handle packet traffic onto and off the processor, and these two interfaces are properly a part of SIU 107, although they are shown separately in FIG. 2 for convenience.

Also at the network interface within the PMU there are, in processor 201, input and output buffers 207 and 217 which serve to buffer the flow of packets into and out of processor 201.

Referring again to FIG. 1, there is shown a Packet Management Unit (PMU) 103, which has been described as a unit that offloads the requirement for packet management and accounting from the Stream Processing Unit. This is in particular the unit that has been expanded in FIG. 2, and consists substantially of Input Buffer (IB) 207, Output Buffer (OB) 217, Paging Memory Management Unit (PMMU) 209, Local Packet Memory (LPM) 219, Command Unit (CU) 213, Queueing System (QS) 211, Configuration Registers 221, and Register Transfer Unit (RTU) 227. The communication paths between elements of the PMU are indicated by arrows in FIG. 2, and further description of the elements of the PMU is provided below, including especially QS 211, which is a particular focus of the present patent application.

Overview of PMU

Again, FIG. 2 shows the elements of the PMU, which are identified briefly above. Packets arrive to the PMU in the present example through a 16-byte network input interface.

In this embodiment packet data arrives to the PMU at a rate of 20 Gbps (max). At an operating speed of 300 MHz XCaliber core frequency, an average of 8 bytes of packet data are received every XCaliber core cycle. The incoming data from the network input interface is buffered in InBuffer (IB) block 207. Network interface 205 within XCaliber has the capability of appending to the packet itself the size of the packet being sent, in the event that the external device has not been able to append the size to the packet before sending the packet. Up to 2 devices can send packet data to XCaliber at (10 Gbps per device), and two in ports are shown from an attached ASIC. It is to be understood that the existence and use of the particular ASIC is exemplary, and packets could be received from other devices. Further, there may be in some embodiments more or fewer than the two in ports indicated.

Packet Memory Manager Unit (PMMU) 209 decides whether each incoming packet has to be stored into on-chip Local Packet Memory (LPM) 219, or, in the case that, for example, no space exists in the LPM to store it, may decide to either send the packet out to an External Packet Memory (EPM) not shown through the SIU block, or may decide to drop the packet. In case the packet is to be stored in the LPM, the PMMU decides where to store the packet and generates all the addresses needed to do so. The addresses generated correspond in a preferred embodiment to 16-byte lines in the LPM, and the packet is consecutively stored in this memory.

In the (most likely) case that the PMMU does not drop the incoming packet, a packet identifier is created, which includes a pointer (named packetPage) to a fixed-size page in packet memory where the packet has started to be stored. The identifier is created and enqueued into Queuing System (QS) block 211. The QS assigns a number from 0 to 255 (named packetNumber) to each new packet. The QS sorts the identifiers of the packets alive in XCaliber based on the priority of the packets, and it updates the sorting when the SPU core notifies any change on the status of a packet. The QS selects which packet identifiers will be provided next to the SPU. Again, the QS is a particular focus of the present application.

Register Transfer Unit (RTU) block 227, upon receiving a packet identifier (packetPage and packetNumber) from the QS, searches for an available context (229, FIG. 2) out of 8 contexts that XCaliber features in a preferred embodiment. For architectural and description purposes the contexts are considered a part of a broader Stream Processing Unit, although the contexts are shown in FIG. 2 as a separate unit 229.

In the case that no context is available, the RTU has the ability to notify the SPU about this event through a set of interrupts. In the case that a context is available, the RTU loads the packet identifier information and some selected fields of the header of the packet into the context, and afterwards it releases the context (which will at that time come under control of the SPU. The RTU accesses the header information of the packet through the SIU, since the packet could have been stored in the off-chip EPM.

Eventually a stream in the SPU core processes the context and notifies the QS of this fact. There are, in a preferred embodiment, eight streams in the DMS core. The QS then updates the status of the packet (to completed), and eventually this packet is selected for downloading (i.e. the packet data of the corresponding packet is sent out of the XCaliber processor to one of the two external devices).

When a packet is selected for downloading, the QS sends the packetPage (among other information) to the PMMU block, which generates the corresponding line addresses to read the packet data from the LPM (in case the packet was stored in the on-chip local memory) or it will instruct the SIU to bring the packet from the external packet memory to the PMU. In any case, the lines of packet data read are buffered into the OutBuffer (OB) block, and from there sent out to the device through the 16-byte network output interface. This interface is independent of its input counterpart. The maximum aggregated bandwidth of this interface in a preferred embodiment is also 20 Gbps, 10 Gbps per output device.

CommandUnit (CU) 213 receives commands sent by SPU 105. A command corresponds to a packet instruction, which are in many cases newly defined instructions, dispatched by the SPU core. These commands are divided into three independent types, and the PMU can execute one command per type per cycle (for a total of up to 3 commands per cycle). Commands can be load-like or store-like (depending on whether the PMU provides a response back to the SPU or not, respectively).

A large number of features of the PMU are configured by the SPU through memory-mapped configuration registers 221. Some such features have to be programmed at boot time, and the rest can be dynamically changed. For some of the latter, the SPU has to be running in a single-thread mode to properly program the functionality of the feature. The CU block manages the update of these configuration registers.

The PMU provides a mechanism to aid in flow control between ASIC 203 and XCaliber DMS processor 201. Two different interrupts are generated by the PMU to SPU 105 when LPM 219 or QS 211 are becoming full. Software controls how much in advance the interrupt is generated before the corresponding structure becomes completely full. Software can also disable the generation of these interrupts.

LPM 219 is also memory mapped, and SPU 105 can access it through the conventional load/store mechanism. Both configuration registers 221 and LPM 219 have a starting address (base address) kept by SIU 107. Requests from SPU 105 to LPM 219 and the configuration space arrive to the PMU through SIU block 107. The SIU is also aware of the base address of the external packet memory.

In Buffer (IB)

Packet data sent by an external device arrives to the PMU through the network input interface 205 at an average rate of 8 bytes every XCaliber core cycle in a preferred embodiment. IB block 207 of the PMU receives this data, buffers it, and provides it, in a FIFO-like fashion, to LPM 219 and in some cases also to the SIU (in case of a packet overflow, as explained elsewhere in this specification.

XCaliber DMS processor 201 can potentially send/receive packet data to/from up to 2 independent devices. Each device is tagged in SIU 107 with a device identifier, which is provided along with the packet data. When one device starts sending data from a packet, it will continue to send data from that very same packet until the end of the packet is reached or a bus error is detected by the SIU.

In a preferred embodiment the first byte of a packet always starts at byte 0 of the first 16 bytes sent of that packet. The first two bytes of the packet specify the size in bytes of the packet (including these first two bytes). These two bytes are always appended by the SIU if the external device has not appended them. If byte k in the 16-byte chunk is a valid byte, bytes 0 . . . k-1 are also valid bytes. This can be guaranteed since the first byte of a packet always starts at byte 0. Note that no valid bits are needed to validate each byte since a packet always starts at byte 0 of the 16-byte chunk, and the size of the packet is known up front (in the first two bytes). The network interface provides, at every core clock, a control bit specifying whether the 16-byte chunk contains, at least, one valid byte.

The valid data received from the network input interface is organized in buffer 207. This is an 8-entry buffer, each entry holding the 16-bytes of data plus the control bits associated to each chunk. PMMU 209 looks at the control bits in each entry and determines whether a new packet starts or to which of the (up to) two active packets the data belongs to, and it acts accordingly.

The 16-byte chunks in each of the entries in IB 207 are stored in LPM 219 or in the EPM (not shown). It is guaranteed by either the LPM controller or the SIU that the bandwidth to write into the packet memory will at least match the bandwidth of the incoming packet data, and that the writing of the incoming packet data into the packet memory will have higher priority over other accesses to the packet memory.

In some cases IB 207 may get full because PMMU 209 may be stalled, and therefore the LPM will not consume any more data of the IB until the stall is resolved. Whenever the IB gets full, a signal is sent to network input interface 205, which will retransmit the next 16-byte chunk as many times as needed until the IB accepts it. Thus, no packet data is lost due to the IB getting full.

Out Buffer (OB)

Network output interface 215 also supports a total aggregated bandwidth of 20 Gbps (10 Gbps per output device), as does the Input Interface. At 300 MHz XCaliber clock frequency, the network output interface accepts in average 8 bytes of data every XCaliber cycle from the OB block, and sends it to one of the two output devices. The network input and output interfaces are completely independent of each other.

Up to 2 packets (one per output device) can be simultaneously sent. The device to which the packet is sent does not need to correspond to the device that sent the packet in. The packet data to be sent out will come from either LPM 219 or the EPM (not shown).

For each of the two output devices connected at Network Out interface 215, PMMU 209 can have a packet ready to start being downloaded, a packet being downloaded, or no packet to download. Every cycle PMMU 209 selects the highest packet across both output devices and initiates the download of 16 bytes of data for that packet. Whenever the PMMU is downloading packet data from a packet to an output device, no data from a different packet will be downloaded to the same device until the current packet is completely downloaded.

The 16-byte chunks of packet data read from LPM 219 (along with some associated control information) are fed into one of the two 8-entry buffers (one per device identifier). The contents of the head of one of these buffers is provided to the network output interface whenever this interface requests it. When the head of both buffers is valid, the OB provides the data in a round robin fashion.

Differently than the network input interface, in the 16-byte chunk sent to the network output interface it can not be guaranteed that if a byte k is valid, then bytes 0 ... k-1 are valid as well. The reason for this is that when the packet is being sent out, it does not need to start at byte 0 of the 16-byte chunk in memory. Thus, for each 16-byte chunk of data that contains the start of the packet to be sent out, OB 217 needs to notify the network interface where the first valid byte of the chunk resides. Moreover, since the first two bytes of the packet contain the size of the packet in bytes, the network output interface has the information to figure out where the last valid byte of the packet resides within the last 16-byte chunk of data for that packet. Moreover, OB 217 also provides a control bit that informs SIU 107 whether it needs to compute CRC for the packet, and if so, which type of CRC. This control bit is provided by PMMU 209 to OB 217.

Paging Memory Management Unit (PMMU)

The packet memory address space is 16 MB. Out of the 16 MB, the XCaliber processor features 256 KB on-chip. The rest (or a fraction) is implemented using external storage.

The packet memory address space can be mapped in the TLB of SPU 105 as user or kernel space, and as cachable or uncachable. In case it is mapped cachable, the packet memory space is cached (write-through) into an L1 data cache of SPU 105, but not into an L2 cache.

A goal of PMMU 209 is to store incoming packets (and SPU-generated packets as well) into the packet memory. In case a packet from the network input interface fits into LPM 219, PMMU 209 decides where to store it and generates the necessary write accesses to LPM 219; in case the packet from the network input interface is going to be stored in the EPM, SPU 105 decides where in the EPM the packet needs to be stored and SIU 107 is in charge of storing the packet. In either case, the packet is consecutively stored and a packet identifier is created by PMMU 209 and sent to QS 211.

SPU 105 can configure LPM 219 so packets larger than a given size will never be stored in the LPM. Such packets, as well as packets that do not fit into the LPM because lack of space, are sent by PMMU 209 to the EPM through SIU 107. This is a mechanism called overflow and is configured by the SPU for the PMU to do so. If no overflow of packets is allowed, then the packet is dropped. In this case, PMMU 209 interrupts the SPU (again, if configured to do so).

Uploading a Packet into Packet Memory

Whenever there is valid data at the head of IB 205, the corresponding device identifier bit is used to determine to which packet (out of the two possible packets being received) the data belongs. When the network input interface starts sending data of a new packet with device identifier d, all the rest of the data will eventually arrive with that same device identifier d unless an error is notified by the network interface block. The network input interface can interleave data from two different device identifiers, but in a given cycle only data from one device is received by IB 207.

When a packet needs to be stored into LPM 219, PMMU block 209 generates all the write addresses and write strobes to LPM 219. If the packet needs to be stored into the EPM, SIU 107 generates them.

Figure 3:
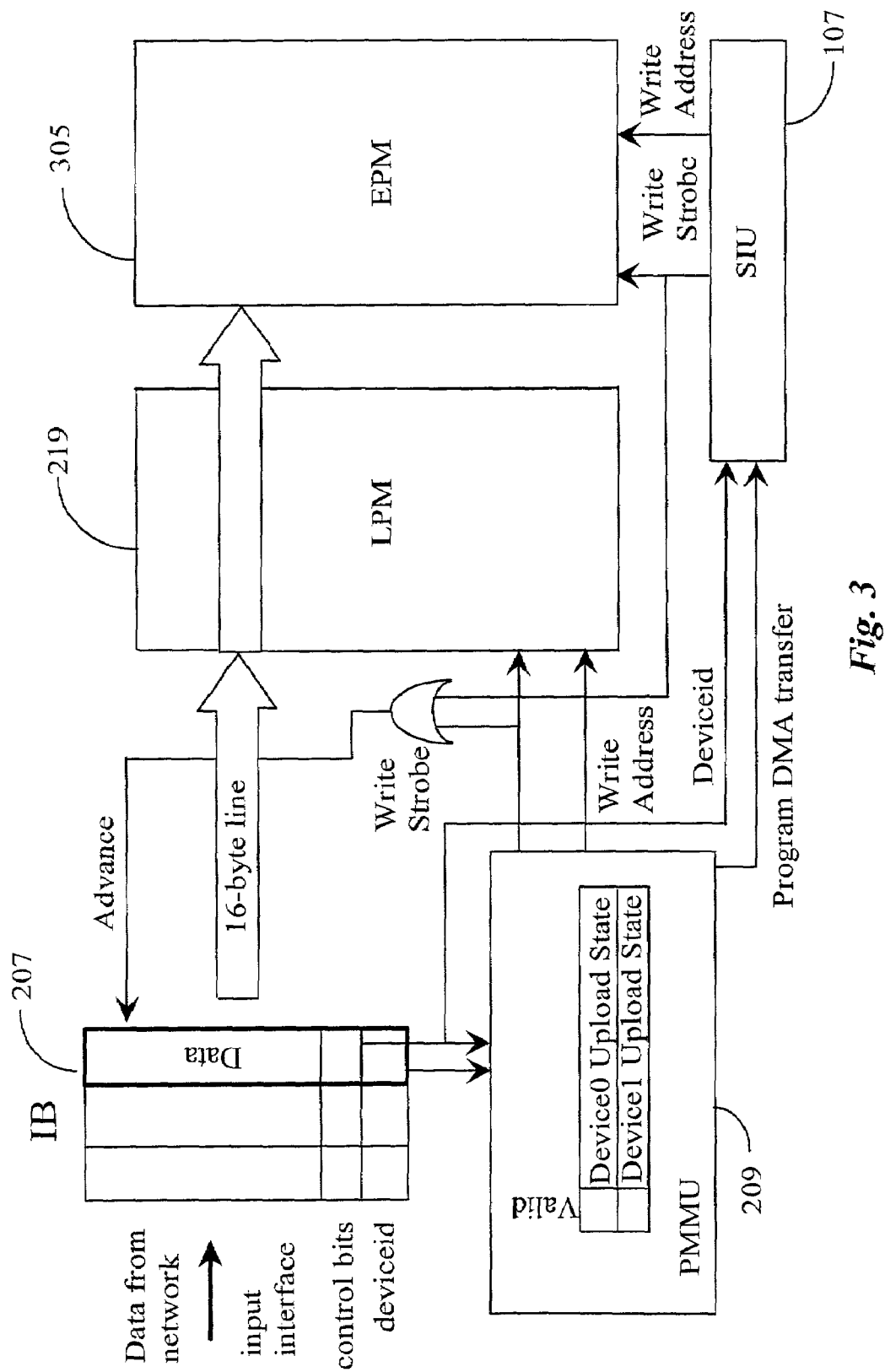
FIG. 3 is a block diagram illustrating uploading of data into the LPM or EPM in an embodiment of the invention.

FIG. 3 is a diagram illustrating uploading of data into either LPM 219 or the EPM, which is shown in FIG. 3 as element 305, but not shown in FIG. 2. The write strobe to the LPM or EPM will not be generated unless the header of the IB has valid data. Whenever the write strobe is generated, the 16-byte chunk of data at the head of the IB (which corresponds to a LPM line) is deleted from the IB and stored in the LPM or EPM. The device identifier bit of the head of the IB is used to select the correct write address out of the 2 address generators (one per input device).

In the current embodiment only one incoming packet can be simultaneously stored in the EPM by the SIU (i.e. only one overflow packet can be handled by the SIU at a time).

Therefore, if a second packet that needs to be overflowed is sent by the network input interface, the data of this packet will be thrown away (i.e. the packet will be dropped).

A Two Byte Packet-Size Header

The network input interface always appends two bytes to a packet received from the external device (unless this external device already does so, in which case the SIU will be programmed not to append them). This appended data indicates the size in bytes of the total packet, including the two appended bytes. Thus, the maximum size of a packet that is processed by the XCaliber DMS processor is 65535 bytes including the first two bytes.

The network output interface expects that, when the packet is returned by the PMU (if not dropped during its processing), the first two bytes also indicate the size of the processed packet. The size of the original packet can change (the packet can increase or shrink) as a result of processing performed by the XCaliber processor. Thus, if the processing results in increasing the size beyond 64K-1 bytes, it is the responsibility of software to chop the packet into two different smaller packets.

The PMU is more efficient when the priority of the packet being received is known up front. The third byte of the packet will be used for priority purpose if the external device is capable of providing this information to the PMU. The software programs the PMU to either use the information in this byte or not, which is does through a boot-time configuration register named Log2InQueues.

Dropping a Packet

A packet completely stored in either LPM 219 or EPM 305 will be dropped only if SPU 105 sends an explicit command to the PMU to do so. No automatic dropping of packets already stored in the packet memory can occur. In other words, any dropping algorithm of packets received by the XCaliber DMS processor is implemented in software.

There are, however, several situations wherein the PMU may drop an incoming packet. These are (a) The packet does not fit in the LPM and the overflow of packets is disabled, (b) The total amount of bytes received for the packet is not the same as the number of bytes specified by the ASIC in the first two bytes of the ASIC-specific header, or (c) A transmission error has occurred between the external device and the network input interface block of the SIU. The PMU block is notified about such an error.

For each of the cases (a), (b) and (c) above, an interrupt is generated to the SPU. The software can disable the generation of these interrupts using AutomaticPacketDropIntEnable, PacketErrorIntEnable on-the-fly configuration flags.

Virtual Pages

An important process of PMMU 209 is to provide an efficient way to consecutively store packets into LPM 219 with as little memory fragmentation as possible. The architecture in the preferred embodiment provides SPU 105 with a capability of grouping, as much as possible, packets of similar size in the same region of LPM 219. This reduces overall memory fragmentation.

To implement the low-fragmentation feature, LPM 219 is logically divided into 4 blocks of 64 KB bytes each. Each block is divided into fixed atomic pages of 256 bytes. However, every block has virtual pages that range from 256 bytes up to 64 KB, in power-of-2 increments. Software can enable/disable the different sizes of the virtual pages for each of the 4 blocks using an on-the-fly configuration register named VirtualPageEnable. This allows configuring some blocks to store packets of up to a certain size.

The organization and features of the PMU assure that a packet of size s will never be stored in a block with a maximum virtual page size less than s. However, a block with a minimum virtual page size of r will accept packets of size smaller than r. This will usually be the case, for example, in which another block or blocks are configured to store these smaller packets, but is full.

Software can get ownership of any of the four blocks of the LPM, which implies that the corresponding 64 KB of memory will become software managed. A configuration flag exists per block (SoftwareOwned) for this purpose. The PMMU block will not store any incoming packet from the network input interface into a block in the LPM with the associated SoftwareOwned flag asserted. Similarly, the PMMU will not satisfy a GetSpace operation (described elsewhere) with memory of a block with its SoftwareOwned flag asserted. The PMMU, however, is able to download any packet stored by software in a software-owned block.

The PMMU logic determines whether an incoming packet fits in any of the blocks of the LPM. If a packet fits, the PMMU decides in which of the four blocks (since the packet may fit in more than one block), and the first and last atomic page that the packet will use in the selected block. The atomic pages are allocated for the incoming packet. When packet data stored in an atomic page has been safely sent out of the XCaliber processor through the network output interface, the corresponding space in the LPM can be de-allocated (i.e. made available for other incoming packets).

The EPM, like the LPM is also logically divided into atomic pages of 256 bytes. However, the PMMU does not maintain the allocation status of these pages. The allocation status of these pages is managed by software. Regardless of where the packet is stored, the PMMU generates an offset (in atomic pages) within the packet memory to where the first data of the packet is stored. This offset is named henceforth packetPage. Since the maximum size of the packet memory is 16 MB, the packetPage is a 16-bit value.

As soon as the PMMU safely stores the packet in the LPM, or receives acknowledgement from SIU 107 that the last byte of the packet has been safely stored in the EPM, the packetPage created for that packet is sent to the QS. Operations of the QS are described in enabling detail below.

Generating the packetPage Offset

The PMMU always monitors the device identifier (deviceId) associated to the packet data at the head of the IB. If the deviceId is not currently active (i.e. the previous packet sent by that deviceId has been completely received), that indicates that the head of the IB contains the first data of a new packet. In this case, the first two bytes (byte0 and byte1 in the 16-byte chunk) specify the size of the packet in bytes. With the information of the size of the new incoming packet, the PMMU determines whether the packet fits into LPM 219 and, if it does, in which of the four blocks it will be stored, plus the starting and ending atomic pages within that block.

The required throughput in the current embodiment of the PMMU to determine whether a packet fits in LPM 219 and, if so, which atomic pages are needed, is one packet every two cycles. One possible two-cycle implementation is as follows: (a) The determination happens in one cycle, and only one determination happens at a time (b) In the cycle following the determination, the atomic pages needed to store the packet are allocated and the new state (allocated/de-allocated) of the virtual pages are computed. In this cycle, no determination is allowed.

Figure 4A:
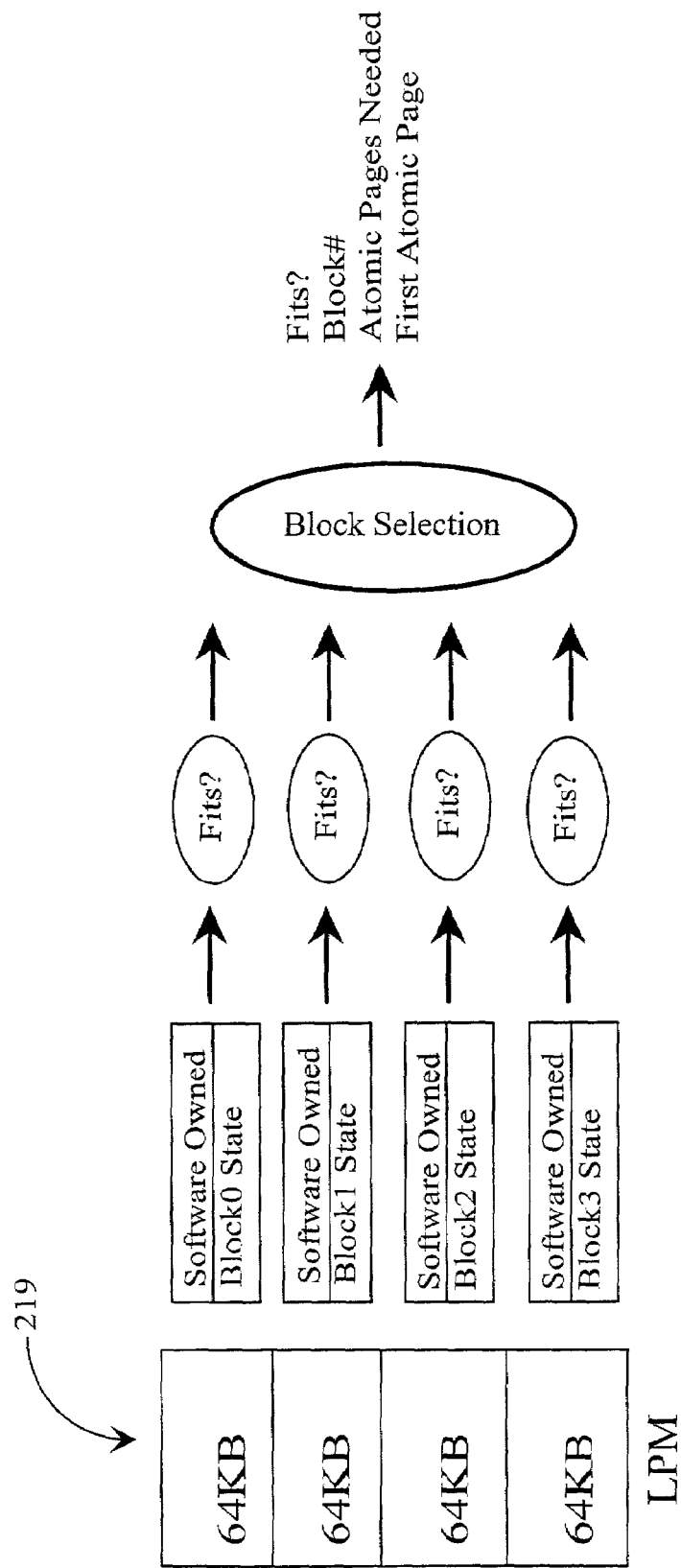
FIG. 4a is a diagram illustrating determination and allocation for data uploading in an embodiment of the invention.

FIG. 4a is a diagram illustrating determination and allocation in parallel for local packet memory. The determination logic is performed in parallel for all of the four 64 KB blocks as shown.

Figure 4B:
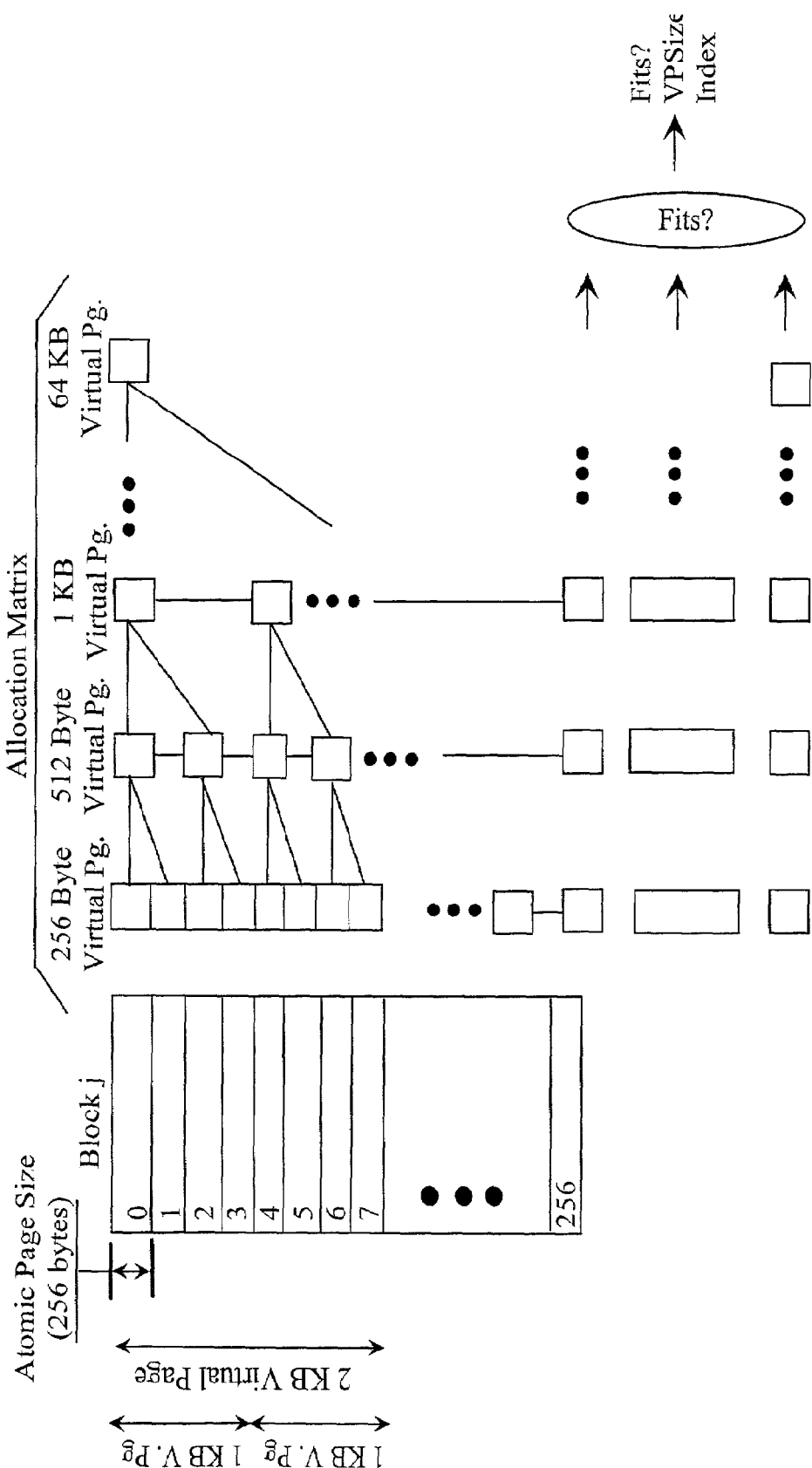
FIG. 4b is a diagram showing the state that needs to be maintained for each of the four 64 KB blocks.

FIG. 4b shows the state that needs to be maintained for each of the four 64 KB blocks. This state, named AllocationMatrix, is recomputed every time one or more atomic pages are allocated or de-allocated, and it is an input for the determination logic. The FitsVector and IndexVector contain information computed from the AllocationMatrix.

AllocationMatrix[VPSize][VPIndex] indicates whether virtual page number VPIndex of size VPSize in bytes is already allocated or not. FitsVector[VPSize] indicates whether the block has at least one non-allocated virtual page of size VPSize. If FitsVector[VPSize] is asserted, IndexVector[VPSize] vector contains the index of a non-allocated virtual page of size VPSize.

The SPU programs which virtual page sizes are enabled for each of the blocks. The EnableVector[VPSize] contains this information. This configuration is performed using the VirtualPageEnable on-the-fly configuration register. Note that the AllocationMatrix[][], FitsVector[], IndexVector[] and EnableVector[] are don't cares if the corresponding SoftwareOwned flag is asserted.

In this example the algorithm for the determination logic (for a packet of size s bytes) is as follows:

1) Fits logic: check, for each of the blocks, whether the packet fits in or not. If it fits, remember the virtual page size and the number of the first virtual page of that size.

```
For All Block j Do (can be done in parallel):
    Fits[j] = (s <= VPSize) AND FitsVector[VPSize] AND
        Not SoftwareOwned
    where VPSize is the smallest possible page size.
    If (Fits[j])
        VPIndex[j] = IndexVector[VPSize]
        MinVPS[j] = VPSize
    Else
        MinVPS[j] = <Infinity>
```

2) Block selection: the blocks with the smallest virtual page (enabled or not) that is able to fit the packet in are candidates. The block with the smallest enabled virtual page is selected.

```
If Fits[j] = FALSE for all j Then
    <Packet does not fit in LPM>
    packetPage = OverflowAddress >> 8
Else
    C = set of blocks with smallest MinVPS AND
        Fits[MinVPS]
    B = block# in C with the smallest enabled virtual page
    (if more than one exists, pick the smallest block number)
    If one or more blocks in C have virtual pages enabled
    Then
        Index = VPIndex[B]
        VPSize = MinVPS[B]
        NumAPs = ceil(S/256)
        packetPage = (B*64KB + Index*VPSize)>>
    Else
        <Packet does not fit in LPM>
        packetPage = OverflowAddress >> 8
```

If the packet fits in the LPM, the packetPage created is then the atomic page number within the LPM (there are up to 1K different atomic pages in the LPM) into which the first data of the packet is stored. If the packet does not fit, then the packetPage is the contents of the configuration register OverflowAddress right-shifted 8 bits. The packet overflow mechanism is described elsewhere in this specification, with a subheader "Packet overflow".

In the cycle following the determination of where the packet will be stored, the new values of the AllocationMatrix, FitsVector and IndexVector must be recomputed for the selected block. If FitsVector[VPSize] is asserted, then IndexVector[VPSize] is the index of the largest non-allocated virtual page possible for the corresponding virtual page size. If FitsVector[VPSize] is de-asserted, then IndexVector[VPSize] is undefined.

The number of atomic pages needed to store the packet is calculated (NumAPs) and the corresponding atomic pages are allocated. The allocation of the atomic pages for the selected block (B) is done as follows:

1. The allocation status of the atomic pages in AllocationMatrix[APsize][j . . . k], j being the first atomic page and k the last one (k−j+1=NumAPs), are set to allocated.
2. The allocation status of the virtual pages in AllocationMatrix[r][s] are updated following the mesh structure in FIG. 4b. (a $2^{k+1}$-byte virtual page will be allocated if any of the two $2^k$-byte virtual pages that it is composed of is allocated).

When the packetPage has been generated, it is sent to the QS for enqueueing. If the QS is full (very rare), it will not be able to accept the packetPage being provided by the PMMU. In this case, the PMMU will not be able to generate a new packetPage for the next new packet. This puts pressure on the IB, which might get full if the QS remains full for several cycles.

The PMMU block also sends the queue number into which the QS has to store the packetPage. How the PMMU generates this queue number is described below in sections specifically allocated to the QS.

Page Allocation Example

FIGS. 5a and 5b illustrate an example of how atomic pages are allocated. For simplicity, the example assumes 2 blocks (0 and 1) of 2 KB each, with an Atomic page size of 256 bytes, and both blocks have their SoftwareOwned flag de-asserted. Single and double cross-hatched areas represent allocated virtual pages (single cross-hatched pages correspond to the pages being allocated in the current cycle). The example shows how the pages get allocated for a sequence of packet sizes of 256, 512, 1K and 512 bytes. Note that, after this sequence, a 2K-byte packet, for example, will not fit in the example LPM.

Figure 6A:
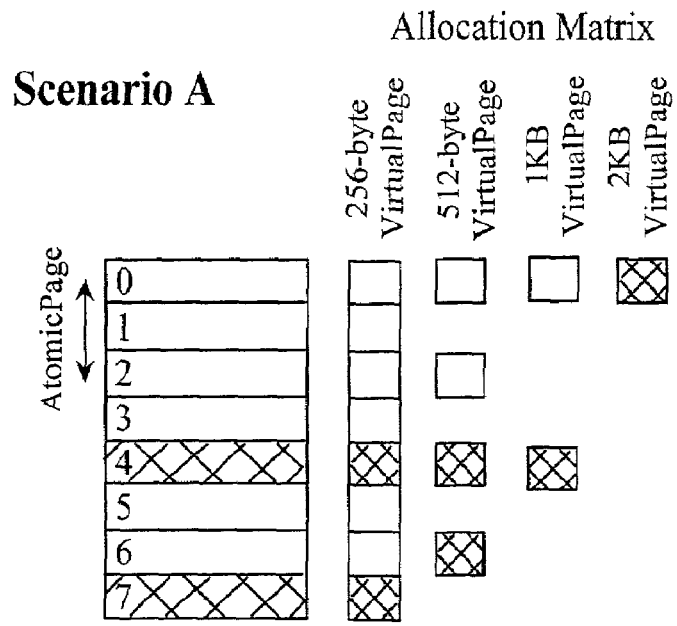
FIGS. 6a and 6b illustrate how memory space is efficiently utilized in an embodiment of the invention.
Figure 6B:
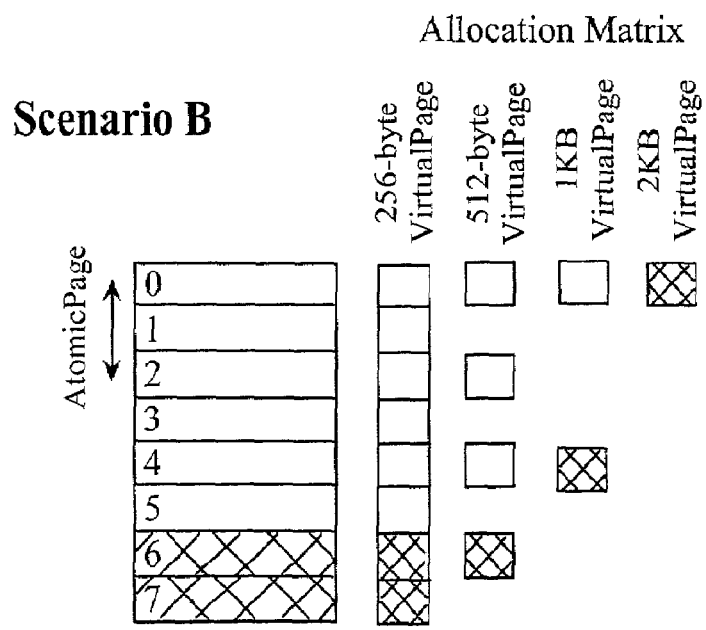

Whenever the FitsVector[VPSize] is asserted, the IndexVector[VPSize] contains the largest non-allocated virtual page index for virtual page size VPSize. The reason for choosing the largest index is that the memory space is better utilized. This is shown in FIGS. 6a and 6b, where two 256-byte packets are stored in a block. In scenario A, the 256-byte virtual page is randomly chosen, whereas in scenario B, the largest index is always chosen. As can be seen, the block in scenario A only allows two 512-byte virtual pages, whereas the block in scenario B allows three. Both, however, allow the same number of 256-byte packets since this is the smallest allocation unit. Note that the same effect is obtained by choosing the smallest virtual page index number all the time.

Packet Overflow

The only two reasons why a packet cannot be stored in the LPM are (a) that the size of the packet is larger than the maximum virtual page enabled across all 4 blocks; or (b)

that the size of the packet is smaller than or equal to the maximum virtual page enabled but no space could be found in the LPM.

When a packet does not fit into the LPM, the PMMU will overflow the packet through the SIU into the EPM. To do so, the PMMU provides the initial address to the SIU (16-byte offset within the packet memory) to where the packet will be stored. This 20-bit address is obtained as follows: (a) The 16 MSB bits correspond to the 16 MSB bits of the Overflow-Address configuration register (i.e. the atomic page number within the packet memory). (b) The 4 LSB bits correspond to the HeaderGrowthOffset configuration register. The packetPage value (which will be sent to the QS) for this overflowed packet is then the 16 MSB bits of the OverflowAddress configuration register.

If the on-the-fly configuration flag OverflowEnable is asserted, the PMMU will generate an OverflowStartedInt interrupt. When the OverflowStartedInt interrupt is generated, the size in bytes of the packet to overflow is written by the PMMU into the SPU-read-only configuration register SizeOfOverflowedPacket. At this point, the PMMU sets an internal lock flag that will prevent a new packet from overflowing. This lock flag is reset when the software writes into the on-the-fly configuration register OverflowAddress. If a packet needs to be overflowed but the lock flag is set, the packet will be dropped.

With this mechanism, it is guaranteed that only one interrupt will be generated and serviced per packet that is overflowed. This also creates a platform for software to decide where the starting address into which the next packet that will be overflowed will be stored is visible to the interrupt service routine through the SizeOfOverflowedPacket register. In other words, software manages the EPM.

If software writes the OverflowAddress multiple times in between two OverflowStartedInt interrupts, the results are undefined. Moreover, if software sets the 16 MSB bits of OverflowAddress to 0 . . . 1023, results are also undefined since the first 1K atomic pages in the packet memory correspond to the LPM.

Downloading a Packet from Packet Memory

Figure 7:
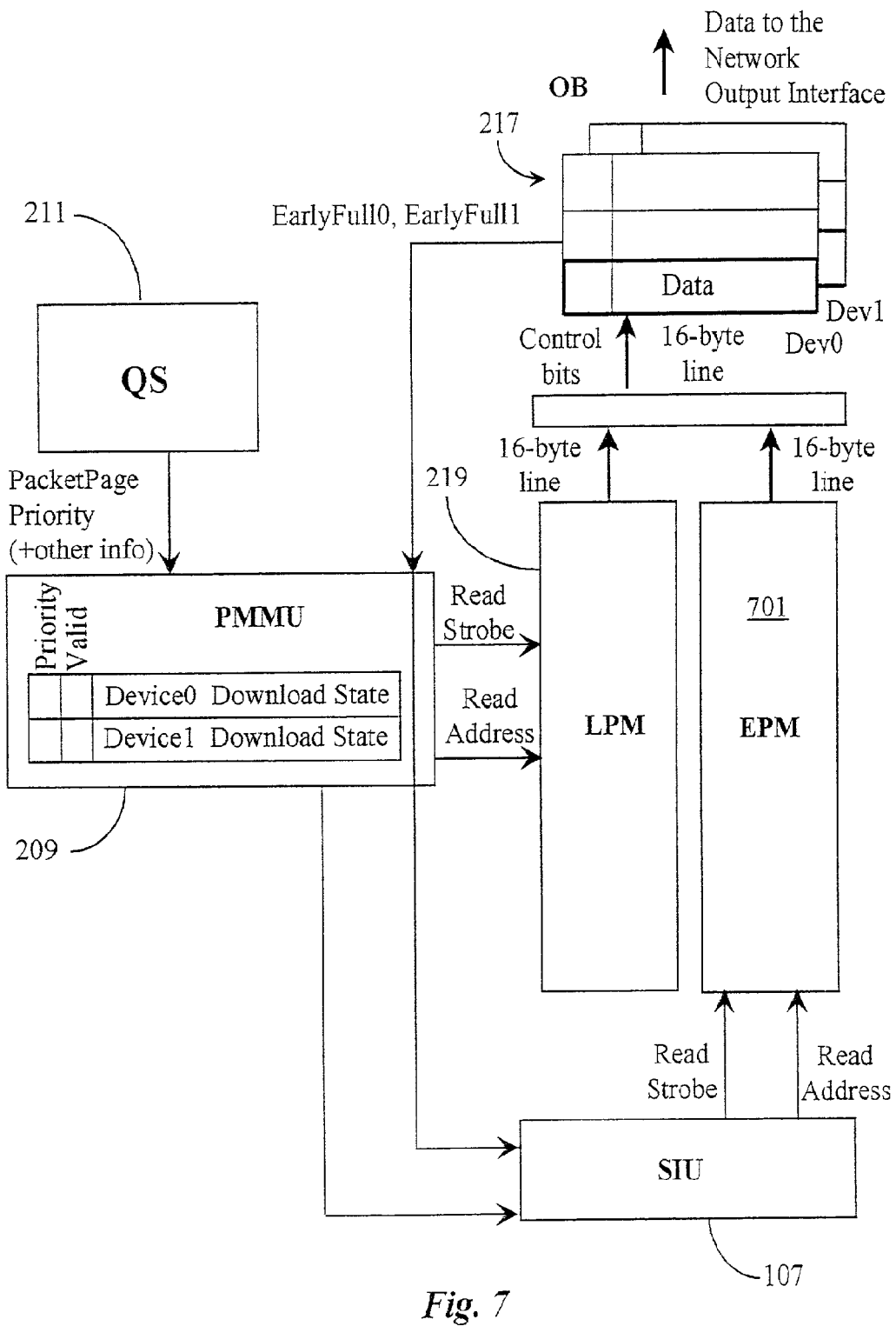
FIG. 7 is a top-level schematic of the blocks of the XCaliber PMU unit involved in the downloading of a packet.

Eventually the SPU will complete the processing of a packet and will inform the QS of the fact. At this point the packet may be downloaded from memory, either LPM or EPM, and sent, via the OB to one of the connected devices. FIG. 7 is a top-level schematic of the blocks of the XCaliber DMS processor involved in the downloading of a packet, and the elements in FIG. 7 are numbered the same as in FIG. 2. The downloading process may be followed in FIG. 7 with the aid of the following descriptions.

When QS 211 is informed that processing of a packet is complete, the QS marks this packet as completed and, a few cycles later (depending on the priority of the packet), the QS provides to PMMU 209 (as long as the PMMU has requested it) the following information regarding the packet:

(a) the packetPage (b) the priority (cluster number from which it was extracted)

(c) the tail growth/shrink information (described later in spec)

(d) the outbound device identifier bit (e) the CRC type field (described later in spec)

(f) the KeepSpace bit

The device identifier sent to PMMU block 209 is a 1-bit value that specifies the external device to which the packet will be sent. This outbound device identifier is provided by software to QS 211 as a 2-bit value.

If the packet was stored in LPM 219, PMMU 209 generates all of the (16-byte line) read addresses and read strobes to LPM 219. The read strobes are generated as soon as the read address is computed and there is enough space in OB 217 to buffer the line read from LPM 219. Buffer d in the OB is associated to device identifier d. This buffer may become full for either two reasons: (a) The external device d temporarily does not accept data from XCaliber; or (b) The rate of reading data from the OB is lower than the rate of writing data into it.

As soon as the packet data within an atomic page has all been downloaded and sent to the OB, that atomic page can be de-allocated. The de-allocation of one or more atomic pages follows the same procedure as described above. However, no de-allocation of atomic pages occurs if the LPM bit is de-asserted. The KeepSpace bit is a don't care if the packet resides in EPM 701.

If the packet was stored in EPM 701, PMMU 209 provides to SIU 107 the address within the EPM where the first byte of the packet resides. The SIU performs the downloading of the packet from the EPM. The SIU also monitors the buffer space in the corresponding buffer in OB 217 to determine whether it has space to write the 16-byte chunk read from EPM 701. When the packet is fully downloaded, the SIU informs the PMMU of the fact so that the PMMU can download the next packet with the same device identifier.

When two packets (one per device) are being simultaneously sent, data from the packet with highest priority is read out of the memory first. This preemption can happen at a 16-byte boundary or when the packet finishes its transmission. If both packets have the same priority (provided by the QS), a round-robin method is used to select the packet from which data will be downloaded next. This selection logic also takes into account how full the two buffers in the OB are. If buffer d is full, for example, no packet with a device identifier d will be selected in the PMMU for downloading the next 16-byte chunk of data.

When a packet starts to be downloaded from the packet memory (local or external), the PMMU knows where the first valid byte of the packet resides. However, the packet's size is not known until the first line (or the first two lines in some cases) of packet data is read from the packet memory, since the size of the packet resides in the first two bytes of the packet data. Therefore, the processing of downloading a packet first generates the necessary line addresses to determine the size of the packet, and then, if needed, generates the rest of the accesses.

This logic takes into account that the first two bytes that specify the size of the packet can reside in any position in the 16-byte line of data. A particular case is when the first two bytes span two consecutive lines (which will occur when the first byte is the 16th byte of a line, and second byte is the $1^{st}$ byte of next line.

As soon as the PMMU finishes downloading a packet (all the data of that packet has been read from packet memory and sent to OB), the PMMU notifies the QS of this event. The QS then invalidates the corresponding packet from its queuing system.

When a packet starts to be downloaded, it cannot be preempted, i.e. the packet will finish its transmission. Other packets that become ready to be downloaded with the same outbound device identifier while the previous packet is being transmitted cannot be transmitted until the previous packet is fully transmitted.

Packet Growth/Shrink

Figure 8:
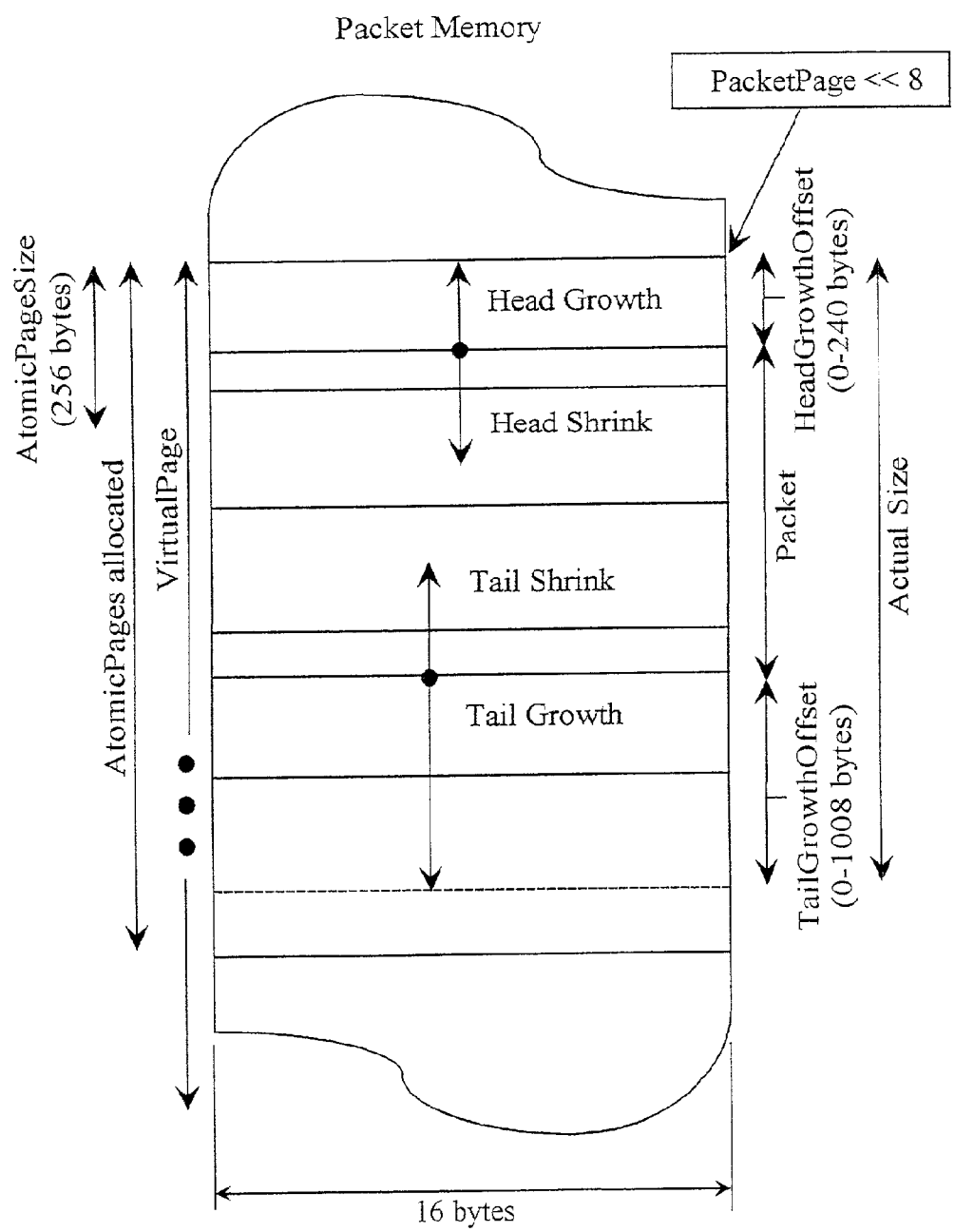
FIG. 8 is a diagram illustrating the phenomenon of packet growth and shrink.

As a result of processing a packet, the size of a network packet can grow, shrink or remain the same size. If the size varies, the SPU has to write the new size of the packet in the same first two bytes of the packet. The phenomenon of packet growth and shrink is illustrated in FIG. 8.

Both the header and the tail of the packet can grow or shrink. When a packet grows, the added data can overwrite the data of another packet that may have been stored right above the packet experiencing header growth, or that was stored right below in the case of tail growth. To avoid this problem the PMU can be configured so that an empty space is allocated at the front and at the end of every packet when it is stored in the packet memory. These empty spaces are specified with HeaderGrowthOffset and TailGrowthOffset boot-time configuration registers, respectively, and their granularity is 16 bytes. The maximum HeaderGrowthOffset is 240 bytes (15 16-byte chunks), and the maximum TailGrowthOffset is 1008 bytes (63 16-byte chunks). The minimum in both cases is 0 bytes. Note that these growth offsets apply to all incoming packets, that is, there is no mechanism to apply different growth offsets to different packets.

When the PMMU searches for space in the LPM, it will look for contiguous space of Size(packet)+((HeaderGrowthOffset+TailGrowthOffset)<<4). Thus, the first byte of the packet (first byte of the ASIC-specific header) will really start at offset ((packetPage<<8)+(HeaderGrowthOffset<<4)) within the packet memory.

The software knows what the default offsets are, and, therefore, knows how much the packet can safely grow at both the head and the tail. In case the packet needs to grow more than the maximum offsets, the software has to explicitly move the packet to a new location in the packet memory. The steps to do this are as follows:

1) The software requests the PMU for a chunk of contiguous space of the new size. The PMU will return a new packetPage that identifies (points to) this new space.
2) The software writes the data into the new memory space.
3) The software renames the old packetPage with the new packetPage.
4) The software requests the PMU to de-allocate the space associated to the old packetPage.

In the case of header growth or shrinkage, the packet data will no longer start at ((packetPage<<8)+(HeaderGrowthOffset<<4)). The new starting location is provided to the PMU with a special instruction executed by the SPU when the processing of the packet is completed. This information is provided to the PMMU by the QS block.

Time Stamp

The QS block of the PMU (described in detail in a following section) guarantees the order of the incoming packets by keeping the packetPage identifiers of the packets in process in the XCaliber processor in FIFO-like queues. However, software may break this ordering by explicitly extracting identifiers from the QS, and inserting them at the tail of any of the queues.

To help software in guaranteeing the relative order of packets, the PMU can be configured to time stamp every packet that arrives to the PMMU block using an on-the-fly configuration flag TimeStampEnabled. The time stamp is an 8-byte value, obtained from a 64-bit counter that is incremented every core clock cycle.

When the time stamp feature is on, the PMMU appends the 8-byte time stamp value in front of each packet, and the time stamp is stripped off when the packet is sent to the network output interface. The time stamp value always occupies the 8 MSB bytes of the (k-1)th 16-byte chunk of the packet memory, where k is the 16-byte line offset where the data of the packet starts (k>0). In the case that HeaderGrowthOffset is 0, the time stamp value will not be appended, even if TimeStampEnabled is asserted.

The full 64-bit time counter value is provided to software through a read-only configuration register (TimeCounter).

Software Operations on the PMMU

Software has access to the PMMU to request or free a chunk of contiguous space. In particular, there are two operations that software can perform on the PMMU. Firstly the software, through an operation GetSpace(size), may try to find a contiguous space in the LPM for size bytes. The PMU replies with the atomic page number where the contiguous space that has been found starts (i.e. the packetPage), and a success bit. If the PMU was able to find space, the success bit is set to '1', otherwise it is set to '0'. GetSpace will not be satisfied with memory of a block that has its SoftwareOwned configuration bit asserted. Thus, software explicitly manages the memory space of software-owned LPM blocks.

The PMMU allocates the atomic pages needed for the requested space. The EnableVector set of bits used in the allocation of atomic pages for incoming packets is a don't care for the GetSpace operation. In other words, as long as sufficient consecutive non-allocated atomic pages exist in a particular block to cover size bytes, the GetSpace(size) operation will succeed even if all the virtual pages in that block are disabled. Moreover, among non-software-owned blocks, a GetSpace operation will be served first using a block that has all its virtual pages disabled. If more than such a block exists, the smallest block number is chosen. If size is 0, GetSpace(size) returns '0'.

The second operation software can perform on the PMMU is FreeSpace(packetPage). In this operation the PMU de-allocates atomic pages that were previously allocated (starting at packetPage). This space might have been either automatically allocated by the PMMU as a result of an incoming packet, or as a result of a GetSpace command. FreeSpace does not return any result to the software. A FreeSpace operation on a block with its SoftwareOwned bit asserted is disregarded (nothing is done and no result will be provided to the SPU).

Local Packet Memory

Local Packet Memory (LPM), illustrated as element 219 in FIGS. 2 and 7, has in the instant embodiment a size of 256 KB, 16-byte line width with byte enables, 2 banks (even/odd), one Read and one Write port per bank, is fully pipelined, and has one cycle latency The LPM in packet processing receives read and write requests from both the PMMU and the SIU. An LPM controller guarantees that requests from the PMMU have the highest priority. The PMMU reads at most one packet while writing another one. The LPM controller guarantees that the PMMU will always have dedicated ports to the LPM.

Malicious software could read/write the same data that is being written/read by the PMMU. Thus, there is no guarantee that the read and write accesses in the same cycle are performed to different 16-byte line addresses.

A request to the LPM is defined in this example as a single access (either read or write) of 16-bytes. The SIU generates several requests for a masked load or store, which are new instructions known to the inventors and the subject of at least one separate patent application. Therefore, a masked load/ store operation can be stalled in the middle of these multiple requests if the highest priority PMMU access needs the same port.

When the PMMU reads or writes, the byte enable signals are assumed to be set (i.e. all 16 bytes in the line are either read or written). When the SIU drives the reads or writes, the byte enable signals are meaningful and are provided by the SIU.

When the SPU reads a single byte/word in the LPM, the SIU reads the corresponding 16-byte line and performs the extraction and right alignment of the desired byte/word. When the SPU writes a single byte/word, the SIU generates a 16-byte line with the byte/word in the correct location, plus the valid bytes signals.

Prioritization Among Operations

The PMMU may receive up to three requests from three different sources (IB, QS and software) to perform operations. For example, requests may come from the IB and/or Software: to perform a search for a contiguous chunk of space, to allocate the corresponding atomic page sizes and to provide the generated packetPage. Requests may also come from the QS and/or Software to perform the de-allocation of the atomic pages associated to a given packetPage.

It is required that the first of these operations takes no more than 2 cycles, and the second no more than one. The PMMU executes only one operation at a time. From highest to lowest, the PMMU block will give priority to requests from: IB, QS and Software.

Early Full-PMMU Detection

The PMU implements a mechanism to aid in flow control between any external device and the XCaliber processor. Part of this mechanism is to detect that the LPM is becoming full and, in this case, a NoMorePagesOfXsizeInt interrupt is generated to the SPU. The EPM is software controlled and, therefore, its state is not maintained by the PMMU hardware.

The software can enable the NoMorePagesOfXsizeInt interrupt by specifying a virtual page size s. Whenever the PMMU detects that no more available virtual pages of that size are available (i.e. FitsVector[s] is de-asserted for all the blocks), the interrupt is generated. The larger the virtual page size selected, the sooner the interrupt will be generated. The size of the virtual page will be indicated with a 4-bit value (0:256 bytes, 1:512 bytes, . . . , 8:64 KB) in an on-the-fly configuration register IntIfNoMoreThanXsizePages. When this value is greater than 8, the interrupt is never generated.

If the smallest virtual page size is selected (256 bytes), the NoMorePagesOfXsizeInt interrupt is generated when the LPM is completely full (i.e. no more packets are accepted, not even a 1-byte packet).

In general, if the IntIfNoMoreThanXsizePages is X, the soonest the interrupt will be generated is when the local packet memory is $(100/2^X)\%$ full. Note that, because of the atomic pages being 256 bytes, the LPM could become full with only 3 K-bytes of packet data (3 byte per packet, each packet using an atomic page).

Packet Size Mismatch

The PMMU keeps track of how many bytes are being uploaded into the LPM or EPM. If this size is different from the size specified in the first two bytes, a PacketErrorInt interrupt is generated to the SPU. In this case the packet with the mismatch packet size is dropped (the already allocated atomic pages will be de-allocated and no packetPage will be created). No AutomaticDropInt interrupt is generated in this case. If the actual size is more than the size specified in the first two bytes, the remaining packet data being received from the ASIC is gracefully discarded.

When a packet size mismatch is detected on an inbound device identifier D (D=0,1), the following packets received from that same device identifier are dropped until software writes (any value) into a ClearErrorD configuration register.

Bus Error Recovering

Faulty packet data can arrive to or leave the PMU due to external bus errors. In particular the network input interface may notify that the 16-byte chunk of data sent in has a bus error, or the SIU may notify that the 16-byte chunk of data downloaded from EPM has a bus error. In both cases, the PMMU generates the PacketErrorInt interrupt to notify the SPU about this event. No other information is provided to the SPU.

Note that if an error is generated within the LPM, it will not be detected since no error detection mechanism is implemented in this on-chip memory. Whenever a bus error arises, no more data of the affected packet will be received by the PMU. This is done by the SIU in both cases. For the first case the PMMU needs to de-allocate the already allocated atomic pages used for the packet data received previous to the error event.

When a bus error is detected on an inbound device identifier D (D=0,1), the following packets received from that same device identifier are dropped until software writes (any value) into a ClearErrorD (D=0,1) configuration register.

Queuing System (QS)

The queueing system (QS) in the PMU of the XCaliber processor has functions of holding packet identifiers and the state of the packets currently in-process in the XCaliber processor, keeping packets sorted by their default or software-provided priority, selecting the packets that need to be pre-loaded (in the background) into one of the available contexts, and selecting those processed packets that are ready to be sent out to an external device.

Figure 9:
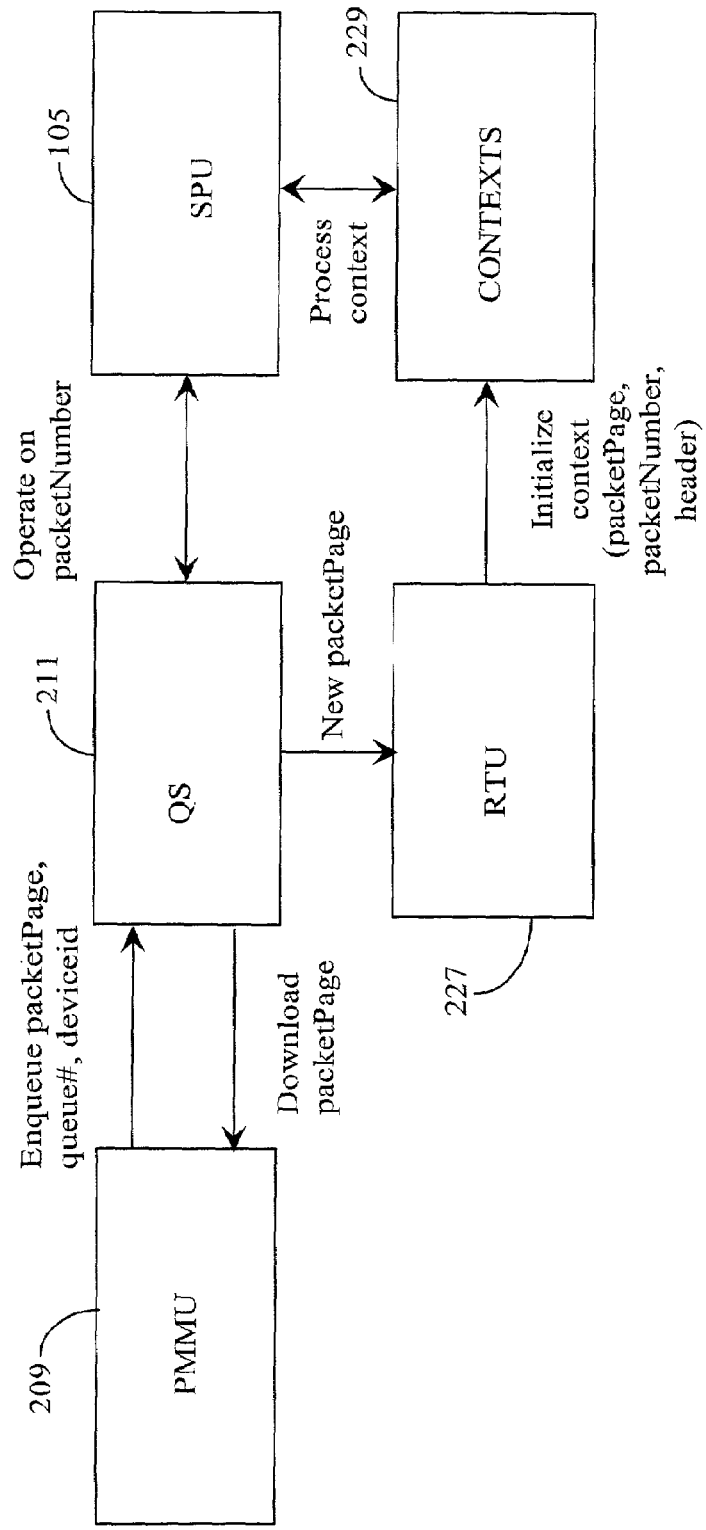
FIG. 9 is a block diagram showing high-level communication between the QS and other blocks in the PMU and SPU in an embodiment of the present invention.

FIG. 9 is a block diagram showing the high-level communication between the QS and other blocks in the PMU and SPU. When the PMMU creates a packetPage, it is sent to the QS along with a queue number and the device identifier. The QS enqueues that packetPage in the corresponding queue and associates a number (packetNumber) to that packet. Eventually, the packet is selected and provided to the RTU, which loads the packetPage, packetNumber and selected fields of the packet header into an available context. Eventually the SPU processes that context and communicates to the PMU, among other information, when the processing of the packet is completed or the packet has been dropped. For this communication, the SPU provides the packetNumber as the packet identifier. The QS marks that packet as completed (in the first case) and the packet is eventually selected for downloading from packet memory.

It is a requirement in the instant embodiment (and highly desirable) that packets of the same flow (same source and destination) need to be sent out to the external device in the same order as they arrived to the XCaliber processor (unless software explicitly breaks this ordering). When the SPU begins to process a packet the flow is not known. Keeping track of the ordering of packets within a flow is a costly task because of the amount of processing needed and because the number of active flows can be very large, depending on the application. Thus, the order within a flow is usually kept track by using aggregated-flow queues. In an aggregated-flow queue, packet identifiers from different flows are treated as from the same flow for ordering purposes.

The QS offloads the costly task of maintaining aggregated-flow queues by doing it in hardware and in the background. Up to 32 aggregated-flow queues can be maintained in the current embodiment, and each of these queues has an implicit priority. Software can enqueue a packetPage in any of the up to 32 queues, and can move a packetPage identifier from one queue to another (for example, when the priority of that packet is discovered by the software). It is expected that software, if needed, will enqueue all the packetPage identifiers of the packets that belong to the same flow into the same queue. Otherwise, a drop in the performance of the network might occur, since packets will be sent out of order within the same flow. Without software intervention, the QS guarantees the per-flow order of arrival.

Generic Queue

The QS implements a set of up to 32 FIFO-like queues, which are numbered, in the case of 32 queues, from 0 to 31. Each queue can have up to 256 entries. The addition of all the entries of all the queues, however, cannot exceed 256. Thus, queue sizes are dynamic. A queue entry corresponds to a packetPage identifier plus some other information. Up to 256 packets are therefore allowed to be in process at any given time in the XCaliber processor. This maximum number is not visible to software.

Whenever the QS enqueues a packetPage, a number (packetNumber) from 0 to 255 is assigned to the packetPage. This number is provided to the software along with the packetPage value. When the software wants to perform an operation on the QS, it provides the packetNumber identifier. This identifier is used by the QS to locate the packetPage (and other information associated to the corresponding packet) in and among its queues.

Software is aware that the maximum number of queues in the XCaliber processor is 32. Queues are disabled unless used. That is, the software does not need to decide how many queues it needs up front. A queue becomes enabled when at least one packet is in residence in that queue.

Several packet identifiers from different queues can become candidates for a particular operation to be performed. Therefore, some prioritization mechanism must exist to select the packet identifier to which an operation will be applied first. Software can configure (on-the-fly) the relative priority among the queues using an "on-the-fly" configuration register PriorityClusters. This is a 3-bit value that specifies how the different queues are grouped in clusters. Each cluster has associated a priority (the higher the cluster number, the higher the priority). The six different modes in the instant embodiment into which the QS can be configured are shown in the table of FIG. 10.

The first column of FIG. 10 is the value in the "on-the-fly" configuration register PriorityClusters. Software controls this number, which defines the QS configuration. For example, for PriorityClusters=2, the QS is configured into four clusters, with eight queues per cluster. The first of the four clusters will have queues 0 through 7, the second cluster will have queues 8-15, the third clusters 16 through 23, and the last of the four clusters has queues 24 through 31.

Queues within a cluster are treated fairly in a round robin fashion. Clusters are treated in a strict priority fashion. Thus, the only mode that guarantees no starvation of any queue is when PriorityClusters is 0, meaning one cluster of 32 queues.

Inserting a packetPage/deviceId into the QS

FIG. 11 is a diagram illustrating the generic architecture of QS 211 of FIGS. 2 and 7 in the instant embodiment. Insertion of packetPages and DeviceId information is shown as arrows directed toward the individual queues (in this case 32 queues). The information may be inserted from three possible sources, these being the PMMU, the SPU and re-insertion from the QS. There exists priority logic, illustrated by function element 1101, for the case in which two or more sources have a packetPage ready to be inserted into the QS. In the instant embodiment the priority is, in descending priority order, the PMMU, the QS, and the SPU (software).

Regarding insertion of packets from the SPU (software), the software can create packets on its own. To do so, it first requests a consecutive chunk of free space of a given size (see the SPU documentation) from the PMU, and the PMU returns a packetPage in case the space is found. The software needs to explicitly insert that packetPage for the packet to be eventually sent out. When the QS inserts this packetPage, the packetNumber created is sent to the SPU. Software requests an insertion through the Command Unit (see FIG. 2).

In the case of insertion from the QS, an entry residing at the head of a queue may be moved to the tail of another queue. This operation is shown as selection function 1103.

In the case of insertion from the PMU, when a packet arrives to the XCaliber processor, the PMMU assigns a packetPage to the packet, which is sent to the QS as soon as the corresponding packet is safely stored in packet memory.

An exemplary entry in a queue is illustrated as element 1105, and has the following fields: Valid (1) validates the entry. PacketPage (16) is the first atomic page number in memory used by the packet. NextQueue (5) may be different from the queue number the entry currently belongs to, and if so, this number indicates the queue into which the packetPage needs to be inserted next when the entry reaches the head of the queue. Delta (10) contains the number of bytes that the header of the packet has either grown or shrunk. This value is coded in 2's complement. Completed (1) is a single bit that indicates whether software has finished the processing of the corresponding packet. DeviceId (2) is the device identifier associated to the packet. Before a Complete operation is performed on the packet (described below) the DeviceId field contains the device identifier of the external device that sent the packet in. After the Complete operation, this field contains the device identifier of the device to which the packet will be sent. Active (1) is a single bit that indicates whether the associated packet is currently being processed by the SPU. CRCtype (2) indicates to the network output interface which type of CRC, if any, needs to be computed for the packet. Before the Complete operation is performed on the packet, this field is 0. KeepSpace (1) specifies whether the atomic pages that the packet occupies in the LPM will be de-allocated (KeepSpace de-asserted) by the PMMU or not (KeepSpace asserted). If the packet resides in EPM this bit is disregarded by the PMMU.

The QS needs to know the number of the queue to which the packetPage will be inserted. When software inserts the packetPage, the queue number is explicitly provided by an XStream packet instruction, which is a function of the SPU, described elsewhere in this specification. If the packetPage is inserted by the QS itself, the queue number is the value of the NextQueue field of the entry where the packetPage resides.

When a packetPage is inserted by the PMMU, the queue number depends on how the software has configured (at boot time) the Log2InputQueues configuration register. If Log2InputQueues is set to 0, all the packetPages for the incoming packets will be enqueued in the same queue, which is specified by the on-the-fly configuration register FirstInputQueue. If Log2InputQueues is set to k(1<=k<=5), then the k MSB bits of the 3rd byte of the packet determine the queue number. Thus an external device (or the network input interface block of the SIU) can assign up to 256 priorities for each of the packets sent into the PMU. The QS maps those 256 priorities into $2^k$, and uses queue numbers FirstInputQueue to FirstInputQueue+$2^k$-1 to insert the packetPages and deviceId information of the incoming packets.

It is expected that an external device will send the same 5 MSB bits in the $3^{rd}$ byte for all packets in the same flow. Otherwise, a drop in the performance of the network might occur, since packets may be sent back to the external device out-of-order within the same flow. Software is aware of whether or not the external device (or SIU) can provide the information of the priority of the packet in the $3^{rd}$ byte.

When packetPage p is inserted into queue q, the PacketPage field of the entry to be used is set to p and the Valid field to '1'. The value for the other fields depend on the source of the insertion. If the source is software (SPU), Completed is '0'; NextQueue is provided by SPU; DeviceId is '0'; Active is '1'; CRCtype is 0; KeepSpace is 0, and Probed is 0.

If the source is the QS, the remaining fields are assigned the value they have in the entry in which the to-be-inserted packetPage currently resides. If the source is the PMMU, Completed is '0', NextQueue is q, DeviceId is the device identifier of the external device that sent the packet into XCaliber, Active is '0', CRCtype is 0, KeepSpace is 0, and Probed is 0.

Monitoring Logic

The QS monitors entries into all of the queues to detect certain conditions and to perform the corresponding operation, such as to re-enqueue an entry, to send a packetPage plus some other information) to the PMMU for downloading, or to send a packetPage (plus some other information) to the RTU.

All detections take place in a single cycle and they are done in parallel.

Re-Enqueuing an Entry

The QS monitors all the head entities of the queues to determine whether a packet needs to be moved to another queue. Candidate entries to be re-enqueued need to be valid, be at the head of a queue, and have the NextQueue field value different from the queue number of the queue in which the packet currently resides.

If more than one candidate exists for re-enqueueing, the chosen entry will be selected following a priority scheme described later in this specification.

Sending an Entry to the PMMU for Downloading

The QS monitors all the head entities of the queues to determine whether a packet needs to be downloaded from the packet memory. This operation is 1102 in FIG. 11. The candidate entries to be sent out of XCaliber need to be valid, be at the head of the queue, have the NextQueue field value the same as the queue number of the queue in which the packet currently resides, and have the Completed flag asserted and the Active flag de-asserted. Moreover the QS needs to guarantee that no pending reads or writes exist from the same context that has issued the download command to the QS.

If more than one candidate exists for downloading, the chosen entry will be selected following a priority scheme described later in this specification.

A selected candidate will only be sent to the PMMU if the PMMU requested it. If the candidate was requested, the selected packetPage, along with the cluster number from which it is extracted, the tail growth/shrink, the outbound device identifier bit, the CRCtype and the KeepSpace bits are sent to the PMMU.

FIG. 12 is a table indicating coding of the Deviceid field. If the Deviceid field is 0, then the Outbound Device Identifier is the same as the Inbound Device Identifier, and so on as per the table.

When an entry is sent to the PMMU, the entry is marked as "being transmitted" and it is extracted from the queuing system (so that it does not block other packets that are ready to be transmitted and go to a different outbound device identifier). However, the entry is not invalidated until the PMMU notifies that the corresponding packet has been completely downloaded. Thus, probe-type operations on this entry will be treated as valid, i.e. as still residing in the XCaliber processor.

Reincarnation Effect

As described above, the QS assigns a packetNumber from 0 to 255 (256 numbers in total) to each packet that comes into XCaliber and is inserted into a queue. This is done by maintaining a table of 256 entries into which packet identifiers are inserted. At this time the Valid bit in the packet identifier is also asserted. Because the overall numbers of packets dealt with by XCaliber far exceeds 256, packet numbers, of course, have to be reused throughout the running of the XCaliber processor. Therefore, when packets are selected for downloading, at some point the packetNumber is no longer associated with a valid packet in process, and the number may be reused.

As long as a packet is valid in XCaliber it is associated with the packetNumber originally assigned. The usual way in which a packetNumber becomes available to be reused is that a packet is sent by the QS to the RTU for preloading in a context prior to processing. Then when the packet is fully processed and fully downloaded from memory, the packet identifier in the table associating packetNumbers is marked Invalid by manipulating the Valid bit (see FIG. 11 and the text accompanying).

In usual operation the system thus far described is perfectly adequate. It has been discovered by the inventors, however, that there are some situations in which the Active and Valid bits are not sufficient to avoid contention between streams. One of these situations has to do with a clean-up process, sometimes termed garbage collection, in which software monitors all packet numbers to determine when packets have remained in the system too long, and discards packets under certain conditions, freeing space in the system for newly-arriving packets.

In these special operations, like garbage collection, a stream must gain ownership of a packet, and assure that the operation it is to perform on the packet actually gets performed on the correct packet. As software probes packets, however, and before action may be taken, because there are several streams operating, and because the normal operation of the system may also send packets to the RTU, for example, it is perfectly possible in these special operations that a packet probed may be selected and effected by another stream before the special operation is completed. A packet, for example, may be sent to the RTU, processed, and downloaded, and a new packet may then be assigned to the packetNumber, and the new packet may even be stored at exactly the same packetPage as the original packet. There is a danger, then, that the special operations, such as discarding a packet in the garbage collection process, may discard a new and perfectly valid packet, instead of the packet originally selected to be discarded. This, of course, is just one of potentially many such special operations that might lead to trouble.

Considering the above, the inventors have provided a mechanism for assuring that, given two different absolute points in time, time s and time r, for example, that a valid packetNumber at time s and the same packetNumber at time r, still is associated to the same packet. A simple probe operation is not enough, because at some time after s and before time r the associated packet may be downloaded, and another (and different) packet may have arrived, been stored in exactly the same memory location as the previous packet, and been assigned the same packetNumber as the downloaded packet.

The mechanism implemented in XCaliber to ensure packetNumber association with a specific packet at different times includes a probe bit in the packet identifier. When a first stream, performing a process such as garbage collection, probes a packet, a special command, called Probe&Set is used. Probe&Set sets (asserts) the probe bit, and the usual information is returned, such as the value for the Valid bit, the Active bit, the packetPage address, and the old value of the probe bit. The first stream then executes a Conditional Activate instruction, described elsewhere in this specification, to gain ownership of the packet. Also, when the queuing system executes this Conditional Activate instruction it asserts the active bit of the packet. Now, at any time after the probe bit is set by the first stream, when a second stream at a later time probes the same packet, the asserted probe bit indicates that the first stream intends to gain control of this packet. The second stream now knows to leave this packet alone. This probe bit is de-asserted when a packet enters the XCaliber processor and a new (non-valid) number is assigned.

Sending an Entry to the RTU

The RTU uploads in the SPU background to the XCaliber processor some fields of the headers of packets that have arrived, and have been completely stored into packet memory. This uploading of the header of a packet in the background may occur multiple times for the same packet. The QS keeps track of which packets need to be sent to the RTU. The selection operation is illustrated in FIG. 11 as 1104.

Whenever the RTU has chosen a context to pre-load a packet, it notifies the QS that the corresponding packet is no longer an inactive packet. The QS then marks the packet as active.

Candidate entries to be sent to the RTU need to be valid, to be the oldest entry with the Active and Completed bits de-asserted, to have the NextQueue field value the same as the queue number of the queue in which the packet currently resides, and to conform to a limitation that no more than a certain number of packets in the queue in which the candidate resides are currently being processed in the SPU. More detail regarding this limitation is provided later in this specification. When an entry is sent to the RTU for pre-loading, the corresponding Active bit is asserted.

A queue can have entries with packet identifiers that already have been presented to the RTU and entries that still have not. Every queue has a pointer (NextPacketForRTU) that points to the oldest entry within that queue that needs to be sent to the RTU. Within a queue, packet identifiers are sent to the RTU in the same order they were inserted in the queue.

The candidate packet identifiers to be sent to the RTU are those pointed to by the different NextPacketForRTU pointers associated with the queues. However, some of these pointers might point to a non-existent entry (for example, when the queue is empty or when all the entries have already been sent to the RTU). The hardware that keeps track of the state of each of the queues determines these conditions. Besides being a valid entry pointed to by a NextPacketForRTU pointer, the candidate entry needs to have associated with it an RTU priority (described later in this specification) currently not being used by another entry in the RTU. If more than a single candidate exists, the chosen entry is selected following a priority scheme described later in this specification.

As opposed to the case in which an entry is sent to the PMMU for downloading, an entry sent to the RTU is not extracted from its queue. Instead, the corresponding NextPacketForRTU pointer is updated, and the corresponding Active bit is asserted.

The QS sends entries to an 8-entry table in the RTU block as long as the entry is a valid candidate and the corresponding slot in the RTU table is empty. The RTU will accept, at most, 8 entries, one per each interrupt that the RTU may generate to the SPU.

The QS maps the priority of the entry (given by the queue number where it resides) that it wants to send to the RTU into one of the 8 priorities handled by the RTU (RTU priorities). This mapping is shown in the table of FIG. 13, and it depends on the number of clusters into which the different queues are grouped (configuration register PriorityClusters) and the queue number in which the entry resides.

The RTU has a table of 8 entries, one for each RTU priority. Every entry contains a packet identifier (packetPage, packetNumber, queue#) and a Valid bit that validates it. The RTU always accepts a packet identifier of RTU priority p if the corresponding Valid bit in entry p of that table is de-asserted. When the RTU receives a packet identifier of RTU priority p from the QS, the Valid bit of entry p in the table is asserted, and the packet identifier is stored. At that time the QS can update the corresponding NextPacketForRTU pointer.

Limiting the Packets Sent within a Queue

Software can limit the number of packets that can be active (i.e. being processed by any of the streams in the SPU) on a per-queue basis. This is achieved through a MaxActivePackets on-the-fly configuration register, which specifies, for each queue, a value between 1 and 256 that corresponds to the maximum number of packets, within that queue, that can be being processed by any stream.

The QS maintains a counter for each queue q which keeps track of the current number of packets active for queue q. This counter is incremented whenever a packet identifier is sent from queue q to the RTU, a Move operation moves a packet into queue q, or an Insert operation inserts a packet identifier into queue q; and decremented when any one the following operations are performed in any valid entry in queue q: a Complete operation, an Extract operation, a Move operation that moves the entry to a different queue, or a MoveAndReactivate operation that moves the entry to any queue (even to the same queue). Move, MoveAndReactivate, Insert, Complete and Extract are operations described elsewhere in this specification.

Whenever the value of the counter for queue q is equal to or greater than the corresponding maximum value specified in the MaxActivePackets configuration register, no entry from queue q is allowed to be sent to the RTU. The value of the counter could be greater since software can change the MaxActivePackets configuration register for a queue to a value lower than the counter value at the time of the change, and a queue can receive a burst of moves and inserts.

Software Operations on the QS

Software executes several instructions that affect the QS. The following is a list of all operations that can be generated to the QS as a result of the dispatch by the SPU core of an XStream packet instruction:

Insert(p,q): the packetPage p is inserted into queue q. A '1' will be returned to the SPU if the insertion was successful, and a '0' if not. The insertion will be unsuccessful only when no entries are available (i.e. when all the 256 entries are valid).

Move(n,q): asserts to q the NextQueue field of the entry in which packetNumber n resides.

MoveAndReactivate(n,q): asserts to q the NextQueue field of the entry in which packetNumber n resides; de-asserts the Active bit.

Complete(n,d,e): asserts the Completed flag, the Delta field to d and the deviceId field to e of the entry in which packetNumber n resides. De-asserts the Active bit and de-asserts the KeepSpace bit.

CompleteAndKeepSpace(n,d,e): same as Complete( ) but it asserts the KeepSpace bit.

Extract(n): resets the Valid flag of the entry in which packetNumber n resides.

Replace(n,p): the PacketPage field of the entry in which packetNumber n resides is set to packetPage p.

Probe(n): the information whether the packetNumber n exists in the QS or not is returned to the software. In case it exists, it returns the PacketPage, Completed, NextQueue, DeviceId, CRCtype, Active, KeepSpace and Probed fields.

ConditionalActivate(n): returns a '1' if the packetNumber n is valid, Probed is asserted, Active is de-asserted, and the packet is not being transmitted. In this case, the Active bit is asserted.

The QS queries the RTU to determine whether the packet identifier of the packet to be potentially activated is in the RTU table, waiting to be preloaded, or being preloaded. If the packet identifier is in the table, the RTU invalidates it. If the query happens simultaneously with the start of preloading of that packet, the QS does not activate the packet.

ProbeAndSet(n): same as Probe( ) but it asserts the Probed bit (the returned Probed bit is the old Probed bit).

Probe(q): provides the size (i.e. number of valid entries) in queue q.

A Move( ), MoveAndReactivate( ), Complete( ), CompleteAndKeepSpace( ), Extract( ) and Replace( ) on an invalid (i.e. non-existing) packetNumber is disregarded (no interrupt is generated).

A Move, MoveAndReactivate, Complete, CompleteAndKeepSpace, Extract and Replace on a valid packetNumber with the Active bit de-asserted should not happen (guaranteed by software). If it happens, results are undefined. Only the Insert, Probe, ProbeAndSet and ConditionalActivate operations reply back to the SPU.

If software issues two move-like operations to the PMU that affect the same packet, results are undefined, since there is no guarantee that the moves will happen as software specified.

FIG. 14 is a table showing allowed combinations of Active, Completed, and Probed bits for a valid packet.

Basic Operations

To support the software operations and the monitoring logic, the QS implements the following basic operations:
1. Enqueue an entry at the tail of a queue.
2. Dequeue an entry from the queue in which it resides.
3. Move an entry from the head of the queue wherein it currently resides to the tail of another queue.
4. Provide an entry of a queue to the RTU.
5. Provide the size of a queue.
6. Update any of the fields associated to packetNumber.

Operations 1, 2, 4 and 6 above (applied to different packets at the same time) are completed in 4 cycles in a preferred embodiment of the present invention. This implies a throughput of one operation per cycle.

Some prioritization is necessary when two or more operations could start to be executed at the same time. From highest to lowest priority, these events are inserting from the PMMU, dequeuing an entry, moving an entry from one queue to another queue, sending an entry to the RTU for pre-loading, or a software operation. The prioritization among the software operations is provided by design since software operations are always executed in order.

Early QS Full Detection

The PMU implements a mechanism to aid in flow control between the ASIC (see element 203 in FIG. 2) and the XCaliber processor. Part of this mechanism is to detect that the QS is becoming full and, in this case, a LessThanXpacketIdEntriesInt interrupt is generated to the SPU. The software can enable this interrupt by specifying (in a IntIfLessThanXpacketIdEntries configuration register) a number z larger than 0. An interrupt is generated when $256-y<z$, being y the total number of packets currently in process in XCaliber. When $z=0$, the interrupt will never occur.

Register Transfer Unit (RTU)

A goal of the RTU block is to pre-load an available context with information of packets alive in XCaliber. This information is the packetPage and packetNumber of the packet and some fields of its header. The selected context is owned by the PMU at the time of the pre-loading, and released to the SPU as soon as it has been pre-loaded. Thus, the SPU does not need to perform the costly load operations to load the header information and, therefore, the overall latency of processing packets is reduced.

The RTU receives from the QS a packet identifier (packetPage, packetNumber) and the number of the queue from which the packet comes from) from the QS. This identifier is created partly by the PMMU as a result of a new packet arriving to XCaliber through the network input interface (packetPage), and partly by the QS when the packetPage and device identifier are enqueued (packetNumber).

Another function of the RTU is to execute masked load/store instructions dispatched by the SPU core since the logic to execute a masked load/store instruction is similar to the logic to perform a pre-load. Therefore, the hardware can be shared for both operations. For this reason, the RTU performs either a masked load/store or a pre-load, but not both, at a time. The masked load/store instructions arrive to the RTU through the command queue (CU) block.

Context States

A context can be in one of two states: PMU-owned or SPU-owned. The ownership of a context changes when the current owner releases the context. The PMU releases a context to the SPU in three cases. Firstly, when the RTU has finished pre-loading the information of the packet into the context. Secondly, the PMU releases a context to the SPU when the SPU requests a context to the RTU. In this case, the RTU will release a context if it has one available for releasing. Thirdly, all eight contexts are PMU-owned. Note that a context being pre-loaded is considered to be a PMU-owned context.

The SPU releases a context to the RTU when the SPU dispatches an XStream RELEASE instruction.

Pre-Loading a Context

At boot time, the PMU owns 7 out of the 8 contexts that are available in the embodiment of the invention described in the present example, and the SPU owns one context. The PMU can only pre-load information of a packet to a context that it owns. The process of pre-loading information of a packet into a context is divided into two steps. A first phase to load the address (the offset within the packet memory address space), from where the packet starts. This offset points to the first byte of the two-byte value that codes the size in bytes of the packet. In the case that the packet has been time stamped and HeaderGrowthOffset is not 0, the time stamp value is located at offset-4. The offset address is computed as (packetPage<<8)|(HeaderGrowthOffset<<4). This offset is loaded into register number StartLoadingRegister in the selected context. StartLoadingRegister is a boot-time configuration register. The packetNumber value is loaded in register number StartLoadingRegister+1.

The second phase is to load the packet header. The packet header is loaded using registers StartLoadingRegister+2, StartLoadingRegister+3, . . . (as many as needed, and as long as there exist GPR registers). The PatternMatchingTable[q] (q being the queue number associated to the packet) mask specifies how the header of the packet will be loaded into the GPR registers of the context. The PatternMatchingTable is an on-the-fly configuration register that contains masks. To obtain the header data, the RTU requests the SIU to read as many 16-byte lines of packet data as needed into the packet memory. The RTU, upon receiving the 16-byte lines from packet memory (either local or external), selects the desired bytes to load into the context using pattern mask to control this operation.

The step described immediately above of loading the packet header may be disabled by software on a per-queue basis through the on-the-fly PreloadMaskNumber configuration register. This register specifies, for each of the 32 possible queues in the QS, which mask (from 0 to 23) in the PatternMatchingTable is going to be used for the pre-loading. If a value between 24 and 31 is specified in the configuration register, it is interpreted by the RTU as not to perform.

The RTU only loads the GPR registers of a context. The required CP0 registers are initialized by the SPU. Since the context loaded is a PMU-owned context, the RTU has all the available write ports to that context (4 in this embodiment) to perform the loading.

Whenever the pre-loading operation starts, the RTU notifies this event to the SPU through a dedicated interface. Similarly, when the pre-loading operation is completed, the RTU also notified the SPU. Thus the SPU expects two notifications (start and end) for each packet pre-load. A special notification is provided to the SPU when the RTU starts and ends a pre-load in the same cycle (which occurs when the step of loading packet header is disabled). In all three cases, the RTU provides the context number and the contents of the CodeEntryPoint configuration register associated to the packet. In the case that the PMU releases a context to the SPU because all eight contexts are PMU-owned, the contents of the CodeEntryPointSpecial are provided to the SPU. The RTU has an 8-entry table (one for each context), each entry having a packet identifier ready to be pre-loaded and a valid bit that validates the entry. The RTU selects always the valid identifier of the highest entry index to do the pre-load. When a context is associated to this identifier, the corresponding valid bit is de-asserted. The RTU pre-loads one context at a time. After loading a context, the context is released to the SPU and becomes a SPU-owned context. At this point the RTU searches its table for the next packet to be pre-loaded into a context (in case there is at leas one PMU-owned context).

Pattern-Matching Table

Figure 15:
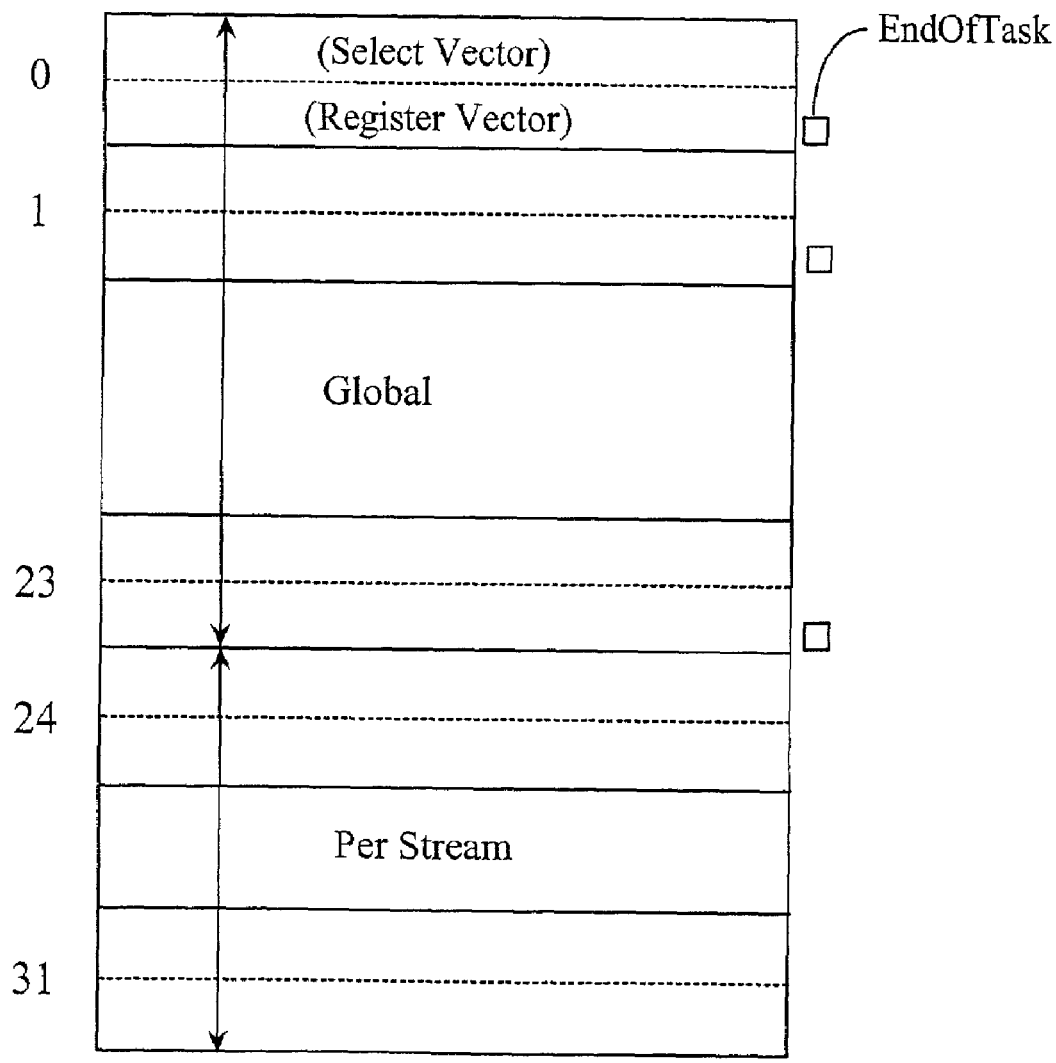
FIG. 15 is a Pattern Matching Table in an embodiment of the present invention.

FIG. 15 illustrates a Pattern Matching Table which is an on-the-fly configuration register that contains a set of sub-masks. The RTU can use any sub-mask (from 0 to 23) within this table for a pre-loading a context. Sub-masks can also be grouped into a larger mask containing two or more sub-masks.

Figure 16:
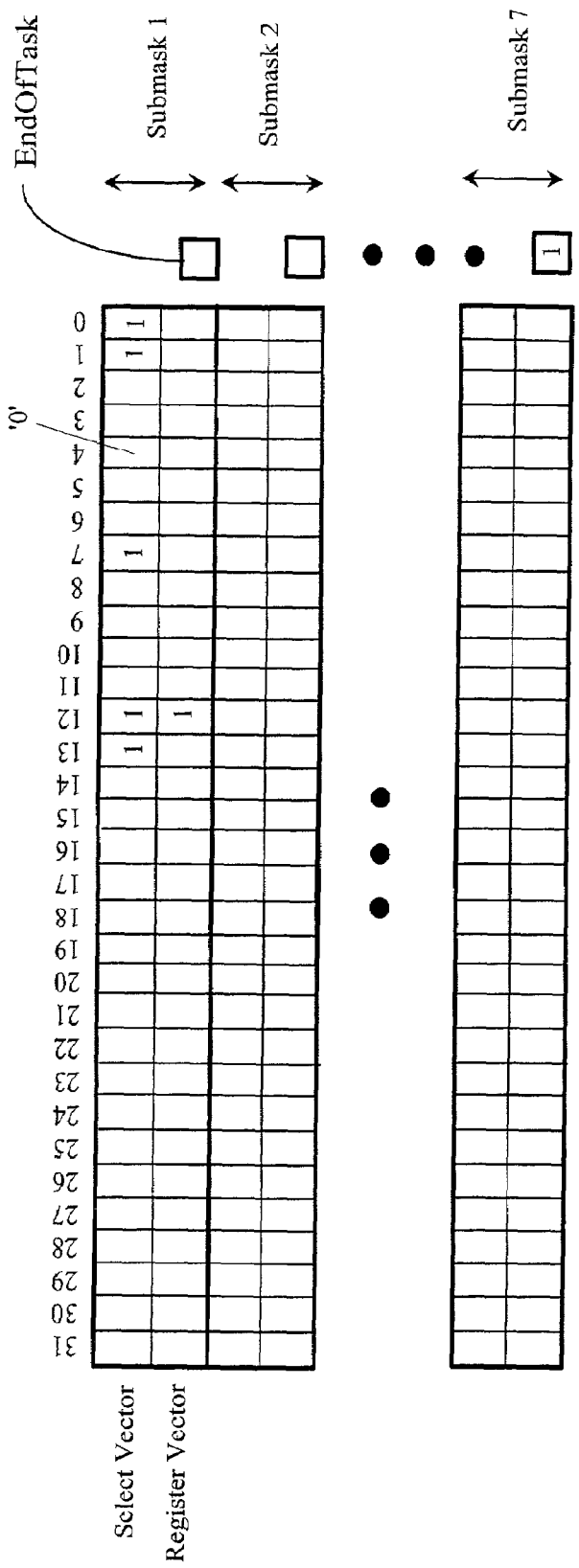
FIG. 16 illustrates the format of a mask in an embodiment of the invention.

FIG. 16 illustrates the format of a mask. A mask is a variable number (1 to 8) of sub-masks of 32×2 bits each, as shown. Every sub-mask has an associated bit (EndOfMask) that indicates whether the composite mask finishes with the corresponding sub-mask, or it continues with the next sub-mask. The maximum total number of sub-masks is 32, out of which 24 (sub-mask indexes 0 to 23) are global, which means any stream in the SPU can use and update them, and 8 are per-stream sub-masks. The per-stream sub-masks do not have an EndOfMask bit, which is because no grouping of per-stream sub-masks is allowed.

The two 32-bit vectors in each sub-mask are named SelectVector and RegisterVector. The SelectVector indicates which bytes from the header of the packet will be stored into the context. The RegisterVector indicates when to switch to the next consecutive register within the context to keep storing the selected bytes by the SelectVector. The bytes are always right aligned in the register.

Figure 17:
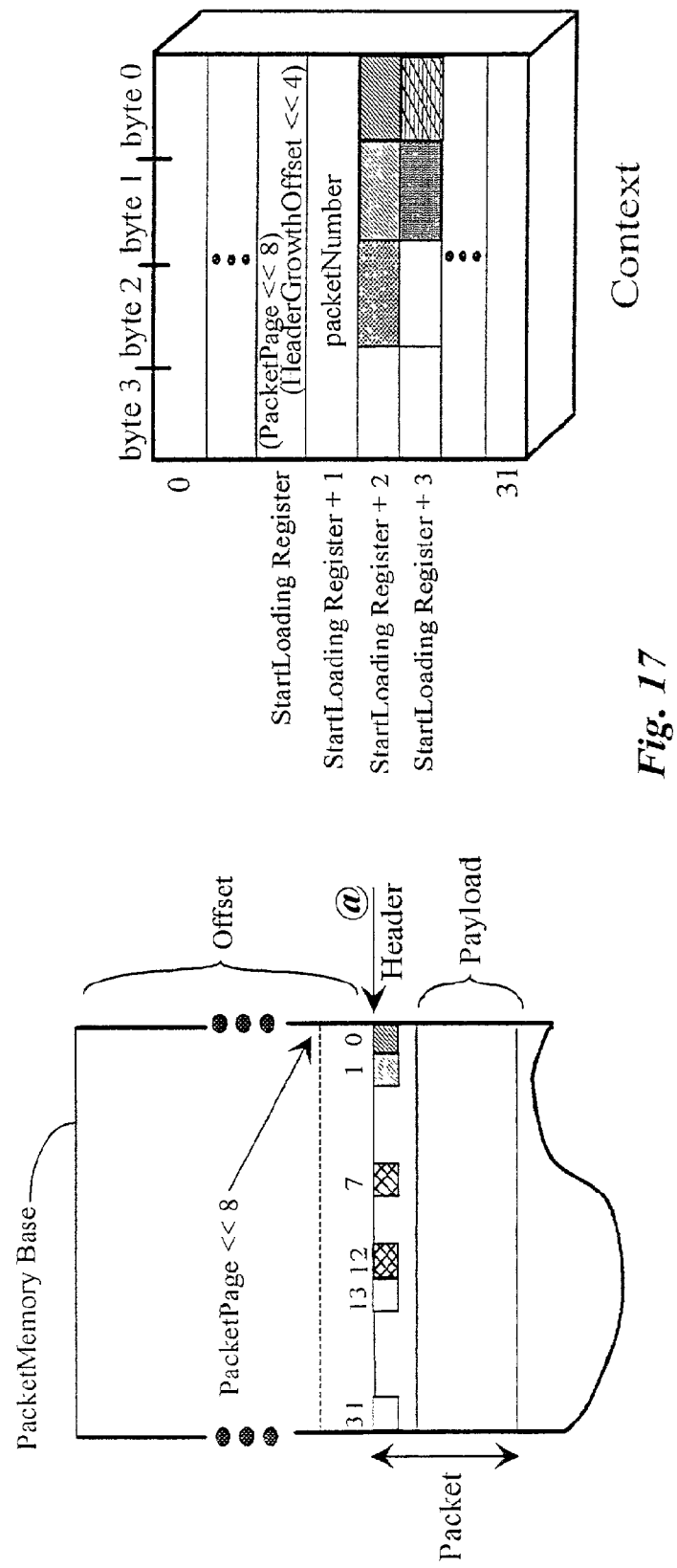
FIG. 17 shows an example of a pre-load operation using the mask in FIG. 16.

FIG. 17 shows an example of a pre-load operation using the mask in FIG. 16. A bit asserted in the SelectVector indicates that the corresponding byte of the header are stored into a register. In the example, bytes 0, 1 and 7 of the header are loaded into GPR number StartLoadingRegister+2 in bytes 0, 1 and 2, respectively (i.e. the header bytes are right-aligned when loaded into the register). A bit asserted in the RegisterVector indicates that no more header bytes are loaded into the current GPR register, and that the next header bytes, if any, are loaded into the next (consecutively) GPR register. In the example, bytes 12 and 13 of the header are loaded into GPR number StartLoadingRegister+3.

Selecting a PMU-Owned Context

There are a total of eight functional units in the SPU core. However, due to complexity-performance tradeoffs, a stream (context) can only issue instructions to a fixed set of 4 functional units.

The RTU may own at any given time several contexts. Therefore, logic is provided to select one of the contexts when a pre-load is performed, or when a context has to be provided to the SPU. This logic is defined based on how the different streams (contexts) in the SPU core can potentially dispatch instructions to the different functional units, and the goal of the logic is to balance operations that the functional units in the SPU can potentially receive.

The selection logic takes as inputs eight bits, one per context, that indicates whether that context is PMU or SPU-owned. The logic outputs which PMU-owned context(s) that can be selected.

1, 2, 3, 4, 5, 6, 7, 8, 9, 10, 11, 12, 13, 14, 15, 16, 17, 18, 3, 20, 5, 6, 7, 24, 9, 10, 11, 12, 13, 14, 15, 32, 33, 34, 3, 36, 5, 6, 7, 40, 9, 10, 11, 12, 13, 14, 15, 48, 48, 48, 51, 48, 53, 54, 7, 48, 57, 58, 11, 60, 13, 14, 15, 64, 65, 66, 3, 68, 5, 6, 7, 72, 9, 10, 11, 12, 13, 14, 15, 80, 80, 80, 83, 80, 85, 86, 7, 80, 89, 90, 11, 92, 13, 14, 15, 96, 96, 96, 99, 96, 101, 102, 7, 96, 105, 106, 11, 108, 13, 14, 15, 112, 112, 112, 112, 112, 112, 112, 119, 112, 112, 112, 123, 112, 125, 126, 15, 128, 129, 130, 3, 132, 5, 6, 7, 136, 9, 10, 11, 12, 13, 14, 15, 144, 144, 144, 147, 144, 149, 150, 7, 144, 153, 154, 11, 156, 13, 14, 15, 160, 160, 160, 163, 160, 165, 166, 7, 160, 169, 170, 11, 172, 13, 14, 15, 176, 176, 176, 176, 176, 176, 183, 176, 176, 176, 187, 176, 189, 190, 15, 192, 192, 192, 195, 192, 197, 198, 7, 192, 201, 202, 11, 204, 13, 14, 15, 208, 208, 208, 208, 208, 208, 208, 215, 208, 208, 208, 219, 208, 221, 222, 15, 224, 224, 224, 224, 224, 224, 224, 231, 224, 224, 224, 235, 224, 237, 238, 15, 240, 240, 240, 240, 240, 240, 240, 240, 240, 240, 240, 240, 240, 240

The selection logic is specified with the previous list of 254 numbers. Each number is associated to a possible combination of SPU/PMU-owned context. For example, the first number corresponds to the combination '00000001' i.e. context number 0 is PMU owned and context numbers 1 to 7 are SPU owned (LSB digit corresponds to context 0, MSB digit to context 7; digit value of 0 means SPU owned, digit value of 1 means PMU owned). The second number corresponds to combination '00000010', the third to combination '00000011', and so forth up to combination '11111110'. The $19^{th}$ combination ('00010011') has associated number 3 (or '00000011') in the previous list, which means that context 0 and 1 can be selected. Context 4 could also be selected, however it is not the best choice to balance the use of the functional units in the SPU core.

Interrupt when No Context is Available

The RTU has a table of 8 entries named NewPacketId-Table). Entry p in this table contains a packet identifier (packetPage, packetNumber and queue number) with an RTU-priority of p, and a Valid bit that validates the identifier. When the RTU is not busy pre-loading or executing a masked load/store, it will obtain from this table the valid identifier with the highest RTU-priority. In case it exists and there is at least one PMU-owned context, the RTU will start the pre-loading of a PMU-owned context, and it will reset the Valid bit in the table.

In case there is no PMU-owned context, the RTU sits idle (assuming no software operation is pending) until a context is released by the SPU. At that point in time the RTU obtains, again, the highest valid RTU-priority identifier from the NewPacketIdTable (since a new identifier with higher RTU priority could have been sent by the QS while the RTU was waiting for a context to be released by the SPU). The Valid bit is reset and the packet information starts being pre-loaded into the available context. At this point the RTU is able to accept a packet with RTU priority p from the QS.

When an identifier with a RTU priority of p is sent by the QS to the RTU, it is loaded in entry p in the NewPacketId-Table, and the Valid bit is set. At this time, if the number of valid identifiers (without counting the incoming one) in the NewPacketIdTable is equal or larger than the current available PMU-owned contexts (without counting the context that the RTU currently might be loading), then a Packet-AvailableButNoContextPriorityP Int interrupt is generated to the SPU. P ranges from 0 to 7, and its value is determined by a boot-time configuration flag PacketAvailableButNo ContextIntMapping. If this flag is '0', P is determined by the 3-bit boot-time configuration register DefaultPacketPriority. If this flag is '1', P is the RTU priority. However, the PacketAvailableButNoContextPriorityPint will not be generated if the corresponding configuration flag PacketAvailableButNo ContextPriorityPintEnable is de-asserted.

The SPU, upon receiving the interrupt, decides whether or not to release a context that it owns so that the RTU can pre-load the packetPage, packetNumber and header information of the new packet.

When the RTU generates a PacketAvailableButNoContext PriorityPInt interrupt, it may receive after a few cycles a context that has been released by the SPU. This context, however, could have been released when, for example, one of the streams finished the processing of a packet. This can happen before the interrupt service routine for the PacketAvailable ButNoContextPriorityPInt interrupt finishes. Thus, when a context is released due to the ISR completion, the packet pre-load that originated the interrupt already might have used the context first released by another stream in the SPU. Thus, the context released due to the interrupt will be used for another (maybe future) packet pre-load. If no other entry is valid in the NewPacketIdTable, the context is be used and sits still until either an identifier arrives to the RTU or the SPU requesting a context to the RTU.

Whenever a context becomes SPU-owned, and the RTU has a pre-load pending, the RTU selects the most priority pending pre-load (which corresponds to the highest-valid entry in the NewPacketTable), and will start the preload. If the PacketAvailableButNoContextPriorityint interrupt associated to this level was asserted, it gets de-asserted when the pre-load starts.

Software Operations on the RTU

Software executes a number of instructions that affect the RTU. Following is a list of all operations that can be generated to the RTU as a result of dispatch by the SPU core of an XStream packet instruction. The operations arrive to the RTU through the command queue (CU), along with the context number associated to the stream that issued the instruction:

1. Release(c): context number c becomes PMU owned.
2. GetContext: the RTU returns the number of a PMU-owned context number. This context, if it exists, becomes SPU owned and a success flag is returned asserted; otherwise it is return de-asserted, in which case the context number is meaningless.
3. MaskedLoad(r,a,m), MaskedStore(r,a,m): the SPU core uses the RTU as a special functional unit to execute the masked load/store instructions since the logic to execute a masked load/store instruction is similar to the logic to perform a pre-load. Therefore, the hardware can be shared for both operations. For this reason, the RTU performs either a masked load/store or a pre-load, but not both at a time. For either the masked load or masked store, the RTU will receive the following parameters:
   (a) A mask number m that corresponds to the index of the first submask in the PatternMatchingTable to be used by the masked load/store operation.

(b) A 36-bit address a that points to the first byte in (any) memory to which the mask will start to be applied.

(c) A register number r (within the context number provided) that corresponds to the first register involved in the masked load/store operation. Subsequent registers within the same context number will be used according to the selected mask.

For masked load/store operations, the mask can start to be applied at any byte of the memory, whereas in a pre-load operation (a masked-load like operation) the mask will always be applied starting at a 16-byte boundary address since packet data coming from the network input interface is always stored in packet memory starting at the LSB byte in a 16-byte line.

The MaskedLoad, MaskedStore and GetContext operations communicate to the SPU when they complete through a dedicated interface between the RTU and the SPU. The RTU gives more priority to a software operation than packet pre-loads. Pre-loads access the packet memory whereas the masked load/store may access any memory in the system as long as it is not cacheable or write-through. If not, results are undefined.

The RTU is able to execute a GetContext or Release command while executing a previous masked load/store command.

Programming Model

Software can configure, either at boot time or on the fly, several of the features of the PMU. All of the features configurable at boot time only, and some configurable on the fly, must happen only when the SPU is running in a single-stream mode. If not, results are undefined. The PMU does not check in which mode the SPU is running.

Software can update some of the information that the PMU maintains for a given packet, and also obtain this information. This is accomplished by software through new XStream packet instructions that are the subject of separate patent applications. These instructions create operations of three different types (depending on which block of the PMU the operation affects, whether PMMU, QS or RTU) that will be executed by the PMU. Some of the operations require a result from the PMU to be sent back to the SPU.

The packet memory and configuration space are memory mapped. The SIU maintains a configuration register (16 MB aligned) with the base address of the packet memory, and a second configuration register with the base address of EPM. Software sees the packet memory as a contiguous space. The system, however, allows the EPM portion of the packet memory to be mapped in a different space.

The SIU also maintains a third configuration register with the base of the PMU configuration register space. All the load/store accesses to LPM and configuration space performed by the SPU reach the PMU through the SIU. The SIU determines to which space the access belongs, and lets the PMU know whether the access is to LPM or to the PMU configuration space. Accesses to the EPM are transparent to the PMU.

The PMU can interrupt the SPU when certain events happen. Software can disable all these interrupts through configuration registers.

Configuration Registers

The configuration registers of the PMU reside in the PMU Configuration Space of the XCaliber address space. The base address of this space is maintained by the SIU and does not need to be visible by the PMU. The SIU notifies to the PMU with a signal when a read/write access performed by the SPU belongs to this space, along with the information needed to update the particular register on a write access.

Some of the PMU configuration registers can be configured only at boot time, and some can be configured on the fly. All boot-time configurable and some on-the-fly configurable registers need to be accessed in single-stream mode. A boot-time configurable register should only be updated if the PMU is in reset mode. Results are undefined otherwise. The PMU will not check whether the SPU is indeed in single-stream mode when a single-stream mode configuration register is updated. All the configuration registers come up with a default value after the reset sequence.

In the instant embodiment 4 KB of the XCaliber address space is allocated for the PMU configuration space. In XCaliber's PMU, some of these configuration registers are either not used or are sparsely used (i.e. only some bits of the 32-bit configuration register word are meaningful). The non-defined bits in the PMU configuration space are reserved for future PMU generations. Software can read or write these reserved bits but their contents, although fully deterministic, are undefined.

Figure 18:
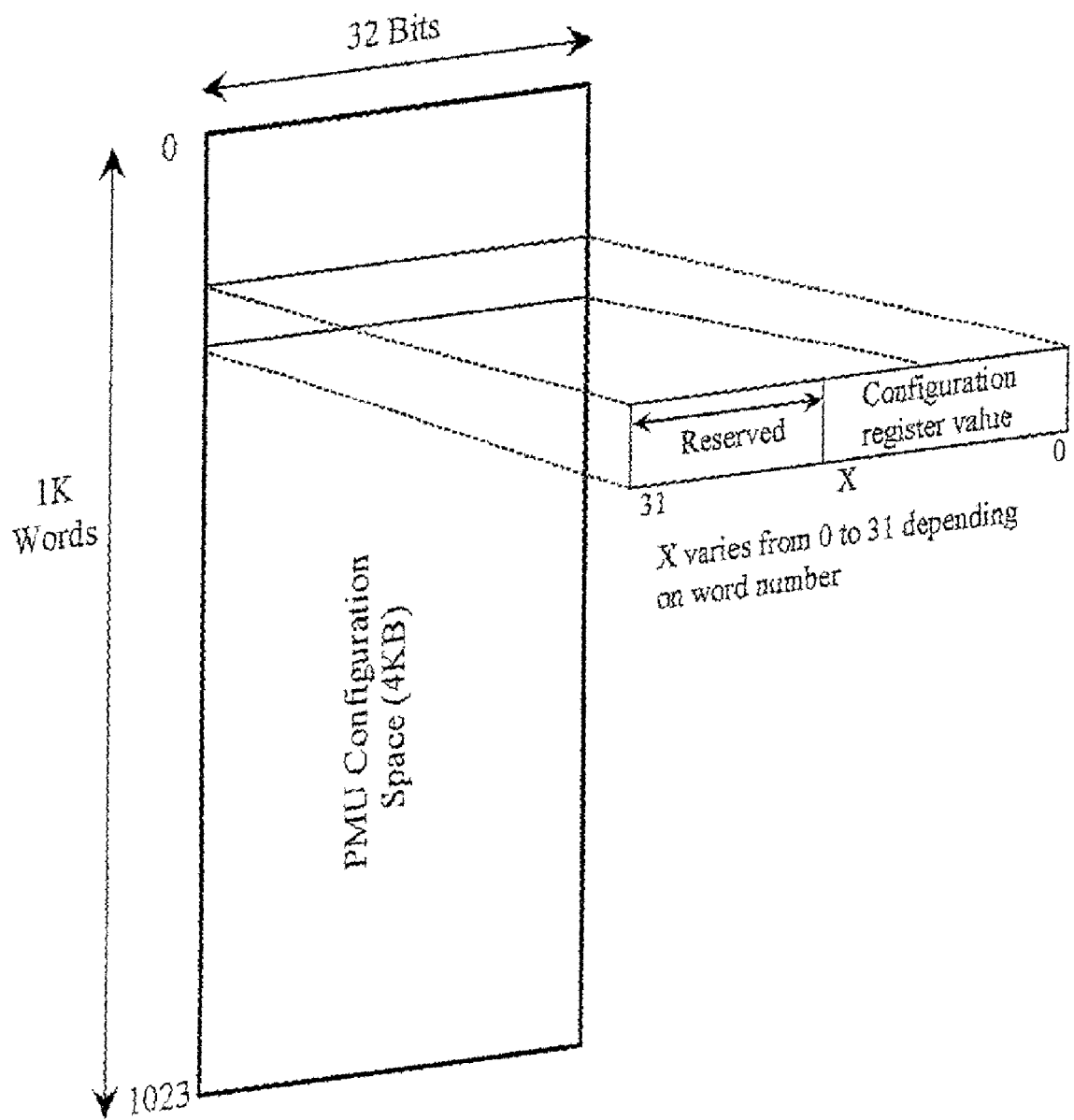
FIG. 18 illustrates shows the PMU Configuration Space in an embodiment of the present invention.
Figure 20:
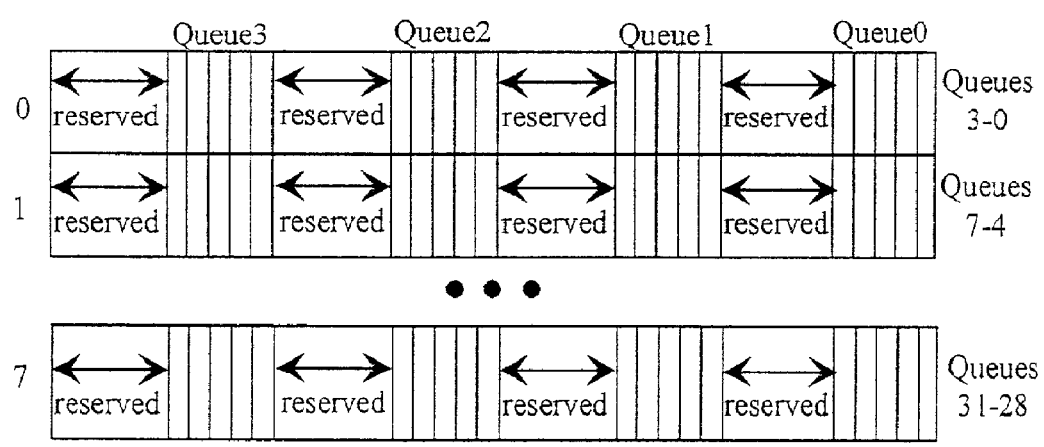
FIG. 20 is an illustration of a PreloadMaskNumber configuration register.

FIG. 18 shows the PMU Configuration Space, which is logically divided into 32-bit words. Each word or set of words contains a configuration register.

FIGS. 19a and 19b are two parts of a table showing mapping of the different PMU configuration registers into the different words of the configuration space. The block owner of each configuration register is also shown in the table.

Following is the list of all configuration registers in this particular embodiment along with a description and the default value (after PMU reset). For each of the configuration registers, the bit width is shown in parenthesis. Unless otherwise specified, the value of the configuration register is right aligned into the corresponding word within the configuration space.

Boot-Time Only Configuration Registers:

1. Log2InputQueues (5)
   (a) Default Value: 0
   (b) Description: Number of queues in the QS used as input queues (i.e. number of queues in which packetPages/deviceIds from the PMMU will be inserted).

2. PriorityClustering (3)
   (a) Default Value: 5 (32 clusters)
   (b) Description: Specifies how the different queues in the QS are grouped in priority clusters (0: 1 cluster, 1: 2 clusters, 2: 4 clusters, . . . , 5: 32 clusters).

3. HeaderGrowthOffset (4)
   (a) Default Value: 0
   (b) Description: Number of empty 16-byte chunks that will be left in front of the packet when it is stored in packet memory. Maximum value is 15 16-byte chunks. Minimum is 0.

4. TailGrowthOffset (6)
   (a) Default Value: 0
   (b) Description: Number of empty 16-byte chunks that will be left at the end of the packet when it is stored in packet memory. Maximum value is 63 16-byte chunks. Minimum is 0.

5. PacketAvailableButNoContextIntMapping (1)
   (a) Default Value: 0
   (b) Description: Specifies the P in the PacketAvailableButNoContextPriorityPInt interrupt, if enabled. The possible values are:

(1) 0: P is specified by the DefaultPacketPriority register.
(2) 1: P is the RTU priority.

6. StartLoadingRegister (5)
   (a) Default Value: 1
   (b) Description: Determines the first GPR register number to be loaded by the RTU when performing the background load of the packet header on the chosen context. In this register, the value (packetPage<<8)|(HeaderGrowthOffset<<4) is loaded. The packetNumber is loaded in the next GPR register. The following GPR registers will be used to pre-load the packet header data following PatternMatchingMask0 mask if this feature is enabled.

7. PreloadMaskNumber (32×5)
   (a) Default Value: mask 31 for all queues (i.e. pre-load of header is disabled).
   (b) Description: It specifies, for each of the 32 possible queues in the QS, which mask in the PatternMatchingTable is going to be used for pre-loading.

FIGS. 19a-c show a mapping of the PreloadMaskNumber configuration register.

The configuration registers described above are the boot-time-only configuration registers in the instant example. Immediately below are listed the On-The-Fly configuration registers.

Single-Stream Configuration Registers

1. OverflowEnable (1)
   (a) Default Value: 0
   (b) Description: Enables/disables the overflow of packets in case they do not fit into LPM. When disabled, these packets are dropped.

2. PatternMatchingTable (24×(32×2+1))
   (a) Default Value (per each of the 24 entries):
      (1) SelectVector: select all bytes
      (2) RegisterVector: store 4 consecutive bytes per register
      (3) EndOfMask: 1
   (b) Description: It specifies, for masked load/store operations, which bytes to load/store and in which (consecutive) registers. Mask 0 of this table is used by the RTU to pre-load, in the background, some bytes of the header of the packet in one of the available contexts. There are a total of 24 masks.
   (c) Note: Mask 0 needs to be written when the PMU is freezed (see Section 0), otherwise results are undefined.

Figure 21:
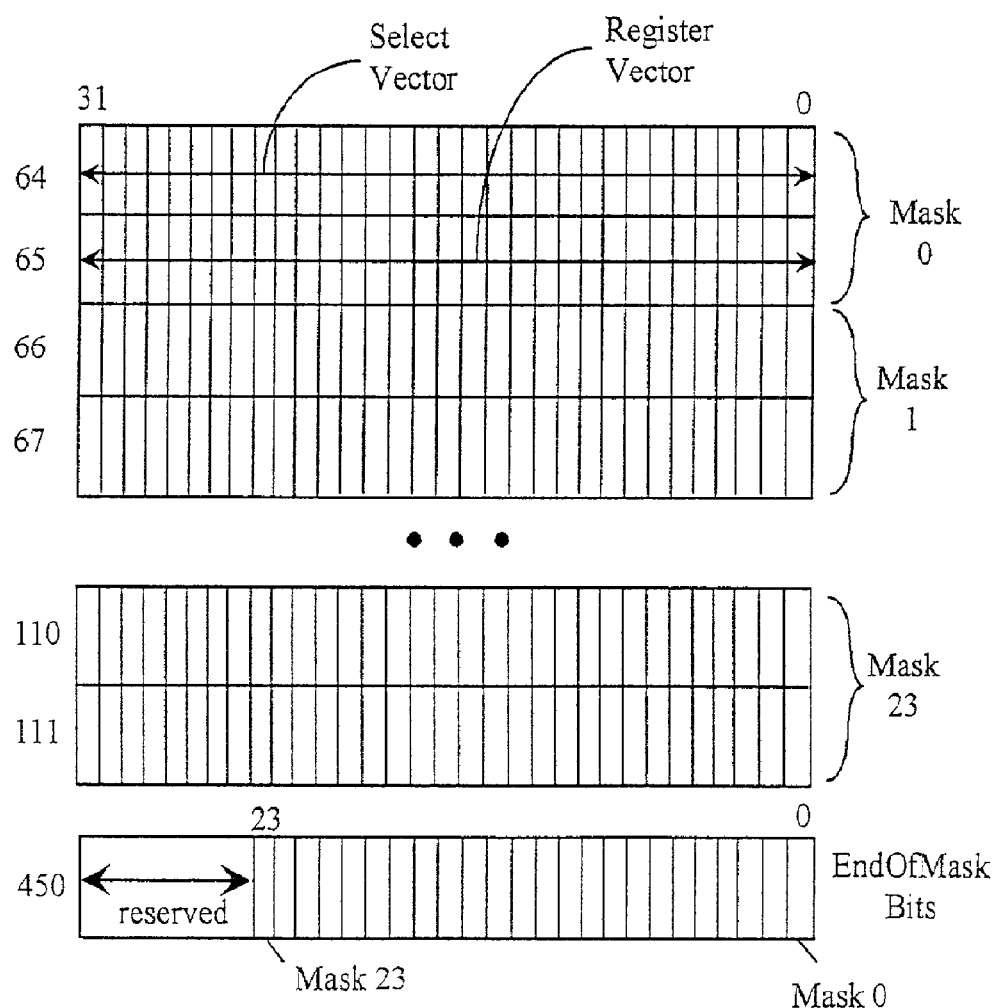
FIG. 21 illustrates a PatternMatching Table in a preferred embodiment of the present invention.

FIG. 21 illustrates the PatternMatchingTable described immediately above.

3. Freeze (1)
   (a) Default Value: 1
   (b) Description: Enables/disables the freeze mode.

4. Reset (1)
   (a) Default Value: 0
   (b) Description: When set to 1, forces the PMU to perform the reset sequence. All packet data in the PMU will be lost. After the reset sequence all the configuration registers will have the default values.

Multi-Stream Configuration Registers

1. ClearErrorD (D=0,1)
   (a) Default Value: 0
   (b) Description: When written by software (with any data), the packet error condition detected on device identifier D is cleared.

2. PacketAvailableButNoContextPriorityPintEnable (8) [P=0 . . . 7]
   (a) Default Value: 0 (for all levels)
   (b) Description: Enables/disables the PacketAvailableButNoContextPriorityPint interrupt.

3. AutomaticPacketDropIntEnable (1)
   (a) Default Value: 1
   (b) Description: Enables/disables the AutomaticPacketDropInt interrupt.

4. TimeStampEnable (1)
   (a) Default Value: 0
   (b) Description: Enables/disables the time stamp of packets. When enabled and HeaderGrowthOffset is greater than 0, a 4-byte time stamp is appended to the packet before it is written into the packet memory.

5. PacketErrorIntEnable (1)
   (a) Default Value: 0
   (b) Description: Enables/disables the PacketErrorInt interrupt.

6. VirtualPageEnable (9×4)
   (a) Default Value: all virtual pages enabled for all blocks.
   (b) Description: Enables/disables the virtual pages for each of the 4 blocks that the LPM is divided into. There are up to 9 virtual pages, from 256 bytes (enabled by the LSB bit) up to 64K bytes (enabled by the MSB bit), with all power-of-two sizes in between.

Figure 22:
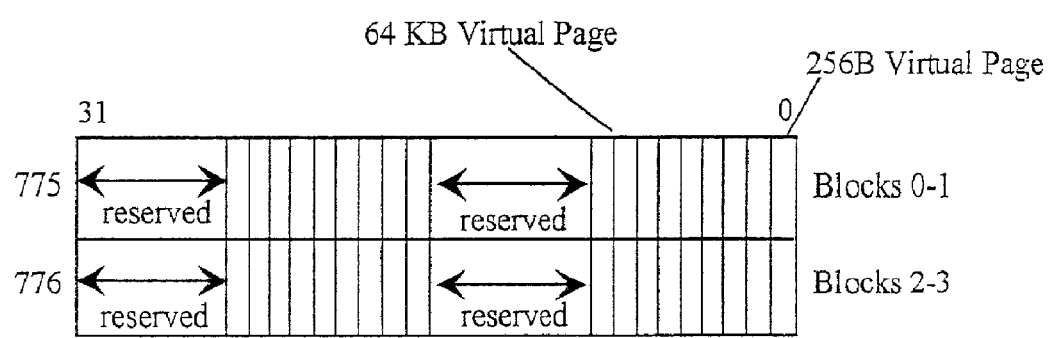
FIG. 22 illustrates a VirtualPageEnable configuration register in an embodiment of the invention.

FIG. 22 illustrates the VirtualPageEnable register.

7. OverflowAddress (24)
   (a) Default Value: 0x40000 (the first atomic page in the EPM)
   (b) Description: the 16 MSB bits correspond to the atomic page number in packet memory into which the packet that is overflowed will start to be stored. The 8 LSB are hardwired to '0' (i.e. any value set by software to these bits will be disregarded). OverflowAddress is then the offset address within the 16 MB packet memory. The SIU will translate this offset into the corresponding physical address into the EPM. The first 1K atomic pages of the packet memory correspond to the LPM. If software sets the 16 MSB of OverflowAddress to 0 . . . 1023, results are undefined. When a packet is overflowed, the 16 MSB bits of OverflowAddress become the packetPage for that packet. The SPU allows the next packet overflow when it writes into this configuration register.

8. IntIfNoMoreXsizePages (4)
   (a) Default Value: 0xF (i.e. the interrupt will never be generated)
   (b) Description: Specifies the index of a virtual page (0:256 bytes, 1:512 bytes, . . . , 8:64 K bytes, 9-15: no virtual page). Whenever the PMMU detects that there are no more virtual pages of that size in all the LPM, the NoMoreThanXSizePagesInt interrupt will be generated to the SPU.

9. IntIfLessThanXpacketIdEntries (9)
   (a) Default Value: 0
   (b) Description: Minimum number of entries in the QS available for new packet identifiers. If the actual number of available entries is less than this number, an interrupt will be generated to the SPU. If this number is 0, the LessThanXPacketIdEntriesInt interrupt will not be generated.

10. DefaultPacketPriority (3)
    (a) Default Value: 0
    (b) Description: Provides the priority level for the PacketAvailableButNoContextInt interrupt when PacketAvailableButNoContextMapping is 0.

11. ContextSpecificPatternMatchingMask: (8×(32×2))
   (a) Default Value:
      (1) SelectVector: select all bytes
      (2) RegisterVector: store 4 bytes in each register (EndOfMask is hardwired to 1)
   (b) Description: It specifies, for masked load/store operations, which bytes to load/store and in which (consecutive) registers. Software will guarantee that a stream only access its corresponding context-specific mask.

Figure 23:
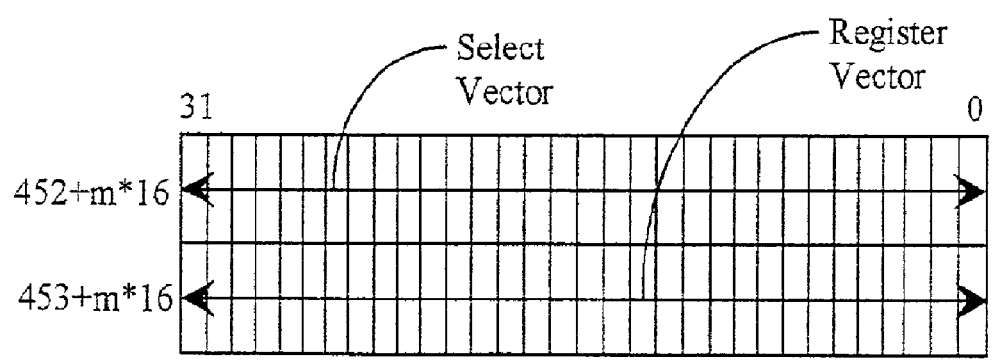
FIG. 23 illustrates a ContextSpecificPatternMatchingMask configuration register in an embodiment of the invention.

FIG. 23 illustrates the ContextSpecificPAtternMAtching mask configuration register.

12. FirstInputQueue (5)
   (a) Default Value: 0
   (b) Description: Specifies the smallest number of the queue into which packets from the PMMU will be inserted.
13. SoftwareOwned (4)
   (a) Default Value: 0 (not software owned)
   (b) Description: one bit per LPM block. If '1', the block is software owned, which implies that the memory of the block is managed by software, and that the VirtualPageEnable bits for that block are a don't care.
14. MaxActivePackets (32×9)
   (a) Default Value: 256 for each of the queues.
   (b) Description: Specifies, for each queue q, a value between 0 and 256 that corresponds to the maximum number of packets within queue q that can be being processed by the SPU.

Figure 24:
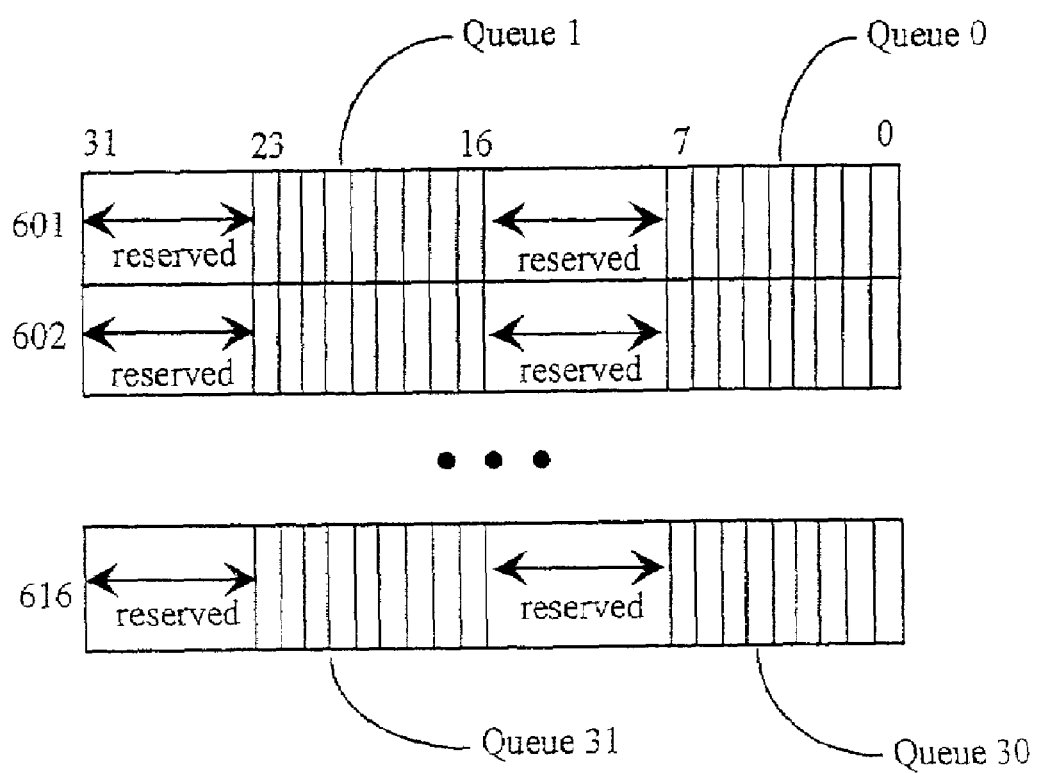
FIG. 24 illustrates the MaxActivePackets configuration register in an embodiment of the present invention.

FIG. 24 illustrates the MaxActivePackets configuration register.

15. CodeEntryPoint (32×30)
   (a) Default Value: 0 for each of the queues.
   (b) Description: The contents of the CodeEntryPoint register associated to queue q are sent to the SPU when a context is activated which has been pre-loaded with a packet that resides in queue q.
16. CodeEntryPointSpecial (30)
   (a) Default Value: 0
   (b) Description: The contents of this register are sent to the SPU when a context is activated due to the fact that all the contexts become PMU-owned.
17. Bypass Hooks (9)
   (a) Default Value: 0
   (b) Description: See FIG. 32. Each bit activates one hardware bypass hook. The bypass hook is applied for as many cycles as the corresponding bit in this register is asserted.
18. InternalStateWrite (12)
   (a) Default Value: 0
   (b) Description: See FIG. 33. Specifies one word of internal PMU state. The word of internal state will be available to software when reading the InternalStateRead configuration register. The InternalStateWrite configuration register is only used in one embodiment to debug the PMU.

Read-Only Registers
1. SizeOfOverflowedPacket (16)
   (a) Default Value: 0
   (b) Description: Whenever the PMU has to overflow a packet, this register will contain the size in bytes of that packet.
2. TimeCounter (64)
   (a) Default Value: 0
   (b) Description: Contains the number of core clock cycles since the last reset of the PMU.

Figure 25:
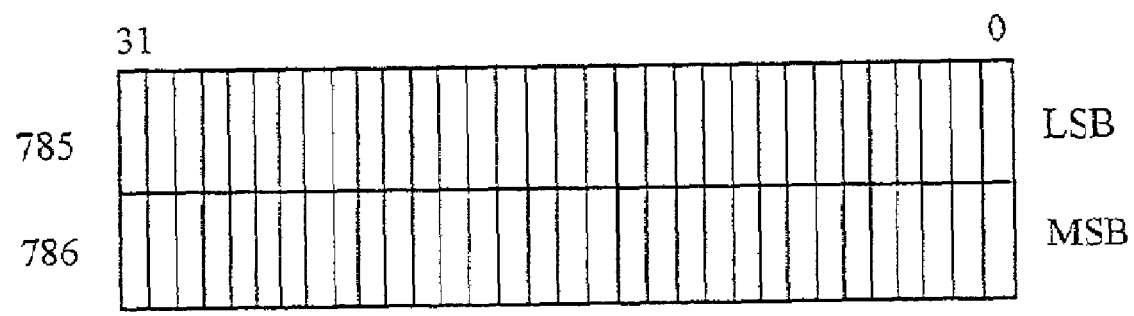
FIG. 25 illustrates the TimeCounter configuration register in an embodiment of the present invention.

The TimeCounter configuration register is illustrated in FIG. 25.
3. StatusRegister (8)
   (a) Default Value: 1
   (b) Description: Contains the state of the PMU. This register is polled by the SPU to figure out when the reset or freeze has completed (Freeze and Reset bits), or to figure out the source of packet error per inbound device identifier (Err: 1—error, 0—no error; EPM: 1—error has occurred while packet is overflowed to EPM, 0—error has occurred while packet is being stored in LPM; PSM: 1—error due to a packet size mismatch, 0—error due to a bus error).

Figure 26:
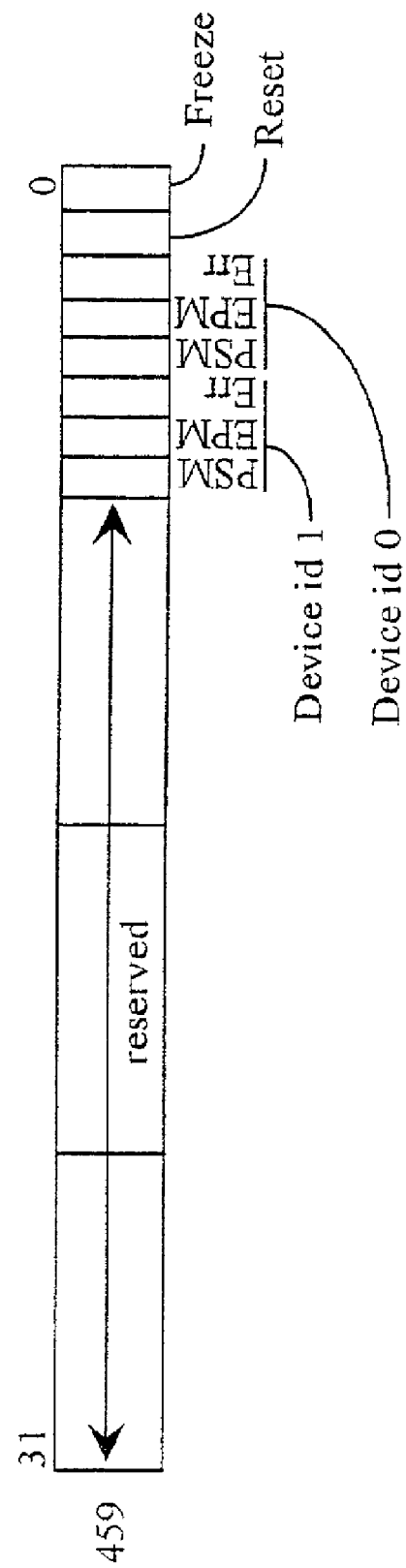
FIG. 26 illustrates the StatusRegister configuration register in an embodiment of the invention.

FIG. 26 illustrates the StatusRegister configuration register

Interrupts

The PMU can interrupt the SPU when certain events happen. Software can disable all these interrupts using some of the configuration registers listed above. Moreover, each stream can individually mask these interrupts, which is the subject of a separate patent application. The list of interrupts that the PMU generate are as follows:
1. OverflowStartedInt
   (a) Interrupt Condition: When the PMMU cannot store the incoming packet into the LocalPacketMemory, it will overflow the packet to the ExternalPacketMemory through the SIU.
   (b) Disable Condition: OverflowEnable='0'
2. NoMorePagesOfXSizeInt
   (a) Interrupt Condition: When no more free virtual pages of the size indicated in IntIfNoMoreXSizePages are available.
   (b) Disable Condition: IntIfNoMoreXSizePages={10, 11, 12, 13, 14, 15}.
3. LessThanXPacketIdEntriesInt
   (a) Interrupt Condition: When the actual number of available entries in the QS is less than IntIfLessThanXPacketIdEntries.
   (b) Disable Condition: IntIfLessThanXPacketIdEntries=0
4. PacketAvailableButNoContextPriorityPint (P=0 . . . 7)
   (a) Interrupt Condition: When a packet identifier is received by the RTU from the QS but there is no available context.
   (b) Disable Condition: PacketAvailableButNoContextPriorityPIntEnable='0'
5. AutomaticPacketDropInt
   (a) Interrupt Condition: When a packet cannot be stored in LPM and OverflowEnable='0'.
   (b) Disable Condition: AutomaticPacketDropIntEnable='0'
6. PacketErrorInt
   (a) Interrupt Condition: When the actual size of the packet received from the ASIC does not match the value in the first two bytes of the ASIC-specific header, or when a bus error has occurred.
   (b) Disable Condition: PacketErrorIntEnable='0'

Interrupts to the SPU in this embodiment are edge-triggered, which means that the condition that caused the interrupt is cleared in hardware when the interrupt is serviced. This also implies that the condition that causes the interrupt may happen several times before the interrupt is served by the SPU. Therefore, the corresponding interrupt service routine will be executed only once, even though the condition that causes the interrupt has happened more than once.

This behavior is not desirable for some of the interrupts. For these cases, a special interlock mechanism is implemented in hardware that guarantees that the condition will not happen again until the interrupt has been serviced.

An example of the special interlock mechanism is the case of the OverflowStartedInt and PacketAvailableButNoContextPriorityPInt interrupts. In the first case, when a packet is overflowed, no other packet are overflowed until the software writes a new address in the on-the-fly configuration register OverflowAddress. If a packet has been overflowed but the OverflowAddress register still has not been written by the software, any subsequent packet that would have otherwise been overflowed because it does not fit in the LPM must be dropped.

For the 8 PacketAvailableButNoContextPriorityPInt (P=0 . . . 7) interrupts, the PMU architecture implicitly guarantees that no multiple conditions (per each P) will occur. This is guaranteed by design since:
 (a) the PacketAvailableButNoContextPriorityPInt interrupt is only generated when a packet identifier of RTU priority P arrives to the RTU, and
 (b) at most, only one packet identifier with RTU priority P resides in the RTU.

The other interrupts can suffer from the multiple condition effect. Therefore, software should not rely on counting the number of times a given type of interrupt happens to figure out exactly how many times that condition has occurred.

Protection Issues

The architecture of the PMU in the instant embodiment creates the following protection issues:
1. An stream could read/write data from a packet other than the one it is processing. An stream has access to all the packet memory, and there is no mechanism to prevent an stream from accessing data from a totally unrelated packet unless the packet memory is mapped as kernel space.
2. Since the configuration registers are memory mapped, any stream could update a configuration register, no matter whether the SPU is in single-stream mode or not. In particular, any stream could freeze and reset the PMU.
3. Whenever a packet is completed or moved with reactivation, nothing prevents software from continuing "processing" the packet.

Command Unit (CU)

Software can update some information that the PMU maintains for a given packet and obtain this information. This is accomplished by software through some of the new XStream packet instructions referred to above. Some of these instructions are load-like in the sense that a response is required from the PMU. Others are store-like instructions, and no response is required from the PMU.

Figure 27:
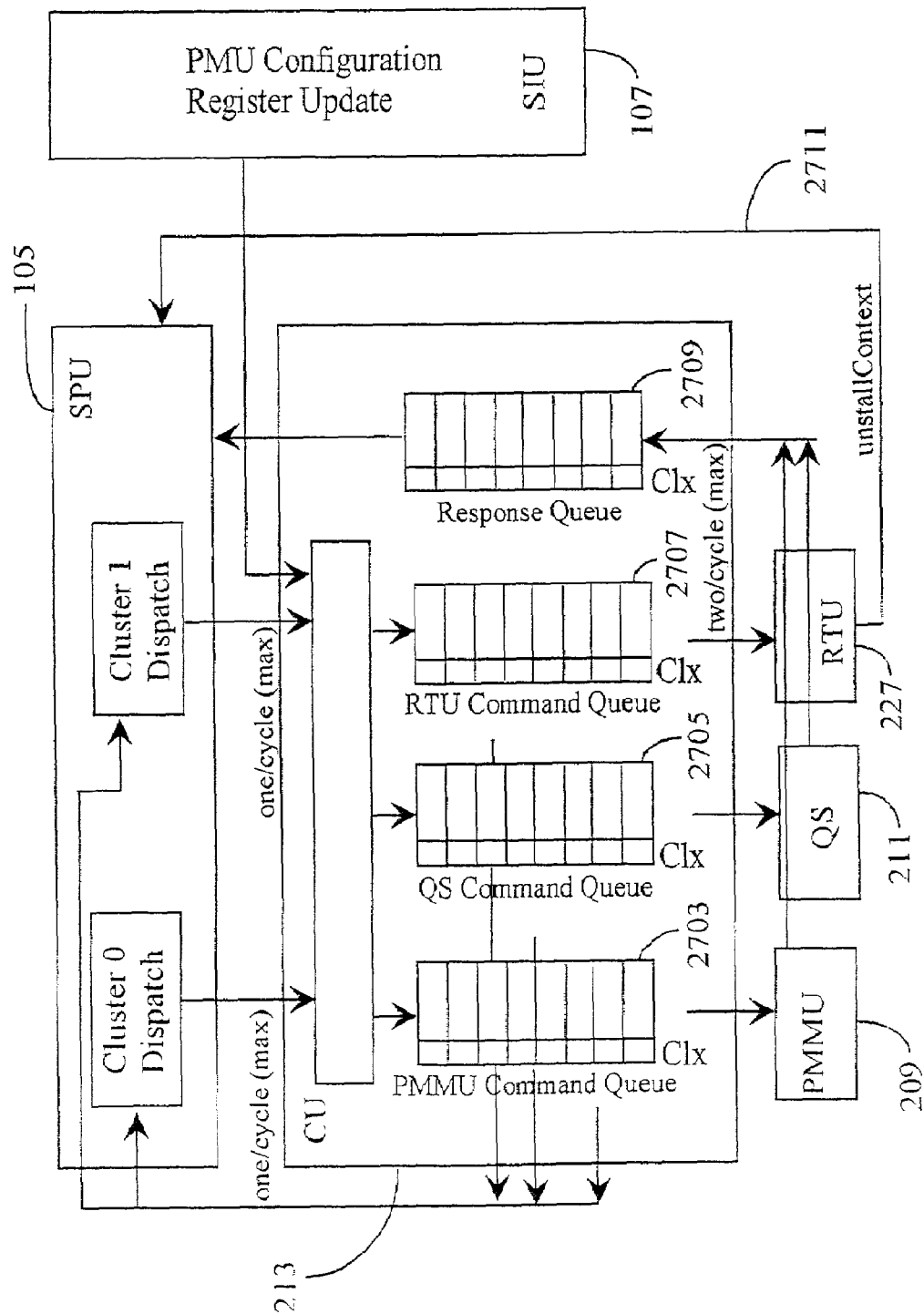
FIG. 27 is a schematic of a Command Unit and command queues in an embodiment of the present invention.

FIG. 27 is a diagram of Command Unit 213 of FIG. 2, in relation to other blocks of the XCaliber processor in this example, all of which bear the same element numbers in FIG. 27 as in FIG. 2. The SPU dispatches, at most, two packet instructions per cycle across all contexts (one instruction per cluster of the SPU). The type of the packet instruction corresponds to the PMU block to which the instruction affects (PMMU, QS or RTU). When the SPU dispatches a packet instruction, a single command to the PMU is generated and inserted into one of three different queues in the CU block (one queue per PMU block to which the command goes). Commands to the PMU are issued to PMMU command queue 2703, those to the QS go to QS command queue 2705, and command to the RTU go to the RTU command queue 2707. Each queue can hold up to 8 commands. The SPU only dispatches a command to the CU if there are enough free entries in the corresponding queue.

The CU is responsible for dispatching the commands to the respective blocks, and gathering the responses (if any) in an 8-entry ResponseQueue 2709, which queues responses to be returned to the SPU. The CU can receive up to three responses in a given cycle (one from each of the three blocks). Since (a) only one outstanding packet instruction is allowed per stream, (b) the Response Queue has as many entries as streams, (c) only one command to the PMU is generated per packet instruction, and (d) only one response is generated per each load-like command, it is guaranteed that there will be enough space in the ResponseQueue to enqueue the responses generated by the PMU blocks. The ResponseQueue should be able to enqueue up to two commands at a time.

CU 213 also receives requests from SIU 107 to update the configuration registers. These commands are also sent to the PMMU, RTU and QS blocks as commands. The PMMU, QS, and RTU keep a local copy of the configuration registers that apply to them. The CU keeps a copy as well of all the configuration registers, and this copy is used to satisfy the configuration register reads from the SIU.

For read-only configuration registers, a special interface is provided between the CU and the particular unit that owns the read-only configuration register. In XCaliber's PMU, there exists two read-only configuration registers: one in the PMMU block (SizeOfOverflowedPacket) and the other one in the CU block (StatusRegister). Whenever the PMMU writes into the SizeOfOverflowedPacket register, it notifies the CU and the CU updates its local copy.

Commands in different queues are independent and can be executed out of order by the PMU. Within a queue, however, commands are executed in order, and one at a time. The PMU can initiate the execution of up to 3 commands per cycle. The PMMU and QS blocks give more priority to other events (like the creation of a new packetPage when a new packet arrives -PMMU-, or the extraction of a packet identifier because it needs to be sent out -QS-) than to the commands from the SPU. This means that a command that requests some data to be sent back to the SPU may take several cycles to execute because either the PMMU or QS might be busy executing other operations.

RTU 227 has two sources of commands: from the QS (to pre-load packet information into an available context) and from the SPU (software command). The RTU always gives more priority to SPU commands. However, the RTU finishes the on-going context pre-load operation before executing the pending SPU command.

Command/Response Formats

A command received by the CMU has three fields in the current embodiment:
1. Context number, which is the context associated to the stream that generated the command.
2. Command opcode, which is a number that specifies the type of command to be executed by the PMU.
3. Command data, which is the different information needed by the PMU to execute the command specified in the command opcode field.

The PMU, upon receiving a command, determines to which of the command queues the command needs to be inserted. A command inserted in any of the queues has a similar structure as the command received, but the bit width of the opcode and the data will vary depending on the queue. The table of FIG. 28 shows the format of the command inserted in each of the queues. Not included are the Read Configuration Register and Write Configuration Register commands that the CU sends to the PMMU, QS and RTU blocks.

Each command that requires a response is tagged with a number that corresponds to the context associated to the stream that generated the command. The response that is generated is also tagged with the same context number so that the SPU knows to which of the commands issued it belongs.

As described above, there is only one ResponseQueue 2709 (FIG. 27) that buffers responses from the three PMU blocks. Note that there is no need to indicate from which block the response comes since, at most, one packet instruction that requires a response will be outstanding per stream. Therefore, the context number associated to a response is enough information to associate a response to a stream.

FIG. 29 is a table showing the format for the responses that the different blocks generate back to the CU. Not included in the table are the configuration register values provided by each of the blocks to the CU when CU performs a configuration register read.

The RTU notifies the SPU, through a dedicated interface that bypasses the CU (path 2711 in FIG. 27), of the following events:

1. A masked load/store operation has finished. The interface provides the context number.
2. A GetContext has completed. The context number associated to the stream that dispatched the GetContext operation, and the context number selected by the RTU is provided by the interface. A success bit is asserted when the GetContext succeeded; otherwise it is de-asserted.
3. A pre-load either starts or ends. The context number and the priority associated to the packet is provided to the SPU.

Reset and Freeze Modes

The PMU can enter the reset mode in two cases:
1. SPU sets the Reset configuration flag.
2. XCaliber is booted.

The PMU can also enter the freeze mode in two cases:
1. SPU sets the Freeze configuration flag.
2. PMU finishes the reset sequence.

The reset sequence of the PMU takes several cycles. During this sequence, the Reset bit in the StatusRegister configuration register is set. After the reset sequence, all the configuration registers are set to their default values, and the PMU enters the freeze mode (the Reset bit in the StatusRegister is reset and the Freeze bit is set). When this is done, the SPU resets the Freeze configuration flag and, from that time on, the PMU runs in the normal mode.

When the SPU sets the Freeze configuration flag, the PMU terminates the current transaction or transactions before setting the Freeze bit in the StatusRegister. Once in the freeze mode, the PMU will not accept any data from the network input interface, send any data out through the network output interface, or pre-load any packet The PMU continues executing all the SPU commands while in freeze mode.

The SPU needs to poll the StatusRegister configuration register to determine in which mode the PMU happened to be (reset or freeze) and to detect when the PMU changes modes.

The CU block instructs the rest of the blocks to perform the reset and the freeze. The following is the protocol between the CU and any other block when the CU receives a write into the reset and/or freeze configuration bit:

1. The CU notifies to some of the blocks that either a freeze or a reset needs to be performed.
2. Every block performs the freeze or the reset. After completion, the block signals back to the CU that it has completed the freeze or reset.
3. The CU updates the StatusRegister bits as soon as the reset or freeze has been completed. Software polls the StatusRegister to determine when the PMU has completely frozen.

The different blocks in the PMU end the freeze when:
1. IB, LPM, CU and QS do not need to freeze.
2. As soon as the PMMU finishes uploading inbound packets, if any, and downloading outbound packets, if any.
3. As soon as the RTU has finished the current pre-load operation, if any.
4. As soon as the OB is empty.

While in freeze mode, the blocks will not:
1. start uploading a new packet; start downloading a completed packet; or generate interrupts to the SPU (PMMU)
2. pre-load a context or generate interrupts to the SPU (RTU).

If software writes a '1' in the Freeze/Reset configuration register and then writes a '0' before the PMU froze or reset, results are undefined. Once the PMU starts the freeze/reset sequence, it completes it.

Performance Counters Interface

The PMU probes some events in the different units. These probes are sent to the SIU and used by software as performance probes. The SIU has a set of counters used to count some of the events that the PMU send to the SIU. Software decides which events throughout the XCaliber chip it wants to monitor. Refer to the SIU Architecture Spec document for more information on how software can configure the performance counters.

Figure 30:
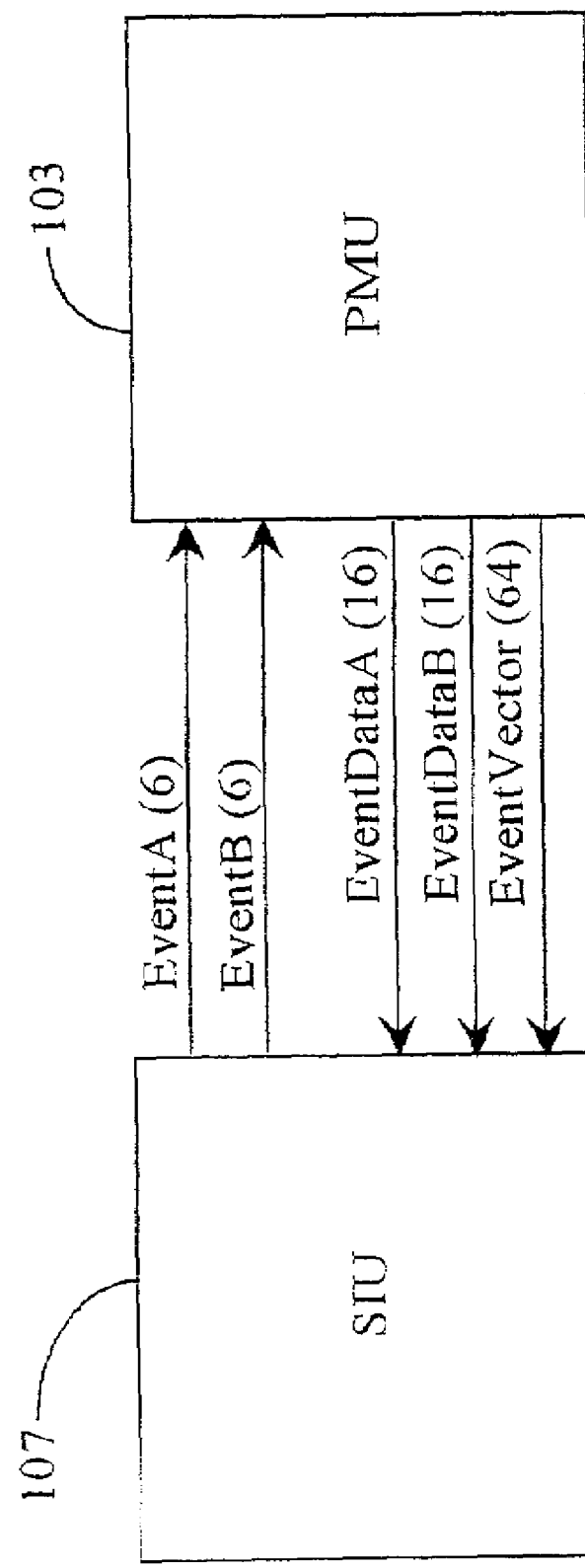
FIG. 30 shows a performance counter interface between the PMU and the SIU in an embodiment of the invention.

FIG. 30 shows a performance counter interface between the PMU and the SIU. Up to 64 events can be probed within the PMU. All 64 events are sent every cycle to the SIU (EventVector) through a 64-bit bus.

Each of the 64 events may have associated a value (0 to 64K-1). Software selects two of the events (EventA and EventB). For each of these two, the PMU provides the associated 16-bit value (EventDataA and EventDataB, respectively) at the same time the event is provided in the EventVector bus.

Events are level-triggered. Therefore, if the PMU asserts the event for two consecutive cycles, the event will be counted twice. The corresponding signal in the EventVector will be asserted only if the event occurs, and for as many cycles as the event condition holds.

The SIU selects which events are actually counted (based on how software has programmed the SIU). If the SIU decides to count an event number different from EventA or EventB, a counter within the SIU counts the event for as many cycles the corresponding bit in the EventVector is asserted. If the events monitored are EventA and/or EventB, the SIU, in addition to counting the event/s, increments another counter by EventDataA and/or EventDataB every time the event occurs.

Figure 31:
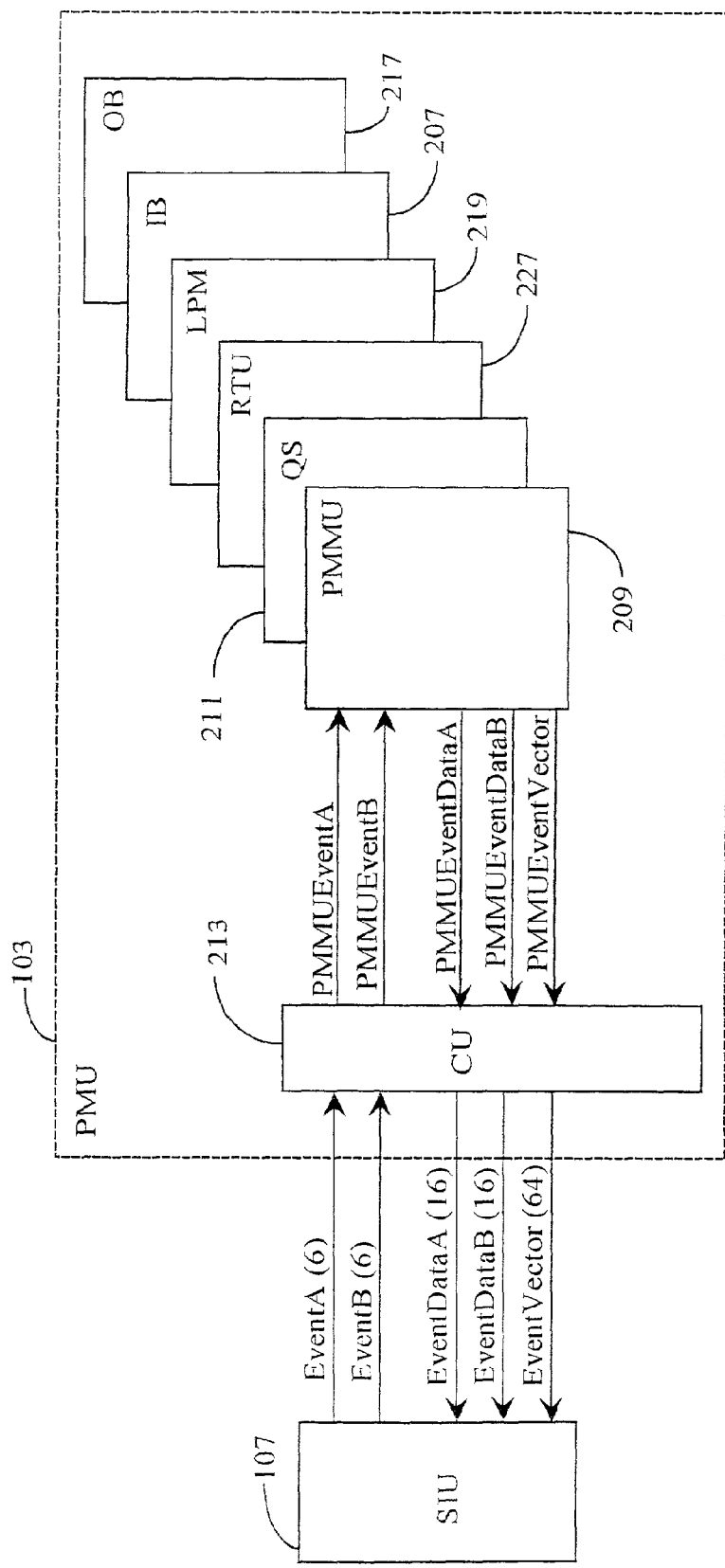
FIG. 31 shows a possible implementation of internal interfaces among the different units in the PMU in an embodiment of the present invention.

FIG. 31 shows a possible implementation of the internal interfaces among the different blocks in PMU 103. CU acts as the interface between the PMU and SIU for the perfor mance counters. CU 213 distributes the information in EventA and EventB to the different units and gathers the individual EventVector, EventDataA and EventDataB of each of the units.

The CU block collects all the events from the different blocks and send them to the SIU. The CU interfaces to the different blocks to notify which of the events within each block need to provide the EventDataA and/or EventDataB values.

Performance events are not time critical, i.e. they do not need to be reported to the SIU in the same cycle they occur.

FIGS. 34 through 39 comprise a table that lists all events related to performance counters. These events are grouped by block in the PMU. The event number is shown in the second column. This number corresponds to the bit in the EventVector that is asserted when the event occurs. The third column is the event name. The fourth column shows the data value associated to the event and its bit width in parentheses. The last column provides a description of the event.

The CU block collects all of the events from the different blocks and sends them to the SIU. The CU interfaces to the different blocks to notify which of the events within each block need to provide the EventDataA and the EventDataB values.

Performance events are not time critical, i.e. they do not need to be reported to the SIU in the same cycle that they occur.

Debug Bypasses and Trigger Events

Hardware debug hooks are implemented in the PMU to help debugging of the silicon. The debug hooks are divided into two categories:

1. Bypass hooks: will bypass potentially faulty functions. Instead of the faulty results generated by these functions (or, in some cases, no result at all), the bypass hook will provide at least some functionality that will allow other neighboring blocks to be tested.
2. Trigger events: when a particular condition occurs in the PMU (trigger event), the PMU will enter automatically in single-step mode until, through the OCI Interface (Section), the SIU sends a command to the PMU to exit the single-step mode.

Moreover, the PMU has the capability of being single-stepped. A signal (SingleStep) will come from the OCI Interface. On a cycle-by-cycle basis, the different blocks of the PMU will monitor this signal. When this signal is de-asserted, the PMU will function normally. When SingleStep is asserted, the PMU will not perform any work: any operation on progress will be held until the signal is de-asserted. In other words, the PMU will not do anything when the signal is asserted. The only exception to this is when a block can lose data (an example could be in the interface between two block: a block A sends data to a block B and assumes that block B will get the data in the next cycle; if SingleStep is asserted in this cycle, block B has to guarantee that the data from A is not lost).

Bypass Hooks

The different bypass hooks in the PMU are activated through the on-the-fly BypassHooks configuration register. FIG. 40 is a table illustrating the different bypass hooks implemented in the PMU. The number of each hook corresponds to the bit number in the BypassHooks register. The bypass hook is applied for as many cycles as the corresponding bit in this register is asserted.

Trigger Events

The following is a list of trigger events implemented in the PMU.

1. A new packet of size s bytes is at the head of the IBU.
   (a) s=0: any packet.
2. A packetId from source s with packetPage pp is inserted in queue q in the QS.
   (a) s=0: PMM, s=1: QS, s=2: CMU; s=3: any
   (b) pp=0x10000: any
   (c) q=33: any
3. A packetId from queue q with packetPage pp and packetNumber pn is sent to RTU.
   (a) pp=0x10000: any
   (b) q=33: any
   (c) pn=256: any
4. A packetId with packetPage pp and packetNumber pn reaches the head of queue q in the QS.
   (a) pp=0x10000: any
   (b) q=33: any
   (c) pn=256: any
5. A packet with RTU priority p and packetPage pp and packetNumber pn is pre-loaded in context c.
   (a) pp=0x10000: any
   (b) q=33: any
   (c) pn=256: any
   (d) c=8: any
6. A packetId from queue q with packetPage pp and packetNumber pn is sent for downloading to PMM.
   (a) pp=0x10000: any
   (b) q=33: any
   (c) pn=256: any
7. A packetId with packetPage pp and packetNumber pn reaches the head of queue q in the QS.
   (a) pp=0x10000: any
   (b) q=33: any
   (c) pn=256: any
8. Packet command pc is executed by block b.
   (a) pc=0: GetSpace; pc=1: FreeSpace; pc=2: InsertPacket; pc=3: ProbePacket; pc=4: ExtractPacket; pc=5: CompletePacket; pc=6: UpdatePacket; pc=7: MovePacket; pc=8: ProbeQueue; pc=9: GetContext; pc=10: ReleaseContext; pc=11: MaskedLoad; pc=12: MaskedStore; pc=13: any
   (b) b=0: RTU; b=1: PMM; b=2: QS; b=3: any Detailed Interfaces with the SPU and SIU The architecture explained in the previous sections is implemented in the hardware blocks shown in FIG. 41:

SPU-PMU Interface

FIGS. 42-45 describe the SPU-PMU Interface.

SIU-PMU Interface

FIGS. 46-49 describe the SIU-PMU Interface.

The specification above describes in enabling detail a Packet Memory Unit (PMU) for a Multi-Streaming processor adapted for packet handling and processing. Details of architecture, hardware, software, and operation are provided in exemplary embodiments. It will be apparent to the skilled artisan that the embodiments described may vary considerably in detail without departing from the spirit and scope of the invention. It is well-known, for example, that IC hardware, firmware and software may be accomplished in a variety of ways while still adhering to the novel architecture and functionality taught.

Non-Speculative Pre-Fetch Operation

In another aspect of the present invention, the inventor provides a method and apparatus that enables a non-speculative pre-fetch of processing instructions performed by the SPU upon early notification from the PMU that a context has been selected for processing and that preloading of the context will begin. Such a method and apparatus is described in enabling detail below.

Figure 50:
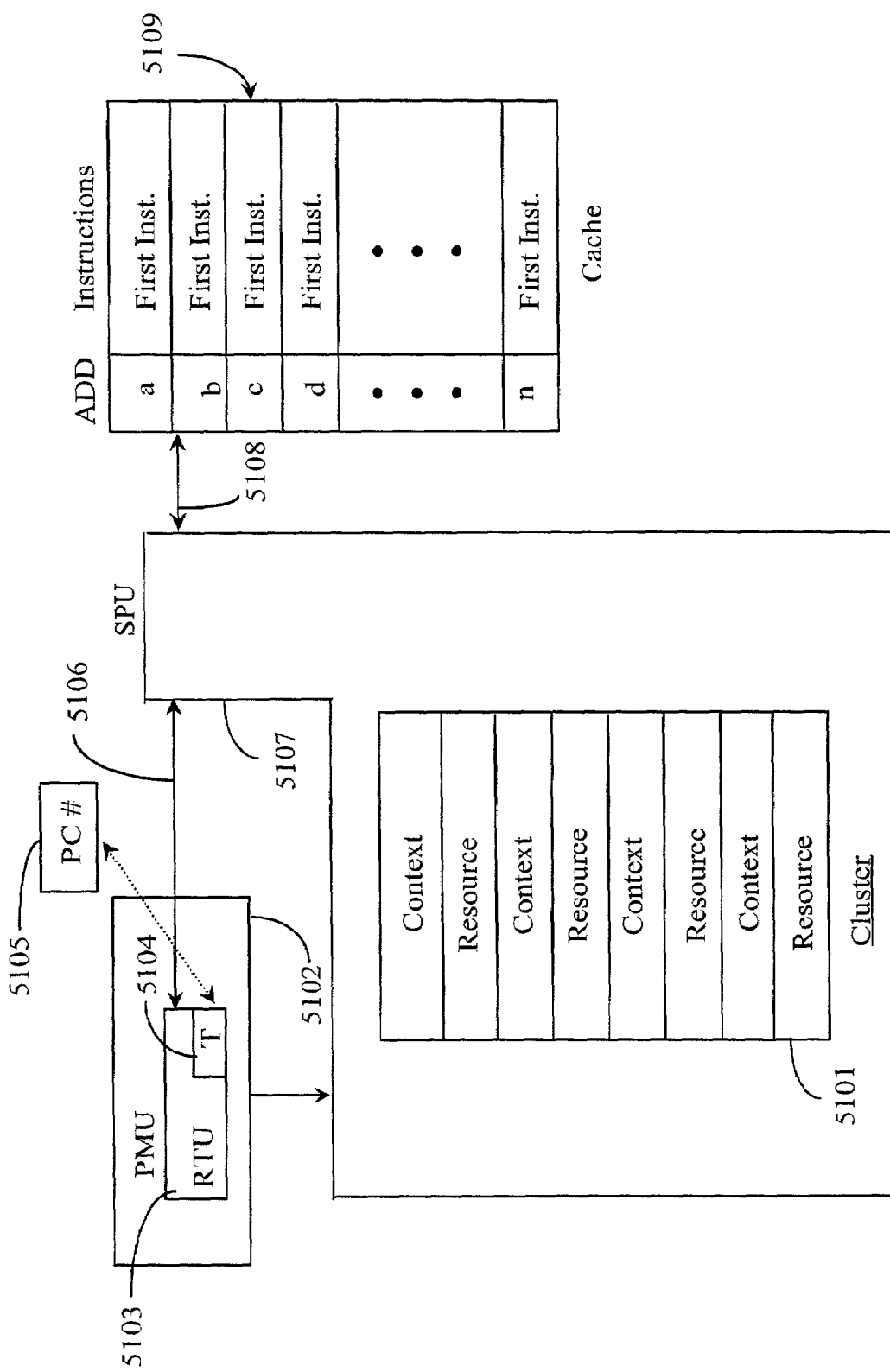
FIG. 50 is a block-diagram logically illustrating components and interaction during a pre-fetch operation according to an embodiment of the present invention.

FIG. 50 is a block diagram illustrating various elements and interaction between elements in performance of a non-speculative pre-fetch operation according to one embodiment of the present invention.

Referring to Ser. No. 09/737,375 listed as a priority document in the cross-reference section above, there is disclosed a general method for selecting a context, pre-loading the context with packet information, and then releasing the context to the SPU for processing. The headings under which the disclosure is made are Register Transfer Unit (RTU), Context States and Pre-loading a Context.

Because a context being pre-loaded for packet processing is always a PMU-owned context, the RTU has all the available write ports to that context to perform the loading of packet information. It is disclosed above under the heading Pre-loading a Context that whenever the pre-loading operation starts, the RTU notifies this event to the SPU through a dedicated interface. Similarly, when the pre-loading operation is completed, the RTU also notifies the SPU of this fact. Thus the SPU expects two basic notifications (start and end) for each packet pre-load operation. A special notification is provided to the SPU when the RTU starts and ends a pre-load in a same cycle.

In the instant example referring to FIG. 50, a packet management unit (PMU) 5102 is provided having a register transfer unit (RTU) 5103 illustrated therein, the RTU having a software-configurable hardware table (T) 5104 available thereto. PMU 5102, more specifically through RTU 5103, has a dedicated communication link 5106 established between itself and streaming processor unit (SPU) 5107. SPU 5107 is adapted to process the packets using instructions that are pre-fetched in embodiments of the present invention.

SPU 5107, in a preferred embodiment, is connected to an instruction cache memory 5109, which is adapted to store, among other data, first instructions of threads for processing data, and in some cases sequential instructions for specific threads. Connection from SPU 5107 to cache 5109 is logically represented herein by a link 5108. Storing the first instruction of a thread in an on-chip instruction cache is not required for the invention, as the first instruction can be anywhere in memory, even on a disk, but it is a convenience and preferred to have the instructions stored as close as possible to the processing core. In an embodiment of the present invention packets arriving for processing are staged in queues according to packet types, and a specific thread is associated with each packet type for processing. In this embodiment of the invention a table 5104 associates queues (packet types) to specific threads needed for processing by a program counter (PC) pointer, indicated in FIG. 50 as PC# and element 5105. PC# 5105 is not to be confused with a packet command (pc) disclosed with reference to Ser. No. 09/737,375 under the heading Trigger Events.

A cluster 5101 of contexts and functional resources generic to the processing core of SPU 5107 is illustrated in this example. Functional resources are circuitry required to perform calculations such as multiplication, division, addition and subtraction. There may also be special functions such as trigonometric, averaging, and weighting functions performed by functional units, and memory access functions as well. Contexts are well known in the art, and are register files into which, in this case, packet information is loaded prior to processing. The illustration of contexts and resources is exemplary only in this example, as there may be different numbers of each, and there is generally not a one-to-one correspondence between resources and functional units.

It is the responsibility of PMU 5102 through RTU 5103 via link 5106 to select available (not SPU-owned) contexts in cluster 5101 for preloading packet information thereto for processing by SPU-5107 and to activate those selected and loaded contexts, at which time SPU 5107 will own the activated contexts until processing is complete. It is noted herein that any context in cluster 5101 may issue instructions only to the functional resources within that cluster. When SPU 5107 finishes processing a thread it releases the context back to PMU 5102.

Table 5104 contains a PC#5105 for each of the different queues into which packets can be classified by the PMU. PC#5105 represents, in a preferred embodiment, the cache memory address of the beginning of its corresponding thread. In other embodiments the PC may point to an address for a first instruction for a thread in any memory device available to the processing core. It is noted herein that in a preferred embodiment there are 32 queues available for storing identifiers of data packets. The number of 32 is not meant to be a limitation, as there could be more or less than 32 queues provided and made available in various configurations. In practice of the invention a packet arrives for processing and is en-queued into one of the 32 available queues according to a classification scheme which may include priority. The scheme in a preferred embodiment revolves around packet type. For example, a voice-over-Internet protocol (VoIP) packet may be assigned a higher priority than an e-mail packet. Therefore, the VoIP packet will be en-queued in one of the 32 queues of higher number, perhaps queue 32 if VoIP packets are assigned the highest priority in a particular scheme, which may be varied according to enterprise design. In fact, there are more than one type of VoIP packets that may be encountered and they may differ somewhat from each other in exact instruction types required to process them. Therefore, there may be more than one queue dedicated for VoIP packets of differing types. It may be that queue numbers 29-32 are dedicated to the range of VoIP packets encountered. Other types of data packets encountered are similarly queued according to type and priority level of processing.

Each queue has associated with it a corresponding PC# 5105. When RTU 5103 selects an available context from within cluster 5101 for processing a newly arrived data packet, it sends a notification of the fact to SPU 5107 over dedicated link 5106. This notification contains the correct PC# (associated to the queue) for that queue. The PC# identifies the beginning memory location or address of the appropriate thread for processing stored in instruction cache 5109 in a preferred embodiment, or the address for a first instruction for a thread in any other memory device in alternative embodiments. The SPU will be able to fetch and execute from that point on all of the instructions of which the thread is composed. A thread ends with a special instruction (called release) that effectively send the ownership of the context the stream is running, back to the PMU by notification via link 5106.

Immediately after the first notification that a context has been selected for processing, RTU 5103 begins loading packet information into the selected context for processing. Simultaneously, in this embodiment, SPU 5107 fetches the appropriate instruction thread from cache 5109 over link 5108 using PC# 5105 as a pointer. After loading the selected context with the appropriate data for processing, RTU 5103 sends a notification of activation of the context to SPU 5107 over link 5106. SPU 5107, assuming that it has completed the pre-fetch, may then commence processing. In some cases, particularly those cases in which there is no instruction cache, and the thread must be fetched from a more distant memory, the pre-fetch may take longer than the loading of the context. In one embodiment, a special packet identification thread is provided to handle a possible situation wherein a packet sender does not include information designating the type of data packet and/or the appropriate queue destination. In this case, the unidentified packet is en-queued into a general queue set aside for this purpose. This general queue has a PC# associated therewith and included in table (T) 5104. Thus when a context is selected for processing the packet by RTU 5103, the notification to SPU contains the PC# pointing to the special packet-type identification instruction (the start of the thread) stored in cache 5109, in a preferred embodiment. The SPU pre-fetches the special thread as described in the normal sequence above. During processing, the special thread will determine the exact packet type and the appropriate queue that it should be placed in. At this time the packet is re-queued in the appropriate queue, after which a new context is subsequently selected and re-notification to SPU 5107 is initiated, or the special thread might decide to process the packet itself.

The special circumstance described above needs only be performed on a first data packet of a data packet flow from a same source. The determined classification information (appropriate queue for packets of this flow) can be tabled by SPU 5107 within T 5104 and sent back to RTU 5103 so that a next packet of the same flow can be properly classified and information about the packet can be en-queued in the appropriate queue. If for example, the unclassified packet was determined to be a type not accounted for in terms of existing instruction threads, then a determination may be made to create a new thread, assign a PC# and queue to handle the new packet type. In still another embodiment, a special hardware mechanism is provided at the port for intercepting unclassified data packets. The hardware has its own queue and associated PC# and is enhanced with a processing capability and functional resources to at least identify the packet independently from the SPU. After the packet is classified by the hardware, it is looped back to ingress for proper queuing according to priority.

Referring to the first and preferred embodiment described above, it may be that SPU 5107, while processing an unclassified packet for identification, will find that the determined priority of the packet is not high and that there are numerous packets waiting for processing that are classified and of a higher priority. In this case, an interrupt is generated to cease processing the packet and release the context back to the PMU without re-queuing the packet. The packet can remain in the general queue until the higher priority packets are processed. This, of course assumes that the SPU has knowledge of multiple-queued packets before processing, information which can be propagated over link 5106 from RTU 5102 within T 5104.

Because all packets are queued by type, and each queue is associated with a unique PC# pointing to an address for the beginning of an appropriate thread stored in cache 5109, or in another memory device, SPU 5108 is enabled to perform a non-speculative pre-fetch, thus assured that the instructions retrieved are the actual instructions required for processing.

Figure 51:
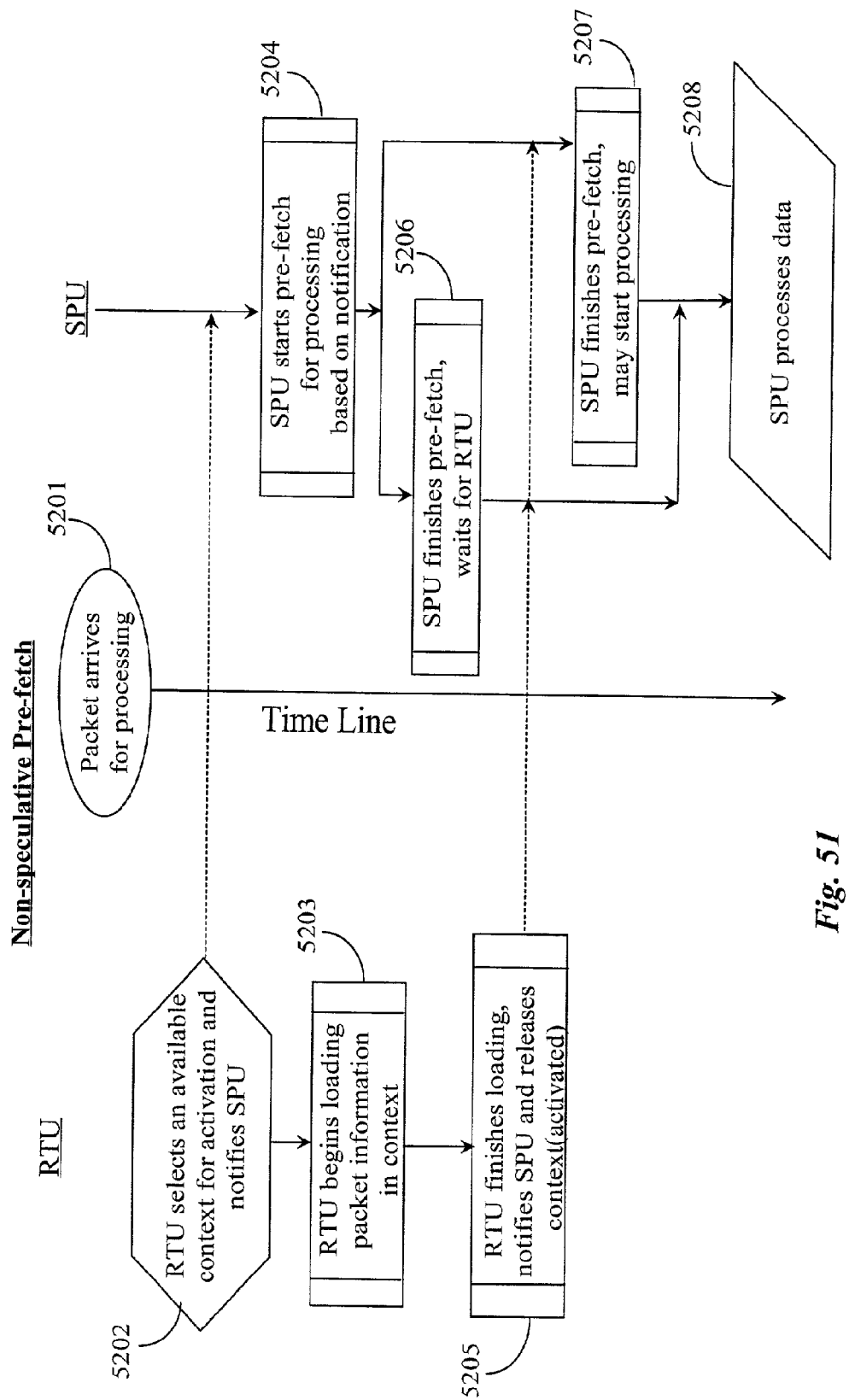
FIG. 51 is a flow chart illustrating general steps for initiating and completing a non-speculative pre-fetch operation according to an embodiment of the present invention.

FIG. 51 is a process flow chart illustrating steps for implementing a non-speculative pre-fetch operation according to an embodiment of the present invention. At step 5201 a data packet arrives for processing. As previously described above there are 32 available queues in a preferred embodiment wherein information pertinent to the data packet may be placed according to class and priority. Each queue has an associated program counter (PC#) that points to an address in memory for the beginning of a specific thread required to process the data packet.

Time is indicated in FIG. 51 on a vertical axis, activities of the RTU are indicated on the left of the figure, and activities of the SPU are indicated on the right of the figure. At step 5202, the RTU selects an available (not SPU-owned) context and notifies the SPU that the particular context will be activated for processing. In the notification at step 5202, the PC# is provided from the association with the queue for the packet, indicating the address for the first instruction for the thread to process the packet.

Upon receipt of the notification from the RTU at step 5202, the SPU may begin pre-fetching the appropriate thread. At substantially the same time the RTU, at step 5203, begins loading packet information into the selected context. At step 5205, loading is complete, and the RTU notifies the SPU and releases (activates) the context.

There are two necessary conditions for the SPU to process the data in the context. One is that the RTU releases the context, and notifies the SPU. The other is that the SPU has loaded the first instruction of an appropriate thread for processing. Either condition may finish first, so, in one case the SPU will wait for the RTU, and begin processing as soon as the release notification arrives from the RTU; while in the other case the SPU will receive the notification from the RTU, but will finish loading the appropriate thread before beginning to process at step 5208.

The optional situation is indicated in FIG. 51 by alternate paths for the SPU. IN one case the SPU finishes pre-fetch at step 5206 before the RTU finishes loading, and the SPU must therefore wait for the loading to finish, and for the notification from the RTU before processing may commence. In the other option, shown as step 5207, the notification from the RTU arrives before the SPU finishes pre-fetch, so the SPU continues, and processing may commence at step 5207 when the pre-fetch is finished.

The present invention is particularly applicable to the processing of data packets by data packet routers connected to a data packet network. However, this should not be construed as a limitation of the present invention. Other types of data processing machines such as Internet data servers, e-mail servers, and so on may benefit from the present invention. Accordingly the claims that follow should be accorded the broadest interpretation. The spirit and scope of the present invention is limited only by the claims that follow.

What is claimed is:

1. A system for processing packets, the system comprising:
   a packet management unit (PMU) to:
   select a context for processing a data packet;
   identify a thread for use in processing the data packet;
   convey an identification of the thread and the context; and
   load information corresponding to the packet into the context; and
   a processing unit to:
   receive the identification of the thread and the context from the PMU; and initiate a pre-fetch of instructions of the thread prior to the PMU completing the load of the information into the context.

2. The system of claim 1, wherein the packet management unit is identifies said thread by accessing a table which associates threads with packet types.

3. The system of claim 2, wherein said table comprises a plurality of queues, each of said queues for storing packets of a particular type.

4. The system of claim 3, wherein for each of said queues, the table comprises an identifier which identifies a thread for use in processing packets of a corresponding type.

5. The system of claim 4, wherein said identifier comprises an address of a first instruction of a thread.

6. The system of claim 2, wherein the table comprises a software configurable hardware table.

7. The system of claim 1, wherein said processing unit comprises a first portion for processing the data packets, and a second portion comprising a pool of context registers.

8. The system of claim 7, wherein said PMU selects said context from said pool of contexts via a dedicated link which couples the PMU to the processing unit.

9. The system of claim 1, wherein the processing unit pre-fetches one or more of said instructions at least partially in parallel with the PMU loading the information corresponding to the packet into the context.

10. The system of claim 3, wherein the PMU further en-queues a received data packet into one of said queues according to a classification scheme.

11. The system of claim 10, wherein the classification scheme is based on packet type and/or priority.

12. The system of claim 11, wherein said packet types include voice over Internet protocol packets and/or e-mail packets.

13. The system of claim 3, wherein in response to receiving a given packet of an undetermined type, the PMU stores the given packet in a special queue dedicated for storing unclassified packets, and convey an identification of a thread configured to identify packet types.

14. The system of claim 1, wherein said PMU and processing unit are part of a dynamic multi-streaming processor.

15. The system as recited in claim 1, wherein said pre-fetch is non-speculative.

16. A method for processing data packets, the method comprising:

selecting a context for processing a data packet;
identifying a thread for use in processing the data packet;
conveying an identification of the thread and the context;
loading information corresponding to the packet into the context; and
initiating a pre-fetch of instructions of the thread prior to completing said loading of the information into the context.

17. The method of claim 16, wherein said identifying comprises accessing a table which associates threads with packet types.

18. The method of claim 17, wherein said table comprises a plurality of queues, each of said queues being configured to store packets of a particular type.

19. The method of claim 18, wherein for each of said queues, the table comprises an identifier which identifies a thread for use in processing packets of a corresponding type.

20. The method of claim 19, wherein said identifier comprises an address of a first instruction of a thread.

21. The method of claim 17, wherein the table comprises a software configurable hardware table.

22. The method of claim 21, wherein said method comprises selecting said context from a pool of contexts.

23. The method of claim 16, wherein pre-fetching said instructions is performed at least partially in parallel with the loading of the information corresponding to the packet into the context.

24. The method of claim 18, further comprising en-queuing a received data packet into one of said queues according to a classification scheme.

25. The method of claim 24, wherein the classification scheme is based on packet type and/or priority.

26. The method of claim 25, wherein said packet types include voice over Internet protocol packets and/or e-mail packets.

27. The method of claim 18, wherein in response to receiving a given packet of an undetermined type, the method comprises storing the given packet in a special queue dedicated for storing unclassified packets, and conveying an identification of a thread configured to identify packet types.

28. The method of claim 16, wherein said pre-fetch is non-speculative.

* * * * *